United States Patent
Hosek et al.

(10) Patent No.: US 12,350,821 B2
(45) Date of Patent: Jul. 8, 2025

(54) VACUUM-ENVIRONMENT ROBOT WITH DISTRIBUTED ACTUATORS

(71) Applicant: Persimmon Technologies Corporation, Wakefield, MA (US)

(72) Inventors: Martin Hosek, Salem, NH (US); Tuan Ha, Randolph, MA (US); Dennis Poole, East Derry, NH (US); Sripati Sah, Wakefield, MA (US); Himanshu Shukla, Malden, MA (US)

(73) Assignee: Persimmon Technology Corporation, Wakefield, MA (US)

( * ) Notice: Subject to any disclaimer, the term of this patent is extended or adjusted under 35 U.S.C. 154(b) by 987 days.

(21) Appl. No.: 17/172,209

(22) Filed: Feb. 10, 2021

(65) Prior Publication Data
US 2021/0245372 A1   Aug. 12, 2021

Related U.S. Application Data

(60) Provisional application No. 63/136,727, filed on Jan. 13, 2021, provisional application No. 63/106,074, (Continued)

(51) Int. Cl.
*B25J 9/04*   (2006.01)
*B25J 11/00*  (2006.01)
(Continued)

(52) U.S. Cl.
CPC .............. *B25J 19/007* (2013.01); *B25J 9/042* (2013.01); *B25J 11/0095* (2013.01);
(Continued)

(58) Field of Classification Search
CPC ............... B25J 11/0095; B25J 15/0052; B25J 19/0054; B25J 19/0045; B25J 19/0041; B25J 19/0037; B25J 9/042; B25J 19/007
See application file for complete search history.

(56) References Cited

U.S. PATENT DOCUMENTS 10,134,620 B2 *  11/2018  Katsuda ............... H01L 21/677
10,224,232 B2     3/2019   Hosek
(Continued)

FOREIGN PATENT DOCUMENTS

JP    2001024045 A   1/2001
JP    2014527314 A  10/2014
(Continued)

OTHER PUBLICATIONS

U.S. Appl. No. 63/031,883, filed May 29, 2020.

*Primary Examiner* — Gregory Robert Weber
(74) *Attorney, Agent, or Firm* — McCarter & English, LLP

(57) ABSTRACT

An apparatus includes a drive; a movable arm connected to the drive, the movable arm comprising a first link connected to the drive at a shoulder, a second link connected to the first link at an elbow, a third link connected to the second link at a wrist, and a fourth link connected to the second link at the wrist; at least one first actuator located in the second link configured to cause a rotation of the third link about the wrist; and at least one second actuator located in the second link configured to cause a rotation of the fourth link about the wrist. One or more of a thermal management, a power distribution, or a communication is effected through the second link.

43 Claims, 65 Drawing Sheets

Related U.S. Application Data filed on Oct. 27, 2020, provisional application No. 63/048,847, filed on Jul. 7, 2020, provisional application No. 63/038,995, filed on Jun. 15, 2020, provisional application No. 63/032,797, filed on Jun. 1, 2020, provisional application No. 62/984,212, filed on Mar. 2, 2020, provisional application No. 62/983,991, filed on Mar. 2, 2020, provisional application No. 62/972,285, filed on Feb. 10, 2020.

(51) Int. Cl.
  *B25J 19/00* (2006.01)
  *B25J 15/00* (2006.01)

(52) U.S. Cl.
  CPC ....... *B25J 19/0037* (2013.01); *B25J 19/0041* (2013.01); *B25J 19/0045* (2013.01); *B25J 19/0054* (2013.01); *B25J 15/0052* (2013.01)

(56) References Cited

U.S. PATENT DOCUMENTS

| | | |
|---|---|---|
| 10,424,498 B2 | 9/2019 | Hofmeister et al. |
| 10,538,000 B2 | 1/2020 | Hosek et al. |
| 10,541,167 B2 | 1/2020 | Hofmeister et al. |
| 10,569,430 B2 | 2/2020 | Hosek et al. |
| 10,800,050 B2 | 10/2020 | Hosek et al. |
| 2009/0032223 A1 | 2/2009 | Zimmerman et al. ....... 165/4.19 |
| 2016/0136812 A1 | 5/2016 | Hosek et al. |
| 2016/0229296 A1 | 8/2016 | Hosek et al. |
| 2018/0019155 A1 | 1/2018 | Tsang et al. |
| 2018/0104830 A1* | 4/2018 | Hosek ............... H01L 21/67259 |
| 2018/0105044 A1 | 4/2018 | Hosek et al. |
| 2018/0105045 A1 | 4/2018 | Hosek et al. |

FOREIGN PATENT DOCUMENTS

| | | | |
|---|---|---|---|
| WO | WO-2013/040401 A1 | 3/2013 | |
| WO | WO-2017002340 A1 * | 1/2017 | .............. B25J 15/06 |

* cited by examiner

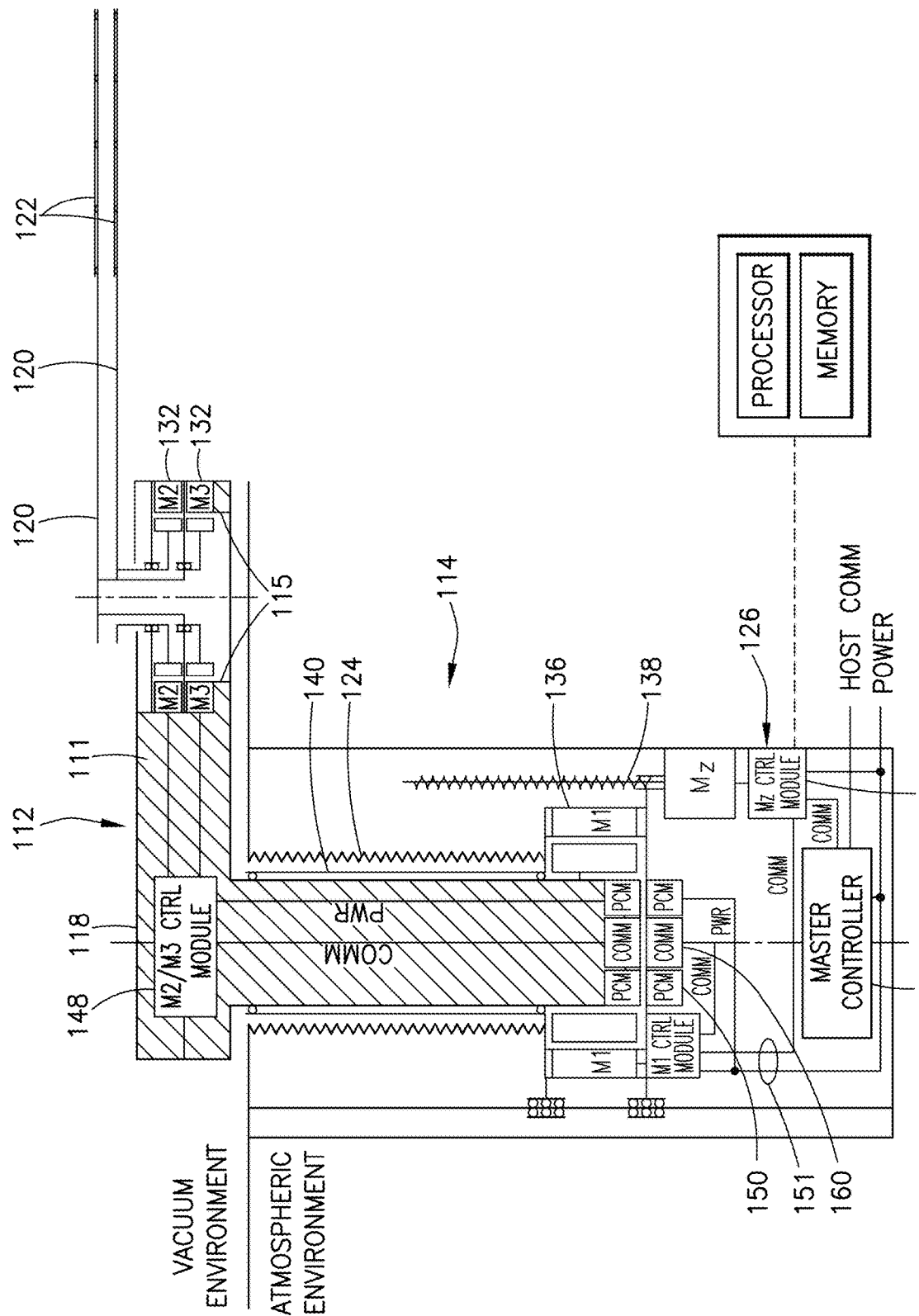

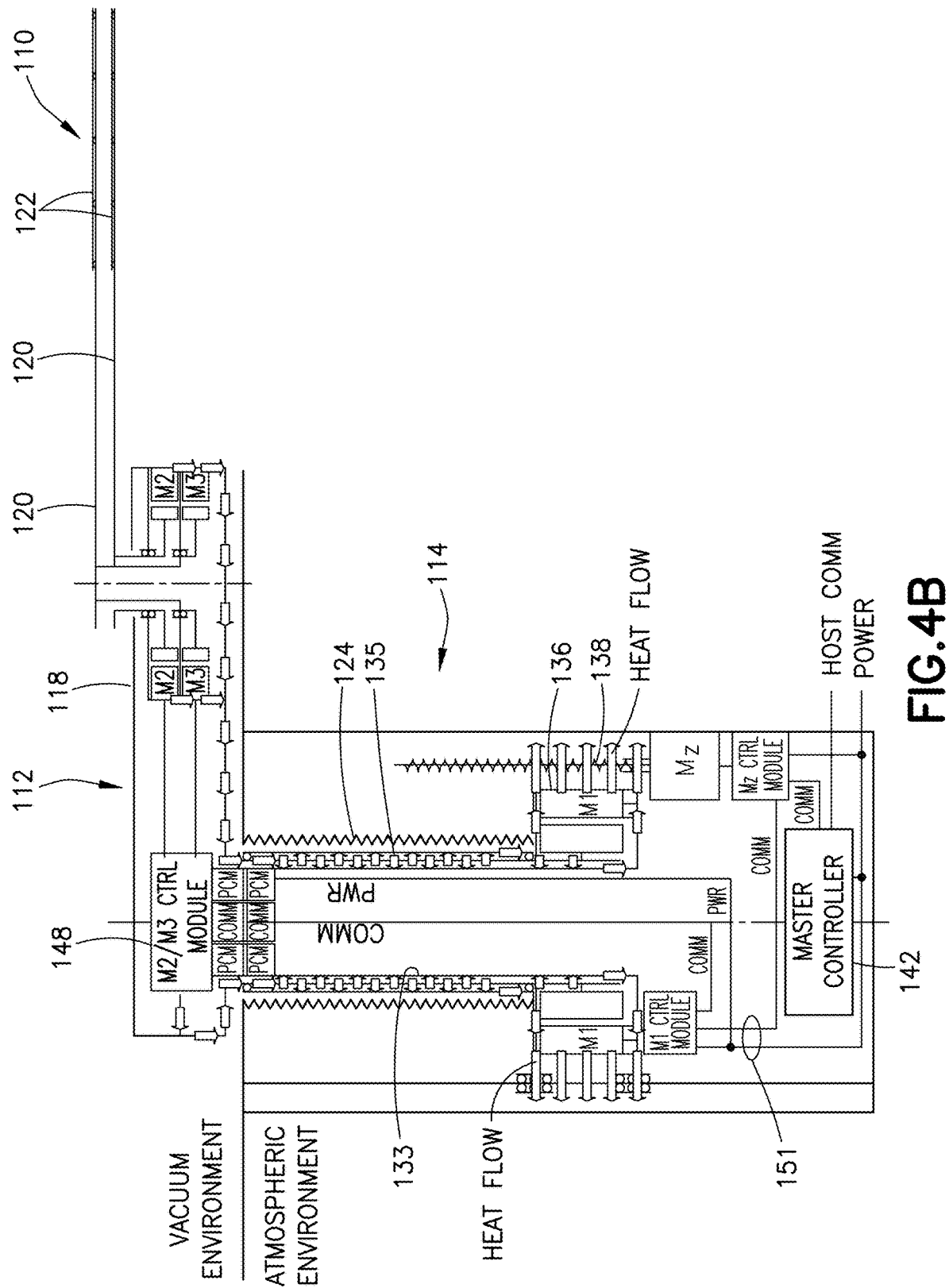

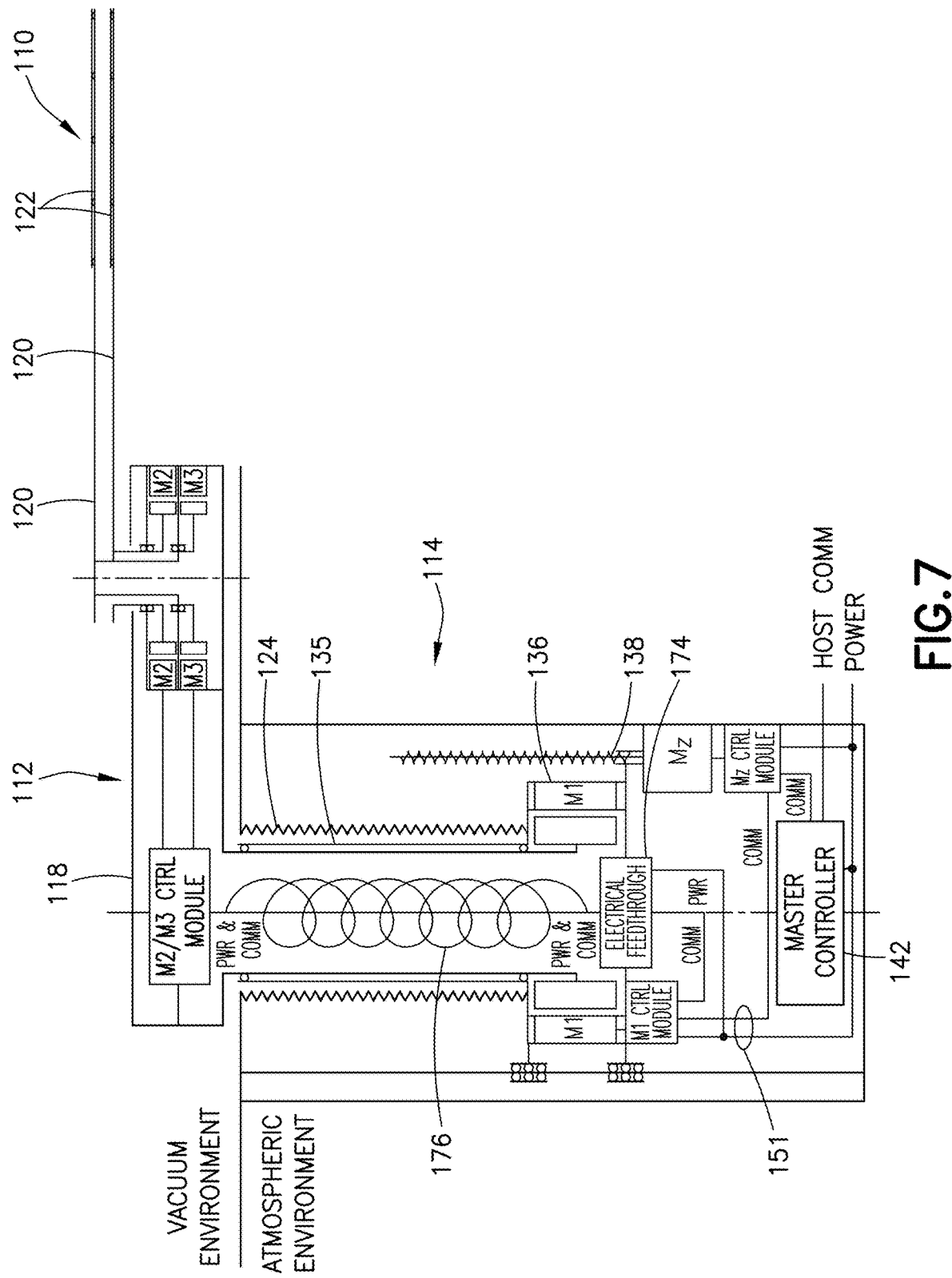

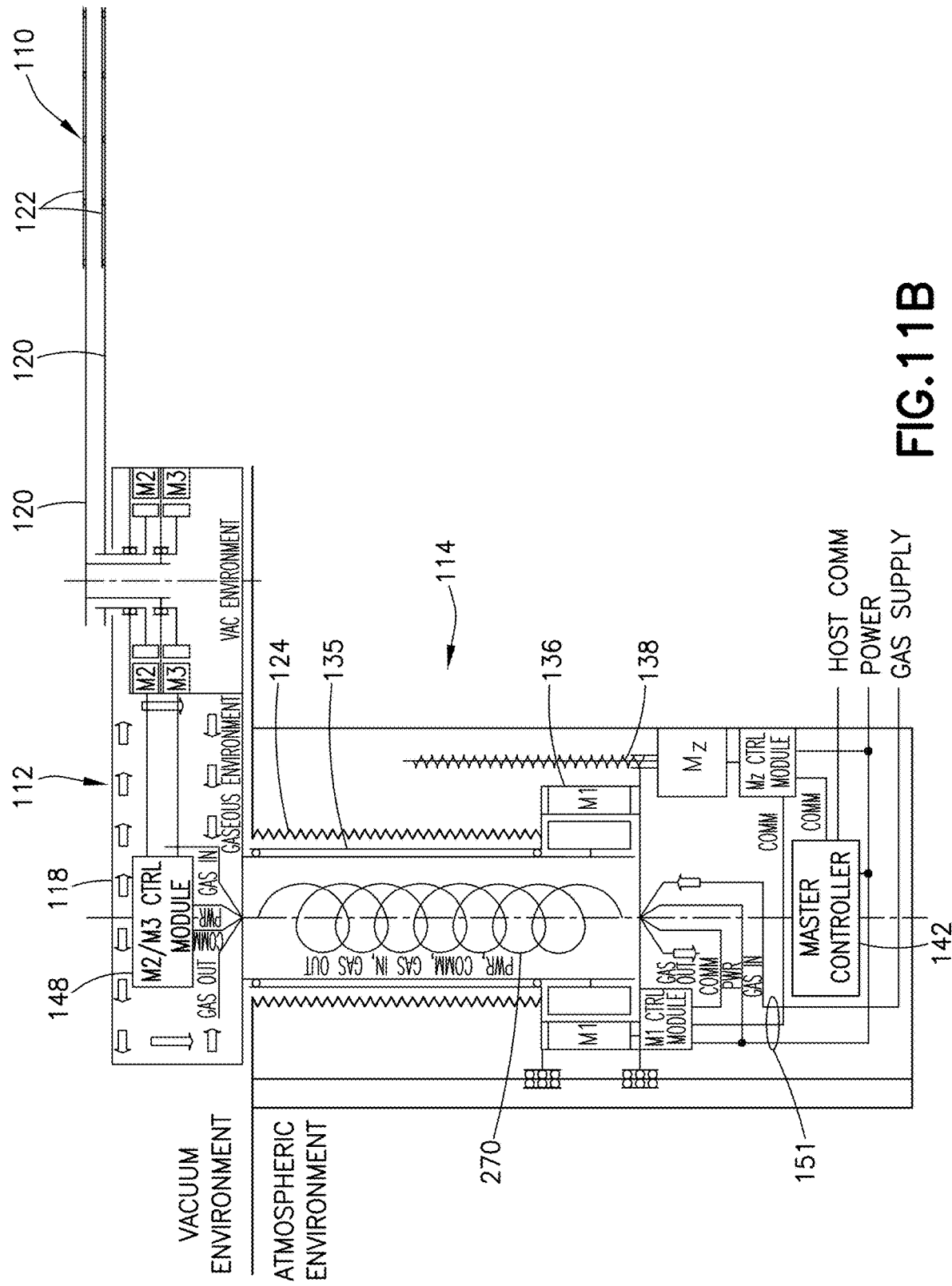

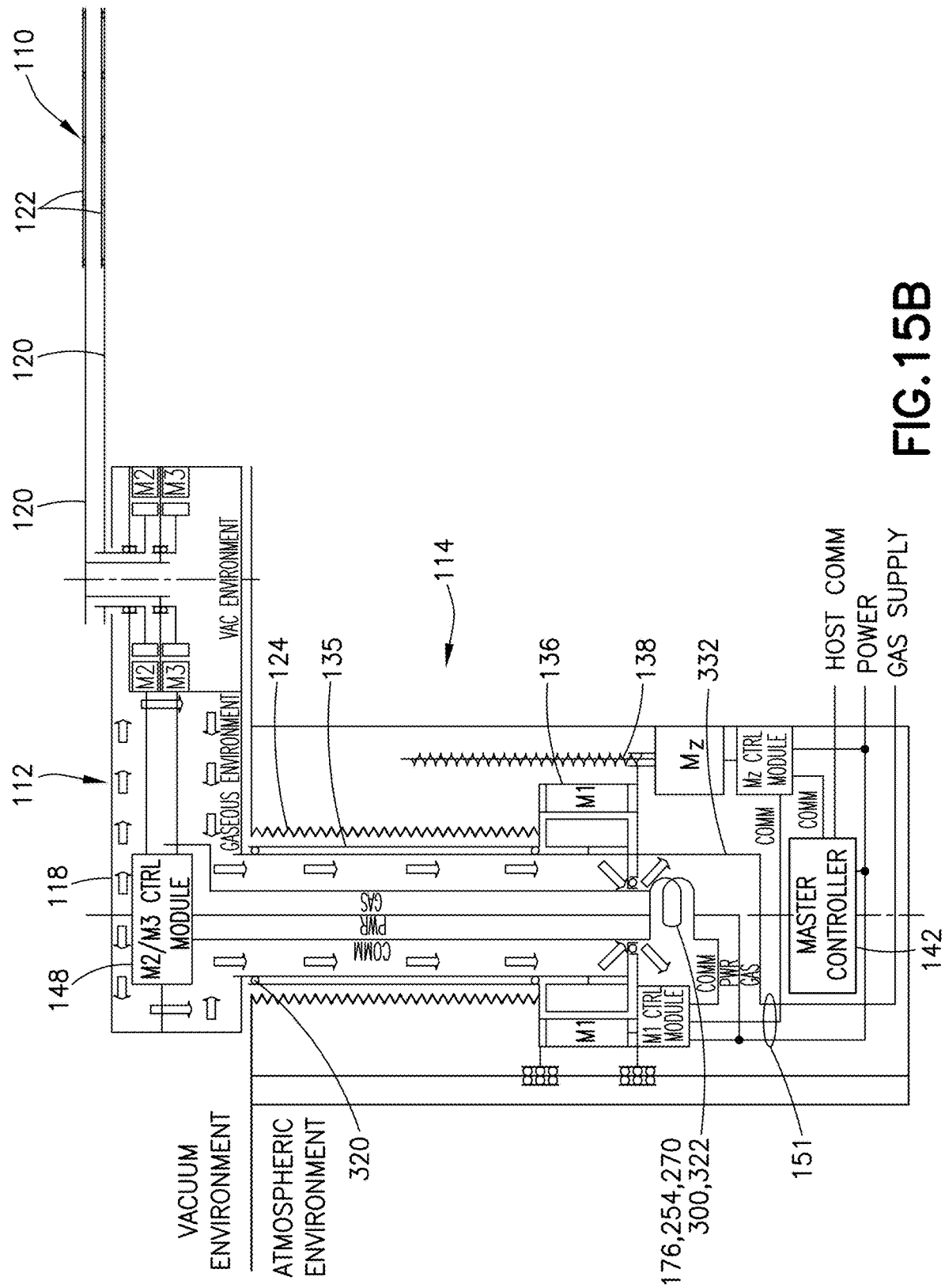

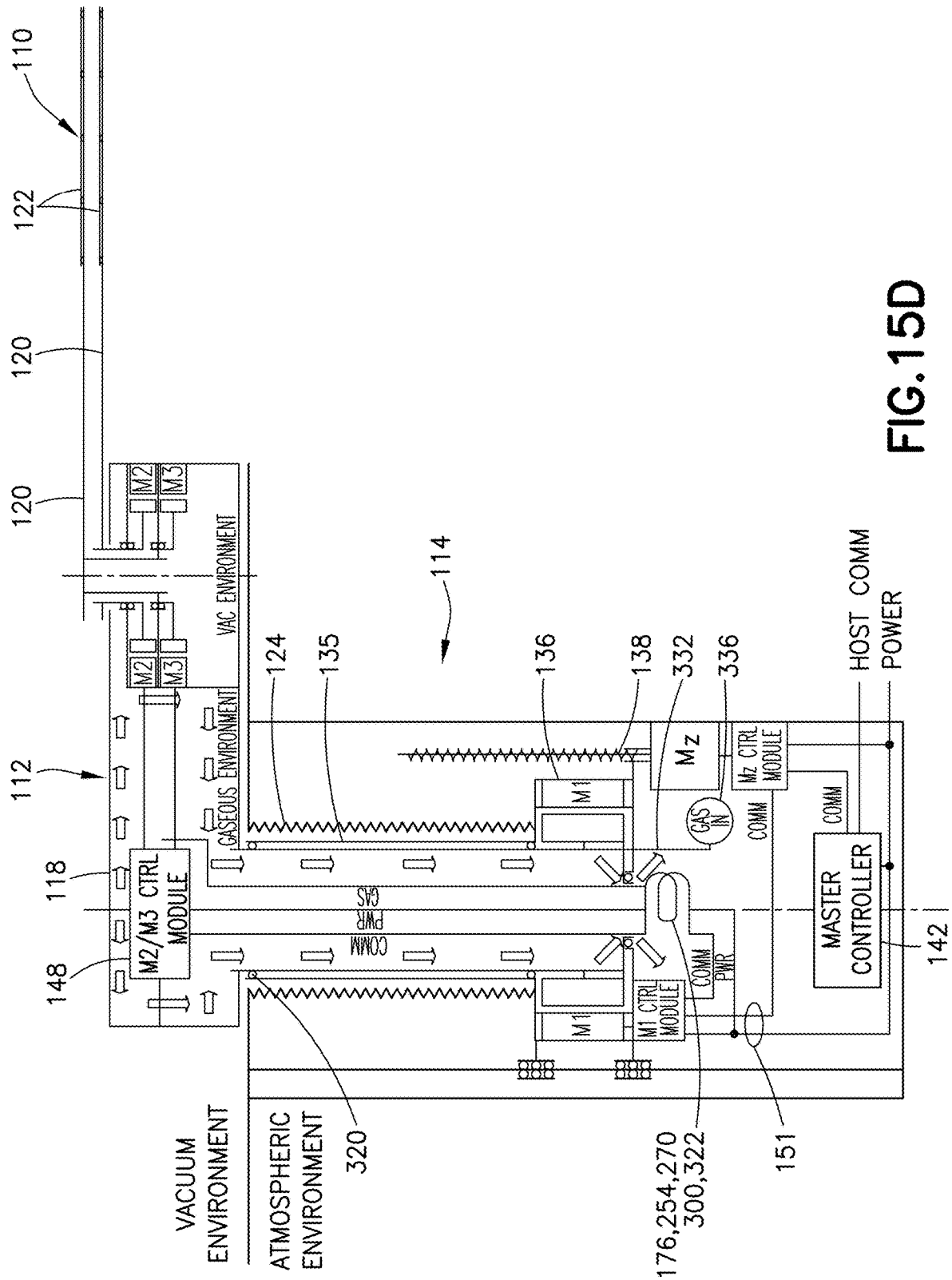

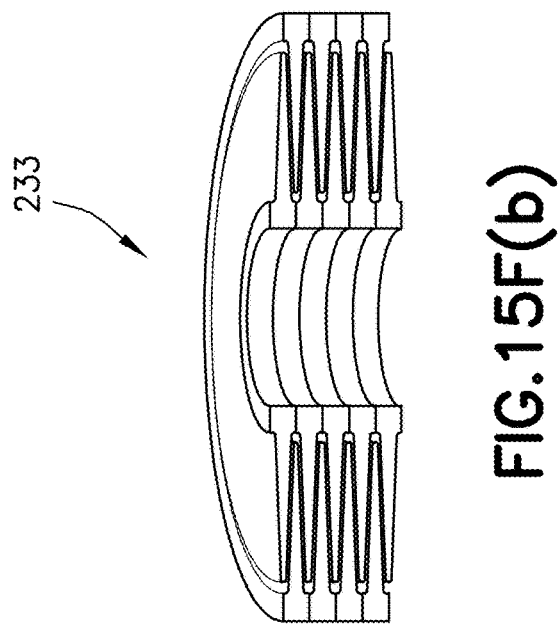
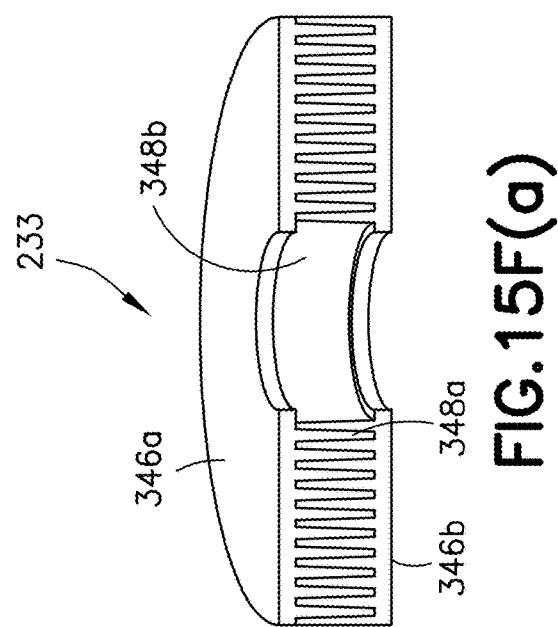
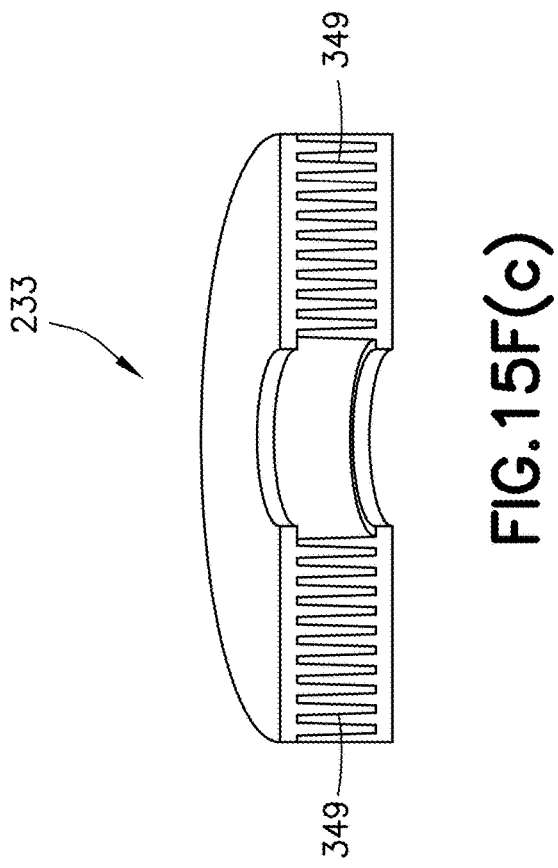
FIG.15F(a)
FIG.15F(b)
FIG.15F(c)

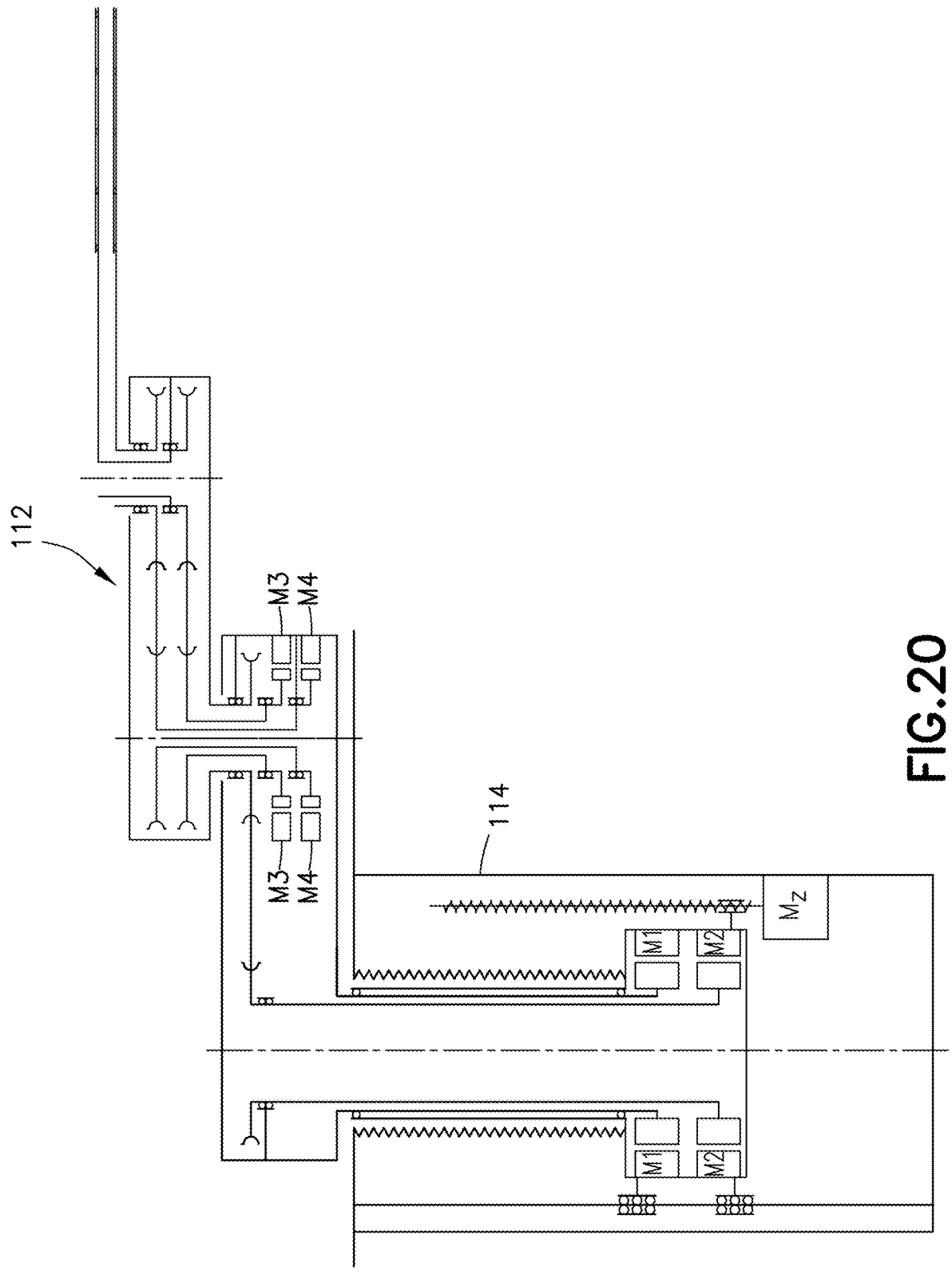

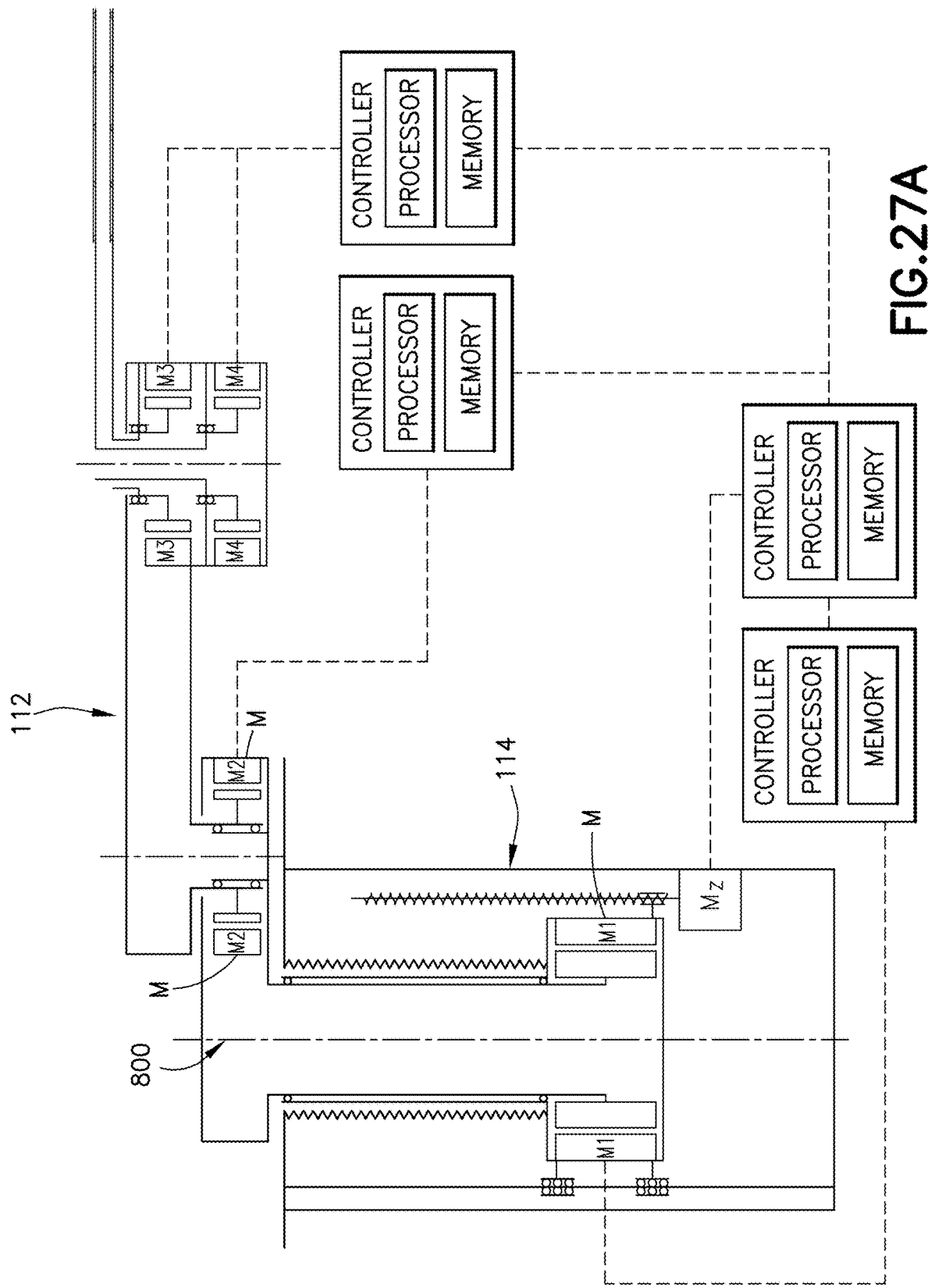

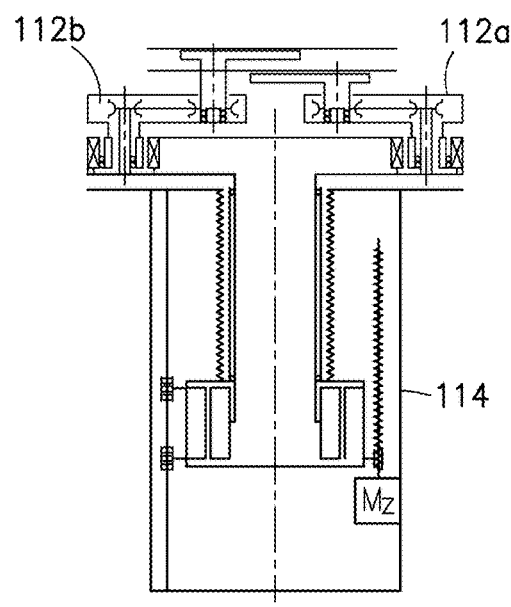
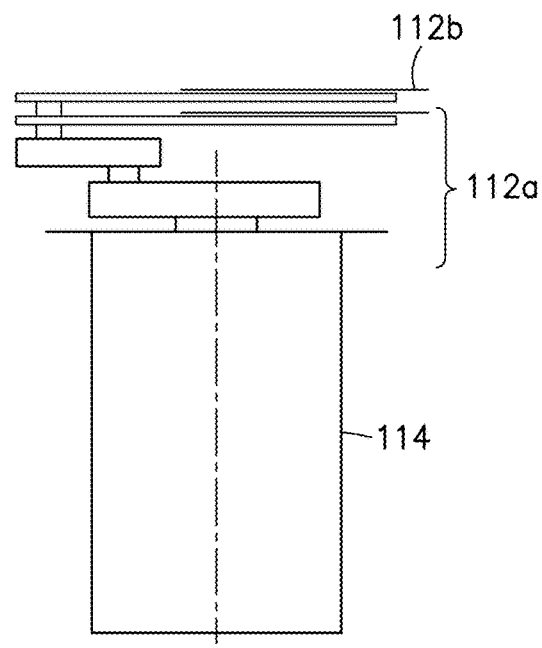
FIG.28A  FIG.28B
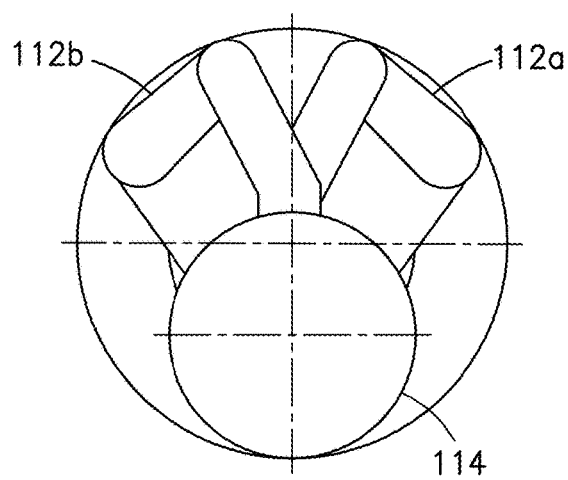
FIG.28C

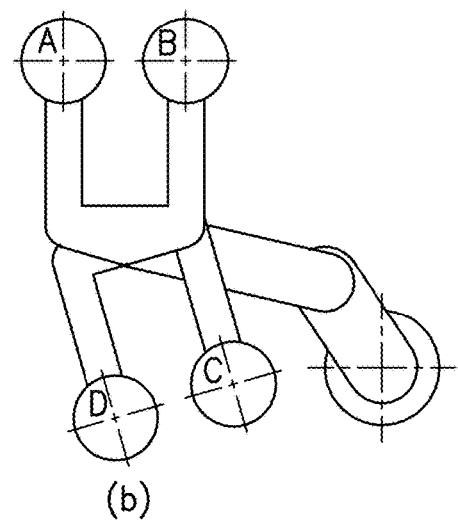
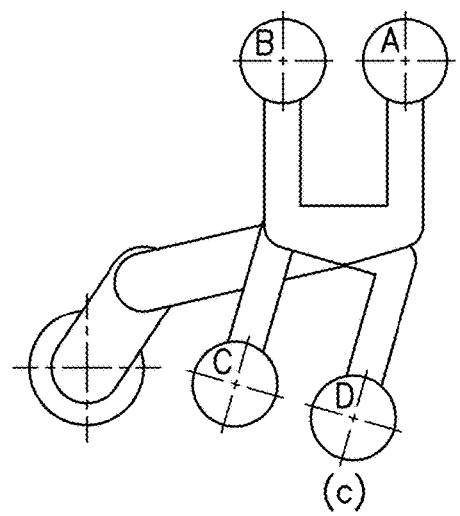
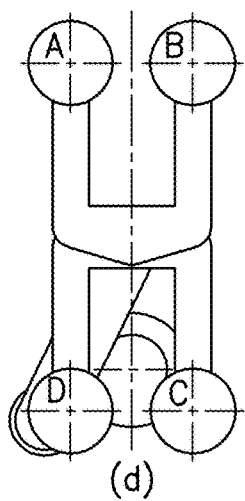
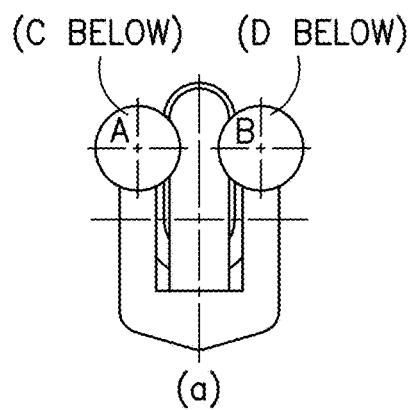
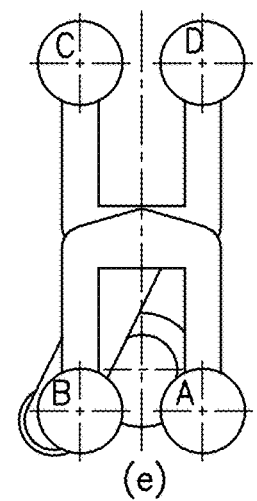
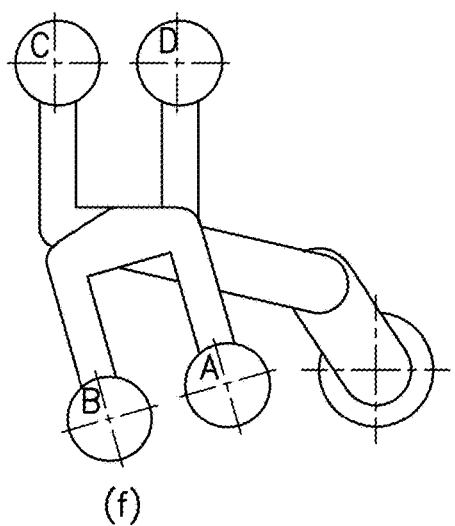
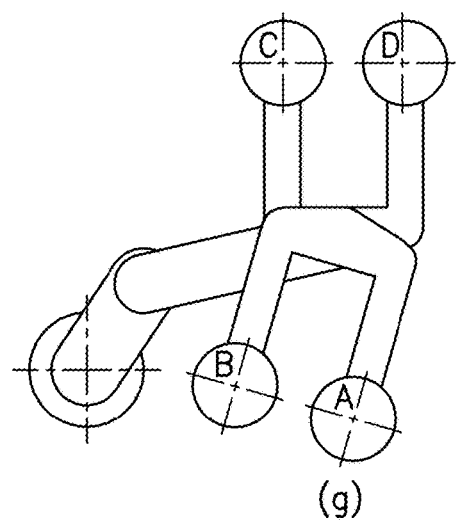
FIG.29B

VACUUM-ENVIRONMENT ROBOT WITH DISTRIBUTED ACTUATORS

CROSS REFERENCE TO RELATED APPLICATION

This application claims priority under 35 USC 119(e) to U.S. Provisional Application No. 63/136,727, filed Jan. 13, 2021, U.S. Provisional Application No. 63/106,074, filed Oct. 27, 2020, U.S. Provisional Application No. 63/048,847, filed Jul. 7, 2020, U.S. Provisional Application No. 63/038,995, filed Jun. 15, 2020, U.S. Provisional Application No. 63/032,797, filed Jun. 1, 2020, U.S. Provisional Application No. 62/984,212, filed Mar. 2, 2020, U.S. Provisional Application No. 62/983,991, filed Mar. 2, 2020, and U.S. Provisional Application No. 62/972,285, filed Feb. 10, 2020, all of which are hereby incorporated by reference in their entireties.

BACKGROUND

Technical Field

The example and non-limiting embodiments relate generally to a robot with distributed actuators and, more particularly, to a material-handling vacuum-environment robot with actuators distributed within the structure of the robot to reduce mechanical complexity and improve performance.

Brief Description of the Prior Developments

A simplified cross-sectional view of an example material-handling vacuum-environment robot with a conventional architecture utilizing centralized actuators is depicted diagrammatically in FIG. 1A. The example robot includes a robot arm, a drive unit, and a control system.

The arm of the example robot includes an upper arm and two forearms, each carrying an end-effector, which are coupled to the upper arm via a coaxial rotary joint (referred to as the elbow joint). The upper arm houses two pulley systems, each configured to actuate one of the two forearms.

The drive unit houses all of the actuators of the robot. The drive unit includes a spindle assembly and a Z-axis mechanism. The Z-axis mechanism is configured to move the spindle assembly up and down using motor $M_Z$. The spindle assembly features three coaxial shafts and three motors, each configured to actuate one of the three shafts. The outer shaft is connected to the upper arm and actuated by motor $M_{T1}$. The middle shaft is connected to the pulley coupled to one of the forearms and actuated by motor $M_{T2}$. The inner shaft is connected to the pulley coupled to the other forearm and actuated by motor $M_{T3}$.

The example robot features a bellows and a cylindrical barrier between the stators and rotors of motors $M_{T1}$, $M_{T2}$, and $M_{T3}$ to contain the vacuum environment in which the arm operates. The bellows is configured to accommodate the up and down motion of the spindle assembly.

The control system receives external inputs, for example, from the user or a host system, reads positions of individual motion axes (motors) from position encoders (not shown in FIG. 1A for simplicity), and processes the information to apply voltages to the motors to perform the desired motion and/or achieve the desired position. The operation of the example robot of FIG. 1A is depicted diagrammatically in FIG. 1B, which shows the example robot in a retracted position and various extended positions.

SUMMARY

In accordance with one aspect, an apparatus comprises a drive; a movable arm connected to the drive, the movable arm comprising a first link connected to the drive at a shoulder, a second link connected to the first link at an elbow, a third link connected to the second link at a wrist, and a fourth link connected to the second link at the wrist; at least one first actuator located in the second link configured to cause a rotation of the third link about the wrist; and at least one second actuator located in the second link configured to cause a rotation of the fourth link about the wrist. One or more of a thermal management, a power distribution, or a communication is effected through the second link.

In accordance with another aspect, a method comprises providing a drive; providing a movable arm connected to the drive, the movable arm comprising a first link connected to the drive at a shoulder, a second link connected to the first link at an elbow, a third link connected to the second link at a wrist, and a fourth link connected to the second link at the wrist; providing at least one first actuator located in the second link configured to cause a rotation of the third link about wrist; and providing at least one second actuator located in the second link configured to cause a rotation of the fourth link about the wrist. One or more of a thermal management, a power distribution, or a communication is effected through the second link.

An apparatus comprises at least one processor; and at least one non-transitory memory including computer program code, the at least one memory and the computer program code configured to, with the at least one processor, cause the apparatus at least to perform: moving an arm connected to a drive, the arm comprising a first link connected to the drive at a shoulder, a second link connected to the first link at an elbow, a third link connected to the second link at a wrist, and a fourth link connected to the second link at the wrist; rotating, by at least one first actuator located in the second link, the third link about the wrist; and rotating, by at least one second actuator located in the second link, the fourth link about the wrist. One or more of a thermal management, a power distribution, or a communication means is effected through the second link.

In accordance with another aspect, an apparatus comprises a drive; a movable arm comprising a first link having a first control and being rotatable about the drive, a second link having a second control and being connected to the first link at a first rotary joint, and at least one third link coupled to the forearm at a second rotary joint; at least one first actuator located in the first link and configured to cause a rotation of the second link about the first rotary joint; at least one second actuator located in the second link and configured to cause a rotation of the at least one third link about the second rotary joint; and at least one active component associated with the at least one third link. One or more of a thermal management, a power distribution, or a communication is effected through the second rotary joint to cause an interaction of the at least one active component with the second control of the second link.

In accordance with another aspect, a method comprises providing a drive; providing a movable arm comprising, a first link having a first control and being connected to and rotatable about the drive, a second link having a second control and being connected to the first link at a first rotary joint, and at least one third link coupled to the forearm at a second rotary joint; providing at least one first actuator located in the first link and configured to cause a rotation of the second link about the first rotary joint; providing at least one second actuator located in the second link and configured to cause a rotation of the at least one third link about the second rotary joint; and providing at least one active component associated with the at least one third link. One or more of a thermal management, a power distribution, or a communication is effected through the second rotary joint to cause an interaction of the at least one active component with the second control of the second link.

In accordance with another aspect, an apparatus comprises a drive; a movable arm connected to the drive, the movable arm comprising, an upper arm rotatably coupled to the drive at a shoulder, the upper arm having a first actuator located within the upper arm, a forearm rotatably coupled to the upper arm, the forearm having a second actuator and a third actuator located within the forearm, a first pair of end-effectors rotatably coupled to the forearm at a rotary joint and configured to be moved by the second actuator, and a second pair of end-effectors rotatably coupled to the forearm at the rotary joint and configured to be moved by the third actuator. The first pair of end-effectors is configured to move independently of the second pair of end-effectors. At least the second actuator and the third actuator are configured to be controlled by a control, where the control is configured to control one or more of a thermal management, a power distribution, or a communication to the first pair of end-effectors and the second pair of end-effectors.

In accordance with another aspect, a method comprises measuring at least one temperature of a respective at least one structural component of a robot; estimating, using the measured at least one temperature, a dimension of the at least one structural component; calculating, based on the estimated dimension of the at least one structural component, a set of joint coordinates that correspond to a desired destination of an end-effector of the robot; calculating, based on the calculated set of joint coordinates, a final destination of the end-effector; determining a trajectory from the calculated final destination of the end-effector to the calculated desired destination of the end-effector; determining a plurality of intermediate points on the determined trajectory; and using the determined plurality of intermediate points on the determined trajectory to control at least one motor causing a movement of the end-effector.

In accordance with another aspect, an apparatus comprises at least one processor; and at least one non-transitory memory including computer program code, the at least one memory and the computer program code configured to, with the at least one processor, cause the apparatus at least to perform: measuring at least one temperature of a respective at least one structural component of a robot; estimating, using the measured at least one temperature, a dimension of the at least one structural component; calculating, based on the estimated dimension of the at least one structural component, a set of joint coordinates that correspond to a desired destination of an end-effector of the robot; calculating, based on the calculated set of joint coordinates, a final destination of the end-effector; determining a trajectory from the calculated final destination of the end-effector to the calculated desired destination of the end-effector; determining a plurality of intermediate points on the determined trajectory; and using the determined plurality of intermediate points on the determined trajectory to control at least one motor causing a movement of the end-effector.

In accordance with another aspect, a non-transitory program storage device readable by a machine, tangibly embodying a program of instructions executable by the machine for performing operations, comprises the operations: measuring at least one temperature of a respective at least one structural component of a robot; estimating, using the measured at least one temperature, a dimension of the at least one structural component; calculating, based on the estimated dimension of the at least one structural component, a set of joint coordinates that correspond to a desired destination of an end-effector of the robot; calculating, based on the calculated set of joint coordinates, a final destination of the end-effector; determining a trajectory from the calculated final destination of the end-effector to the calculated desired destination of the end-effector; determining a plurality of intermediate points on the determined trajectory; and using the determined plurality of intermediate points on the determined trajectory to control at least one motor causing a movement of the end-effector.

BRIEF DESCRIPTION OF THE DRAWINGS

The foregoing aspects and other features are explained in the following description, taken in connection with the accompanying drawings, wherein:

FIGS. 2A and 2B are schematic representations of example embodiments of material-handling vacuum-environment robots with distributed actuators;

FIGS. 4A and 4B are schematic representations of heat transfer via cylindrical surfaces in a robot;

FIG. 7 is schematic representation of an example robot in which power and communication signals are routed from an atmospheric environment to a vacuum environment using a multi-channel electrical feedthrough and a vacuum-compatible service loop;

FIG. 15B is a schematic representation of the robot of FIG. 14 in which a gas supply tube is utilized to deliver gas to the upper arm, the gas supply tube being stationary with respect to the housing;

FIG. 15D is a schematic representation of an example robot utilizing a gas supply external to the robot;

FIGS. 15F(a), 15F(b), and 15F(c) are schematic representations of example elbow rotary thermal coupling arrangements;

FIG. 15L(b) is a schematic representation of a rotor and stator of a motor of an example robot, the motor having magnetic shielding;

FIGS. 20 and 21 are schematic representations of configurations illustrating displacements of motors between the robot arms and the drive unit;

FIGS. 24 to 27A are schematic representations of example robots in which power, communication, and/or cooling arrangements are extended to moving joints between motors in a robot arm and a first link of the robot arm;

FIGS. 28A to 28C are schematic representations of an example robot having two arms and incorporating various combinations of power, communication, cooling arrangements, and control system architectures;

FIGS. 29A and 29B are schematic representations of operations of an example robot showing various retracted positions and extended positions of arms of various robots.

DETAILED DESCRIPTION OF EMBODIMENTS

Figure 1A:
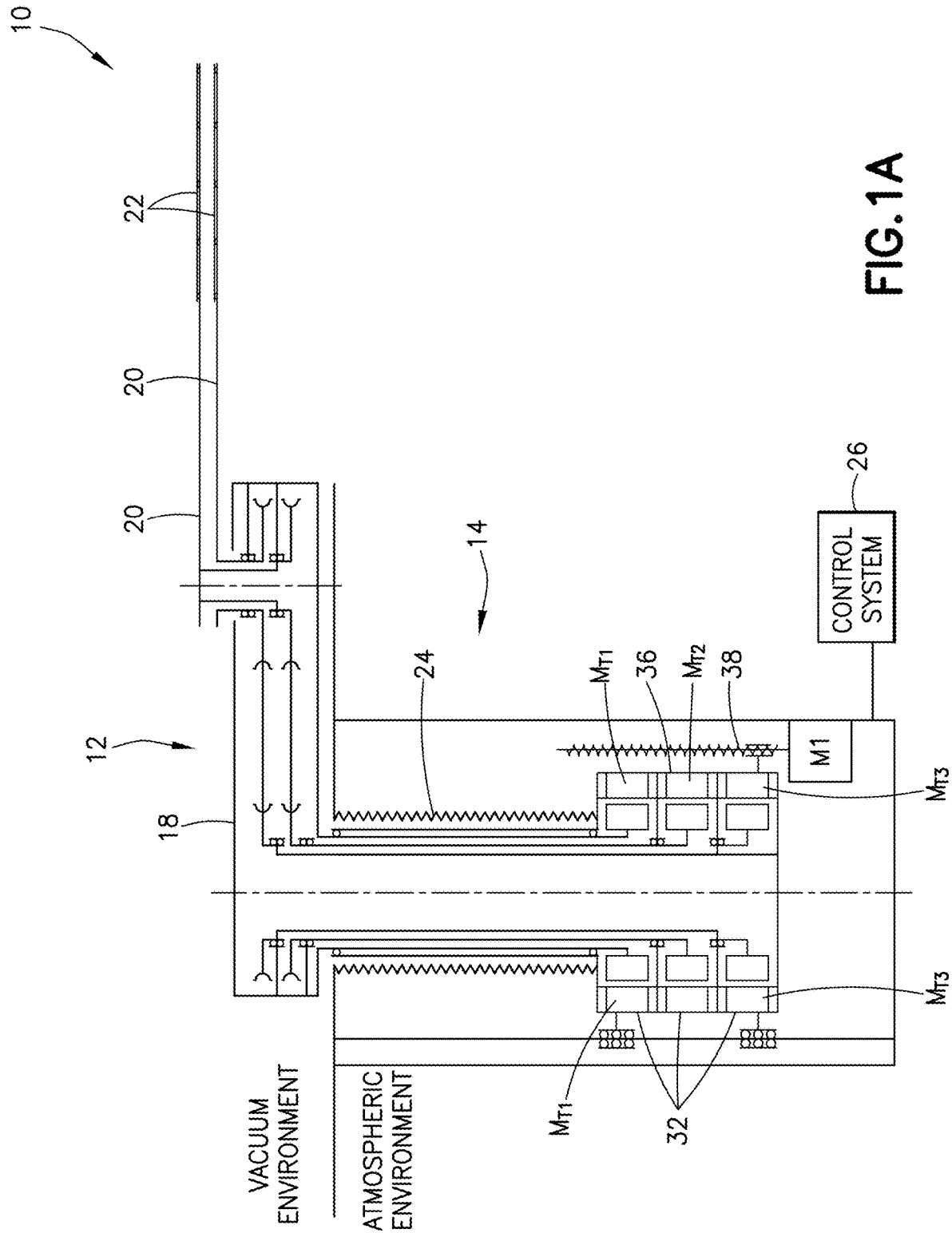
FIG. 1A is a schematic representation of a material-handling vacuum-environment robot with a conventional architecture.
Figure 1B:
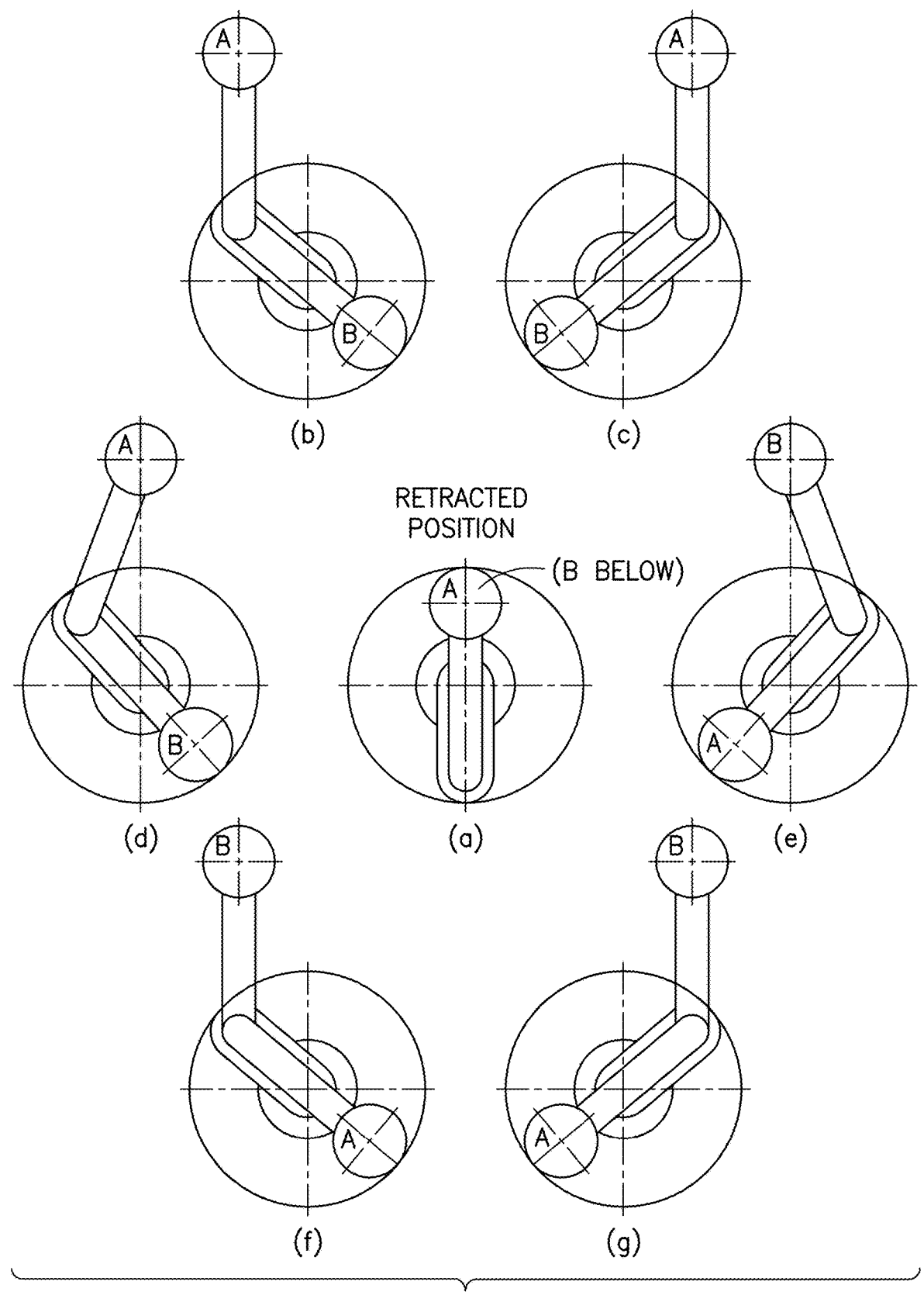
FIG. 1B is a schematic representation of the robot of FIG. 1A in a retracted position and in various extended positions.

Referring to FIG. 1A, one example robot is shown generally at 10 and is hereinafter referred to as "robot 10." Robot 10 comprises a robot arm 12 coupled to a drive unit 14, the robot arm 12 being located and operable in a vacuum environment and the drive unit 14 being located in an atmospheric environment. The robot arm 12 comprises an upper arm 18, at least one forearm 20 on the upper arm 18, and corresponding end-effectors 22 on each of the forearms 20, the end-effectors 22 being configured to accept payloads. The drive unit 14 comprises a spindle assembly 36 coupled to the upper arm 18, a Z-axis mechanism 38 for moving the spindle assembly 36 up and down, and one or more actuators 32 in the form of motors. A bellows 24 may be used to contain the vacuum environment in the space where the robot arm 12 operates. A control system 26 is used to control operations of the robot arm 12. The robot arm 12 may extend from a retracted position into various extended positions, as indicated in FIG. 1B.

Robot 10 can be viewed as mechanically complex as it employs a large number of precision mechanical components, such as bearings and pulleys, which limits the performance (such as positioning accuracy) of the robot. For this reason, the architecture with centralized actuators does not scale well to configurations with more axes of motion, which are demanded by a growing number of applications (see examples below).

The objective of the present invention is to relocate some of the actuators 32 (motors) from the drive unit 14 to the robot arm 12 in order to reduce mechanical complexity and improve performance. Since the robot arm 12 operates in the vacuum environment, multiple technical challenges need to be addressed, including sealing, power delivery, communication, and heat removal (cooling).

Figure 2A:
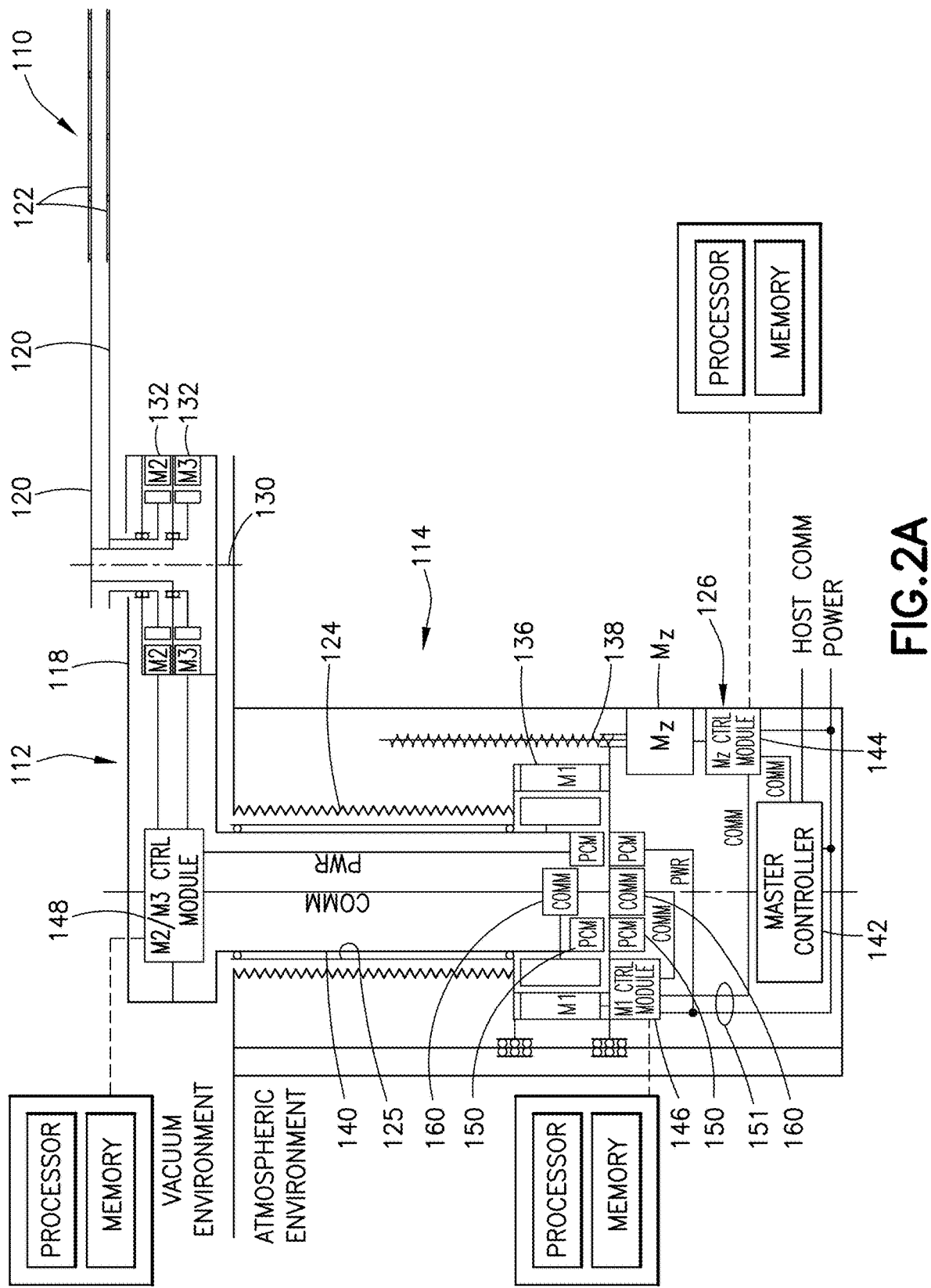

Referring to FIG. 2A, a robot with distributed actuators is shown generally at 110 and is hereinafter referred to as "robot 110." Robot 110 is one example embodiment of a material-handling vacuum-environment robot. As shown, the example robot 110 comprises a robot arm 112, a drive unit 114, and a control system 126.

In this particular example, the robot arm 112 comprises an upper arm 118 and two forearms 120, each carrying an end-effector 122 (configured to accept payload), which may be coupled to the upper arm 118 via a coaxial rotary joint 130 (referred to as the elbow joint). The upper arm may house two motors (actuators 132), each coupled to one of the two forearms 120.

The drive unit 114 comprises a spindle assembly 136 and a Z-axis mechanism 138. The Z-axis mechanism 138 may be configured to move the spindle assembly 136 up and down, for example, via a ball-screw, using a motor Mz. The spindle assembly 136 may include a drive shaft 140 connected to the upper arm 118 and actuated by a motor M1.

The drive unit 114 of the example robot 110 may also feature a bellows 124 and a cylindrical barrier 125 between the stator and rotor of motor M1 to contain the vacuum environment which may be present in the space where the robot arm 112 operates. The bellows 124 may be configured to accommodate the up and down motion of the spindle assembly 136. Alternatively, no barrier between the stator and rotor of the motor M1 may be used, and the stator of motor M1 may be located in the vacuum environment.

The control system 126 may comprise a master controller 142, one or more control modules 144 located in a stationary manner in the drive unit 114, one or more control modules 146 attached to the spindle assembly 136, and one or more control modules 148 located in the robot arm 112. The master controller 142 and the control modules 144, 146, 148 may be connected by a communication network. U.S. Pat. No. 10,538,000, which is hereby incorporated by reference in its entirety, describes an actuator on an arm which is sealed in an airtight vessel. U.S. Pat. No. 10,224,232, which is hereby incorporated by reference in its entirety, describes a motor on an arm. U.S. Pat. No. 10,569,430, which is hereby incorporated by reference in its entirety, discloses heat transfer in a robot drive and an arm as well as an airtight enclosure around the motor. U.S. Pat. No. 10,424,498, which is hereby incorporated by reference in its entirety, discloses a service loop to provide coolant. U.S. Pat. No. 10,541,167, which is hereby incorporated by reference in its entirety, discloses heat transfer.

The actuators 132 in the robot arm 112 (motors M2 and M3) may be controlled by the control module 148 located conveniently in close proximity within the upper arm 118. The actuator(s) located in the spindle assembly 136 of the drive unit 114, in this particular example motor M1, may be controlled by the control module 146 attached to the spindle assembly 136, which may move up and down with the spindle assembly 136. The motor Mz driving the Z-axis mechanism 138 may be controlled by the stationary control module 144 located, for example, at the base of the drive unit 114. The control modules 144, 146, 148 may be coordinated, for instance, over a communication network, by the master controller 142 which may be also located, for example, at the base of the drive unit 114.

The upper arm 118, including an internal volume thereof, may be located in and be subject to the vacuum environment. The motors M2/M3 associated with the control module 148 may be enclosed in a vacuum vessel, which may be filled with air, another mix of gases, or a single gas, for instance, nitrogen. Alternatively, or in combination, the internal volume of the enclosure of the M2/M3 motors and control module 148 may be potted to enhance heat transfer and eliminate a presence of gas in the robot arm 112. Similarly, the stators of M2 and M3 may also be enclosed in a sealed enclosure filled with air, another mix of gases or a single gas, or the internal volume of the enclosure of motors M2 and M3 may be potted to enhance heat transfer and eliminate a presence of gas in the robot arm 112. Alternatively, the stators of M2 and M3 and the M2/M3 control module 148 may be packaged into a combined unit, which may be sealed (for example, using welding, vacuum seals, or any other suitable method) in an enclosure. The internal volume of the enclosure may again be filled with air, another mix of gases, or a single gas, or it may be potted. In a similar alternative arrangement, motors M2 and M3 may be controlled by separate control modules, which may allow for each stator and the corresponding control module to be packaged into a combined unit in a manner outlined above. As another alternative, motors M2 and M3 may be in the vacuum environment in their entirety.

As another example, referring to FIG. 2B, an internal volume 111 of the upper arm 118 may be sealed from the vacuum environment and filled with air, another mix of gases, or a single gas, for instance, nitrogen. As indicated, the internal volume 111 of the upper arm 118 may further extend into the drive shaft 140, which may be sealed at the lower end, forming a sealed cavity (hatched in FIG. 2B) that can conveniently house electromechanical components and allow for their connectivity in a suitable gaseous environment (as opposed to vacuum). As an example, the sealed cavity may house the M2/M3 control module, a portion of the rotary power coupling module (PCM), and a portion of the optical communication module (OCM). The internal volume 111 of the sealed cavity may also house the stators of motors M2 and M3, in which case a cylindrical barrier 115 between the stators and rotors of the motors M2 and M3 may be utilized to separate the internal volume 111 of the upper arm 118 from the external vacuum environment. Alternatively, the stators of motors M2 and M3 may be located in the vacuum environment and an electrical feedthrough may be used to connect them with the M2/M3 control module located inside the sealed cavity.

In the examples of both FIG. 2A and FIG. 2B, each of the control modules 144, 146, 148 may comprise, for example, at least one respective processor (PROCESSOR) and at least one respective memory (MEMORY) storing a program of instructions, for example, on software. In another example embodiment, one or more of the control modules 144, 146, 148 may comprise a servo motor controller.

The drive unit 114 of the example robot 110 may feature the service loop 151, which may be configured to electrically connect the spindle assembly 136 with the stationary portion of the drive unit 114. The service loop 151 may be used for power and signal transmission as well as for electrical grounding purposes. If applicable, the service loop 151 may also be used to channel liquid coolant to and from the spindle assembly 136.

The example robot 110 may also employ a rotary power coupling (denoted as PCM), for instance an inductive power coupling 150, configured to transmit power from the spindle assembly 136 to the upper arm 118 in a contactless manner. An example power coupling is described in U.S. Patent Application Publication Nos. 2016/0229296, 2018/0105044, and 2018/0105045, which are hereby incorporated by reference in their entireties. A simplified cross-sectional view of a suitable example configuration of an inductive power coupling 150 is depicted diagrammatically in FIG. 4D. The inductive power coupling 150 (or any other PCM) may be utilized to supply electric power to the control module 148 (M2/M3) and directly or indirectly to other active devices, such as position encoders and other sensors, in the robot arm 112.

The electronics associated with the inductive power coupling 150, such as an AC source on the stationary side and a rectifier with a filter on the moving side of the inductive power coupling 150, may be in the form of separate modules, for instance, printed circuit boards. Alternatively, the electronics may be integrated into the power coupling or the electronics may be integrated into other electronic assemblies, such as the M1 control module and the M2/M3 control module.

The example robot 110 may further feature an optical communication link 160. In this particular example, the optical communication link 160 may include two optical communication modules (also denoted as OCM), one stationary with respect to the housing of the spindle assembly 136 and the other rotating together with the upper arm 118. A simplified cross-sectional view of a suitable example configuration of an optical communication link 160 is depicted diagrammatically in FIG. 4E. The two portions of the optical communication link 160 may be maintained in alignment utilizing the bearing of the rotary joint of the robot 110, or an additional bearing may be integrated into the optical communication link 160 to maintain a high degree of alignment of the two modules of the optical communication link 160 regardless of potential compliance of the structure of the robot 110 under various static and dynamic load conditions. The optical communication link 160 may facilitate contactless data transfer between the spindle assembly 136 and the upper arm 118. As an example, the optical communication link 160 may be incorporated into the communication network of the control system and may facilitate bidirectional data transfer to and from the control module 148 (M2/M3).

Figure 3A:
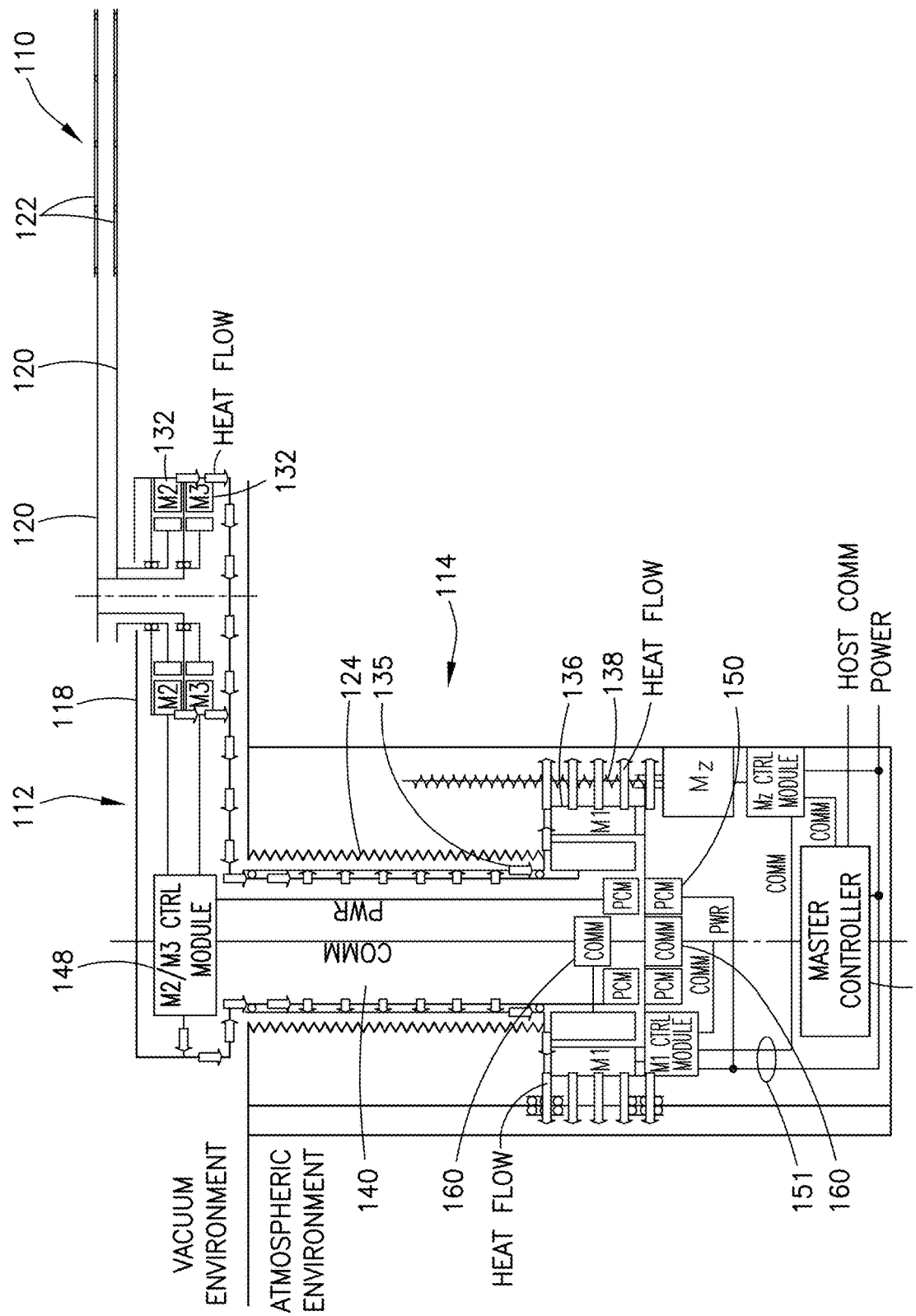
FIGS. 3A to 3C are schematic representations of a robot showing heat transfer aspects.

Referring to FIG. 3A, motors M2 and M3 as well as the M2/M3 control module 148 may be heat-sunk to the upper arm 118. In this arrangement, the heat produced by motors M2 and M3 as well as the M2/M3 control module 148 may be transferred into the upper arm 118, conducted to the drive shaft 140, radiated to a neck 135 of the spindle assembly 136, and conducted to a housing of the spindle assembly 136. The housing of the spindle assembly 136 may be cooled, for instance, by forced air flow. The heat transfer path (HEAT FLOW) is depicted by arrows in FIG. 3A.

Figure 3B:
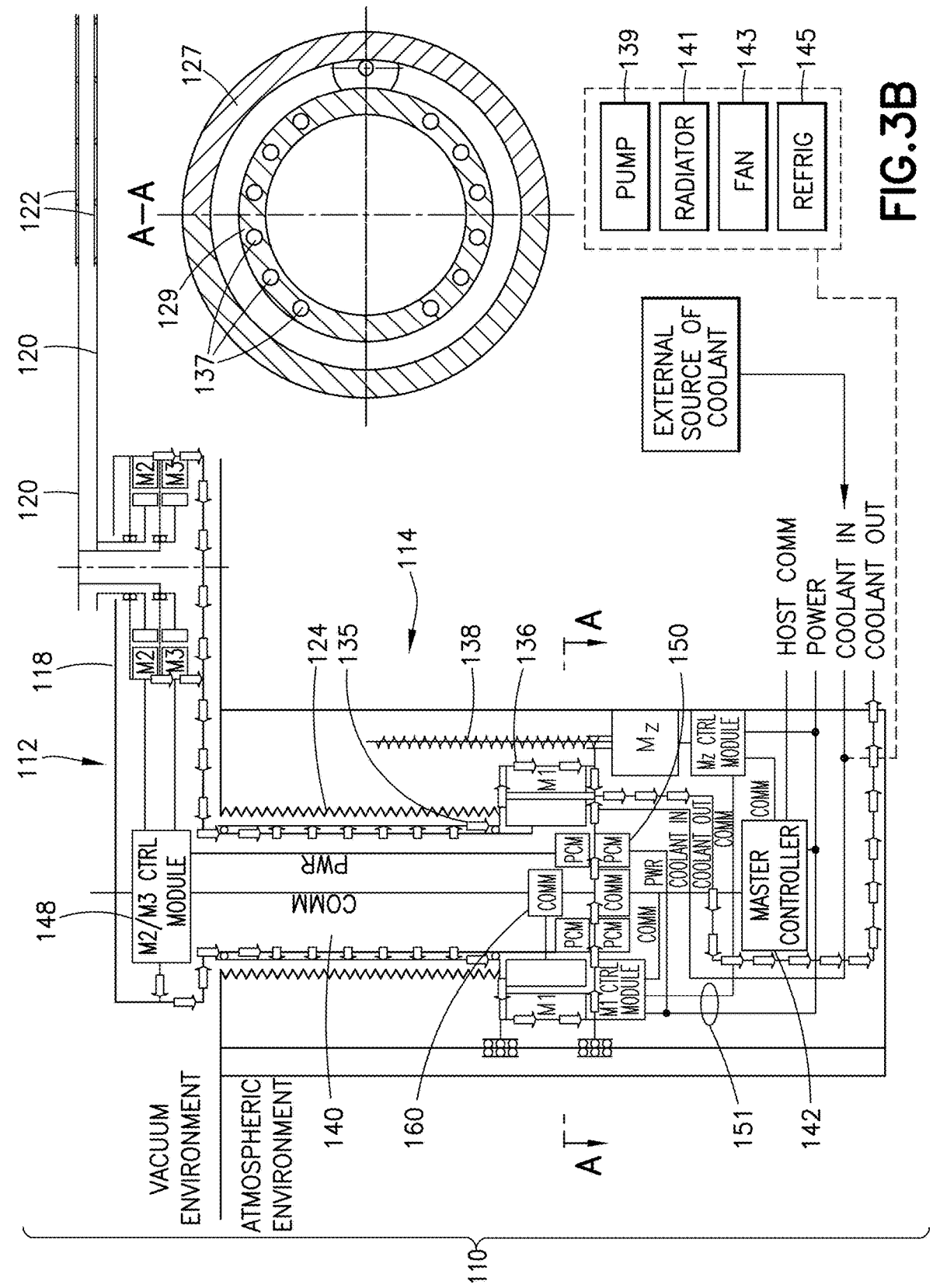

Alternatively, in order to reduce the temperature at the neck 135 of the spindle assembly 136 and achieve more effective heat transfer between the drive shaft 140 that drives the upper arm 118 and the neck 135 of the spindle assembly 136, the spindle assembly 136 and/or the neck 135 of the spindle assembly 136 may be liquid cooled, as illustrated diagrammatically in FIG. 3B. For example, the housing of the spindle assembly 136 (housing 129) may be located in the frame (frame 127) of the drive unit 114 with cooling channels 137 extending through walls of the housing 129. As an example, the liquid cooling system may be of an open-loop configuration where a liquid, such as water, is supplied to the robot 110 from an external source. As another example, the liquid cooling system may be of a closed-loop configuration where a liquid, such as water, is circulated internally within the robot 110. The closed-loop cooling system may include a pump 139 configured to force the liquid through the cooling system. A radiator 141 with or without a fan 143 may be utilized to extract heat from the liquid. Alternatively, a refrigeration unit 145 may be employed to lower the temperature of the liquid. If the cooling system is of a closed-loop configuration, any or all of the pump 139, the radiator 141, the fan 143, and the refrigeration unit 145 may be in a line of the cooling system, for example, internal to the robot 110.

Figure 3C:
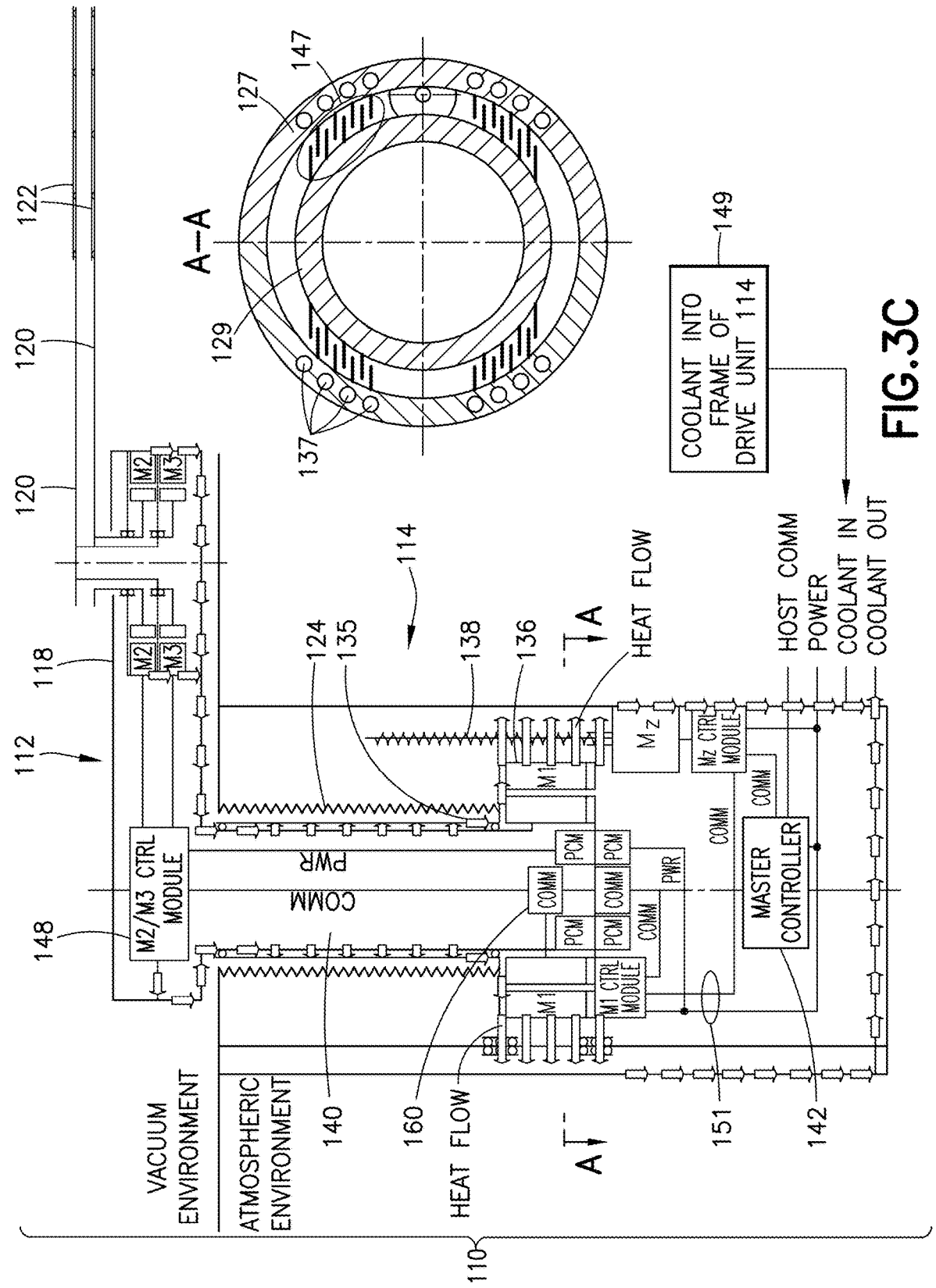

Referring to FIG. 3C, as an alternative to liquid cooling of the spindle assembly 136, in particular to achieve more effective heat removal from the spindle assembly 136 when the ambient temperature around the drive unit 114 of the robot 110 is elevated, the frame 127 of the drive unit 114 of the robot 110 may be liquid cooled by pumping liquid coolant into the frame 127, as in 149. The cooling channels 137 may extend through the frame 127. As indicated in FIG. 3C, the spindle assembly 136 and the frame 127 of the drive unit 114 may feature interleaving features, for example, fins 147 extending between an inner wall of the frame 127 and an outer wall of the housing 129 of the spindle assembly 136, configured to increase the effective area available for heat transfer while allowing for vertical motion of the spindle assembly 136 with respect to the frame of the drive unit 114 of the robot 110. Again, the liquid cooling system may be, for instance, of an open-loop configuration where a liquid, such as water, is supplied to the robot 110 from an external source. As another example, the liquid cooling system may be of a closed-loop configuration where a liquid, such as water, is circulated internally within the robot 110. The closed-loop cooling system may include a pump configured to force the liquid through the cooling system. A radiator with or without a fan may be utilized to extract heat from the liquid. Alternatively, a refrigeration unit may be employed to lower the temperature of the liquid.

Figure 4A:
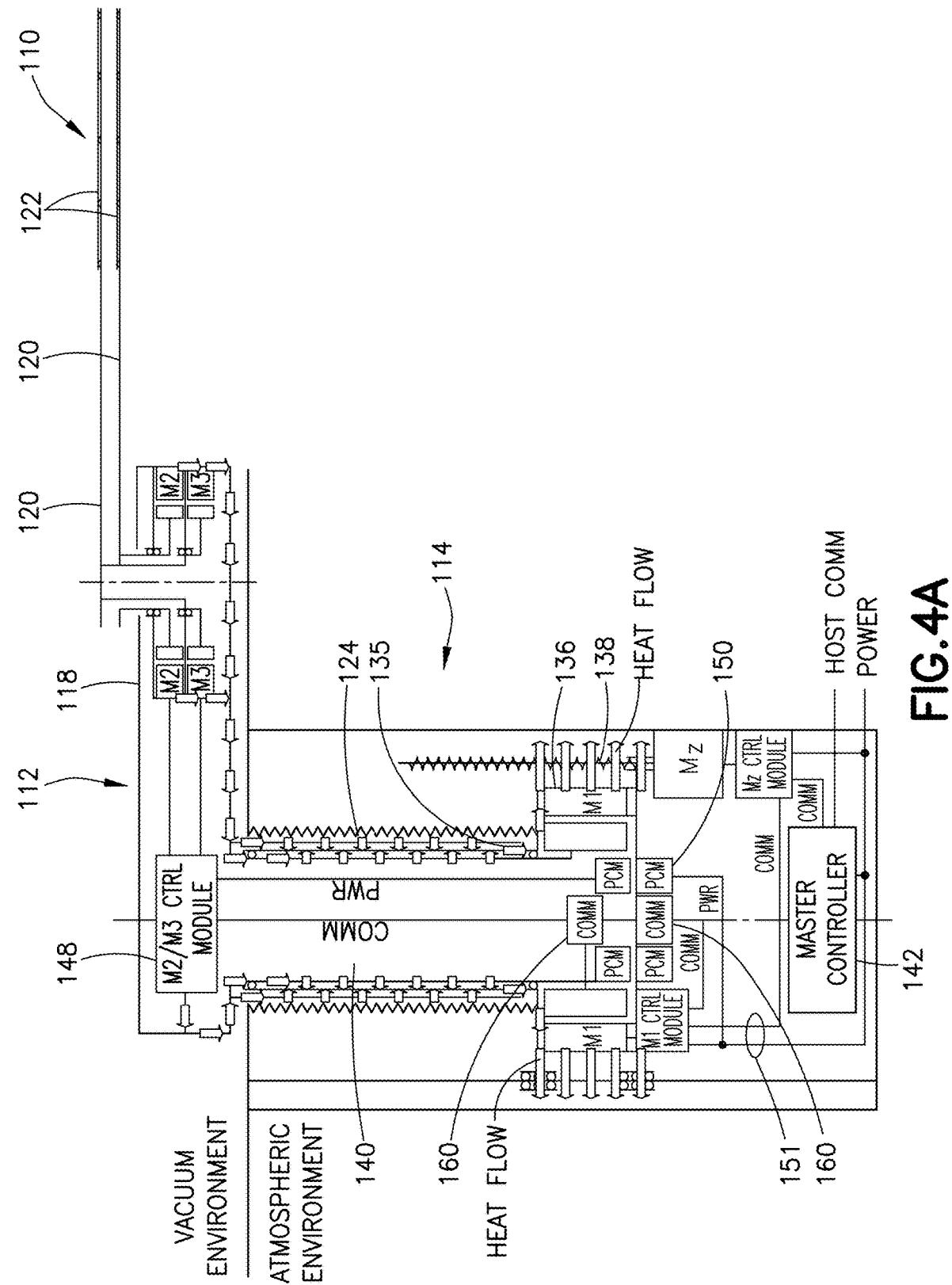

Referring to FIGS. 4A and 4B, the heat transfer between the drive shaft 140 that drives the upper arm 118 and the neck 135 of the spindle assembly 136 may be enhanced by introducing another cylindrical surface area on the outside surface 131 of the neck 135, as in FIG. 4A, and/or on the inside surface 133 of the drive shaft 140, as illustrated in FIG. 4B. Again, the heat transfer path is depicted by arrows (HEAT FLOW) in FIGS. 4A and 4B. Alternatively, multiple interleaved cylindrical and/or planar features connected in an alternating pattern to the housing of the spindle assembly 136 and the upper arm 118 may be employed to further increase the effective surface available for heat transfer from the upper arm 118 to the housing of the spindle assembly 136.

Figure 4C:
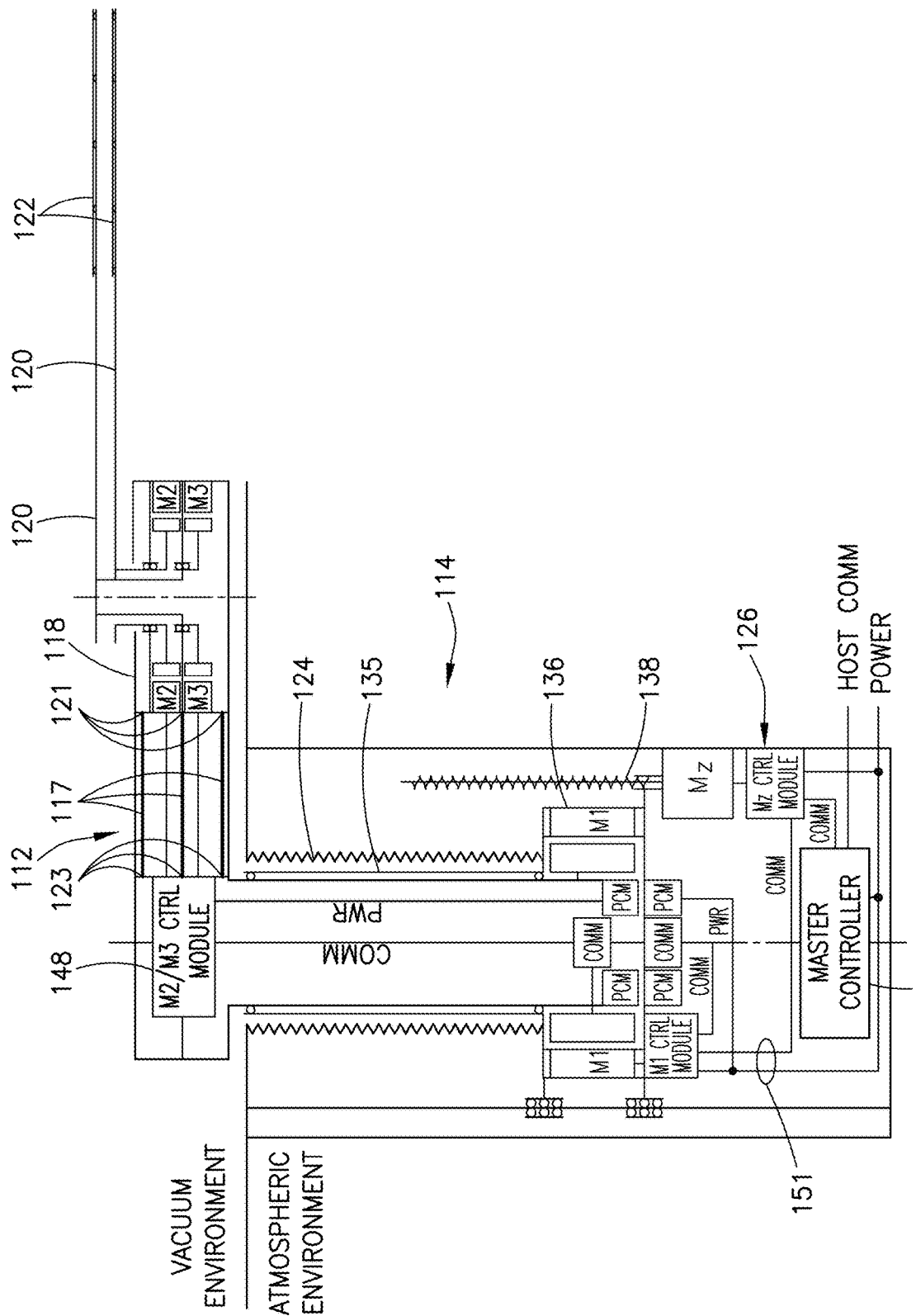
FIG. 4C is a schematic representation of heat transfer via heat pipes in a robot.

Referring to FIG. 4C, heat transfer through the robot arm 112 may be improved by the use of one or more heat pipes 117. A heat pipe is a heat-transfer device that combines the principles of thermal conductivity and phase transition to transfer heat between two thermally conductive interfaces. The heat pipe 117 may comprise a sealed tube-like enclosure with a hot interface 121 at one end and a cold interface 123 at the other end, a wick structure, and a working fluid. The principle of operation of the heat pipe 117 can be described as follows: At the hot interface 121, the working fluid in a liquid state contacts the thermally conductive hot interface and turns into a vapor by absorbing heat from the hot interface 121. The vapor then travels along the heat pipe 117 to the cold interface 123 where it condenses back into a liquid state, releasing latent heat. This process results in a high effective thermal conductivity between the hot and cold interfaces of the heat pipe 117.

The heat pipe(s) 117 may be configured to transfer heat produced by motors M2 and M3 in the elbow area of the upper arm 118 to the shoulder area of the upper arm 118 (where the heat may be removed from the upper arm 118, for example, via radiation to the neck 135 of the spindle assembly 136), effectively reducing the effective thermal resistance between the two areas and improving the effective thermal conductivity between the two areas.

Figure 4D:
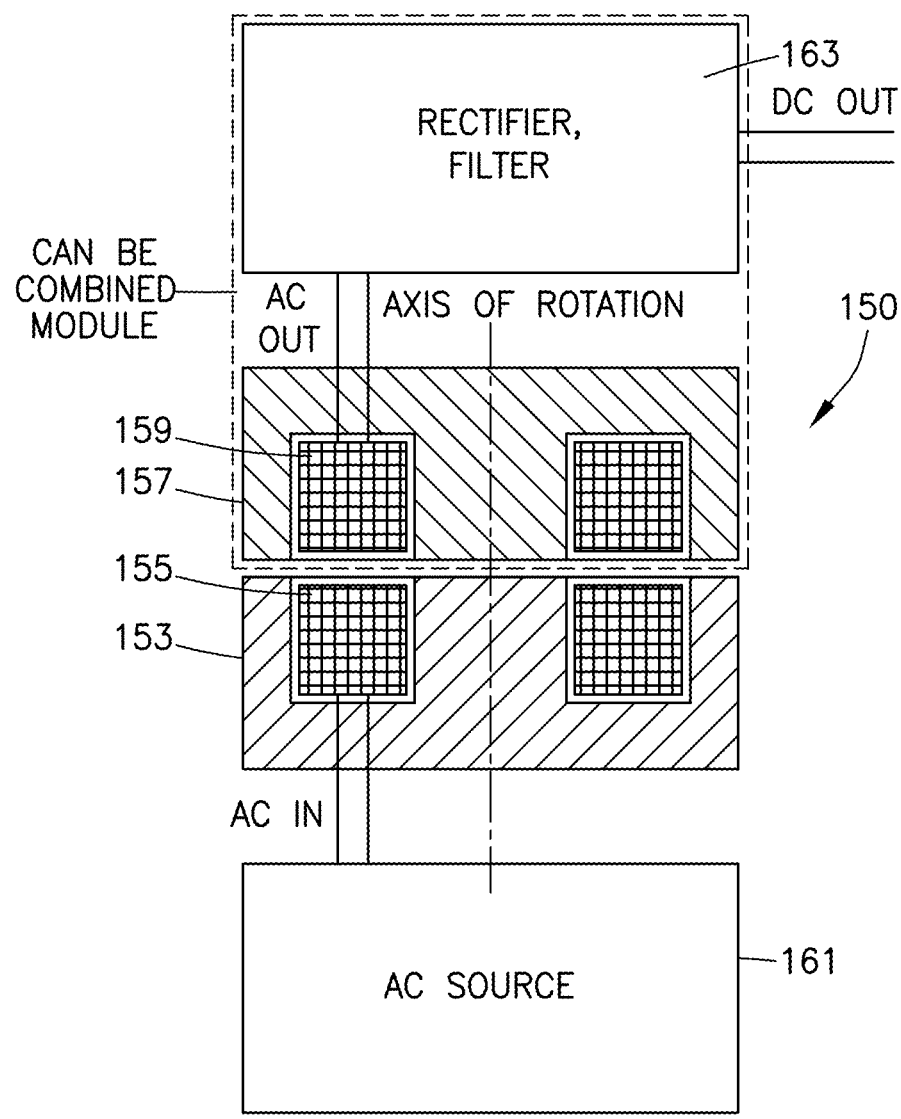
FIG. 4D is a schematic representation of an example configuration of an inductive power coupling for a robot.

FIG. 4D shows a suitable example configuration of the inductive power coupling 150 for the robot 110. The inductive power coupling 150 comprises a primary core 153 having a primary coil 155 and a secondary core 157 having a secondary coil 159, the primary core 153 and the secondary core 157 being arranged about an axis of rotation. A source 161 inputs alternating current (AC) into the primary coil 155 and through the secondary coil 159 to a rectifying filter 163. Direct current (DC) is output from the rectifying filter 163. The secondary core 157, the secondary coil 159, and the rectifying filter 163 may be arranged as a unitary module.

Figure 4E:
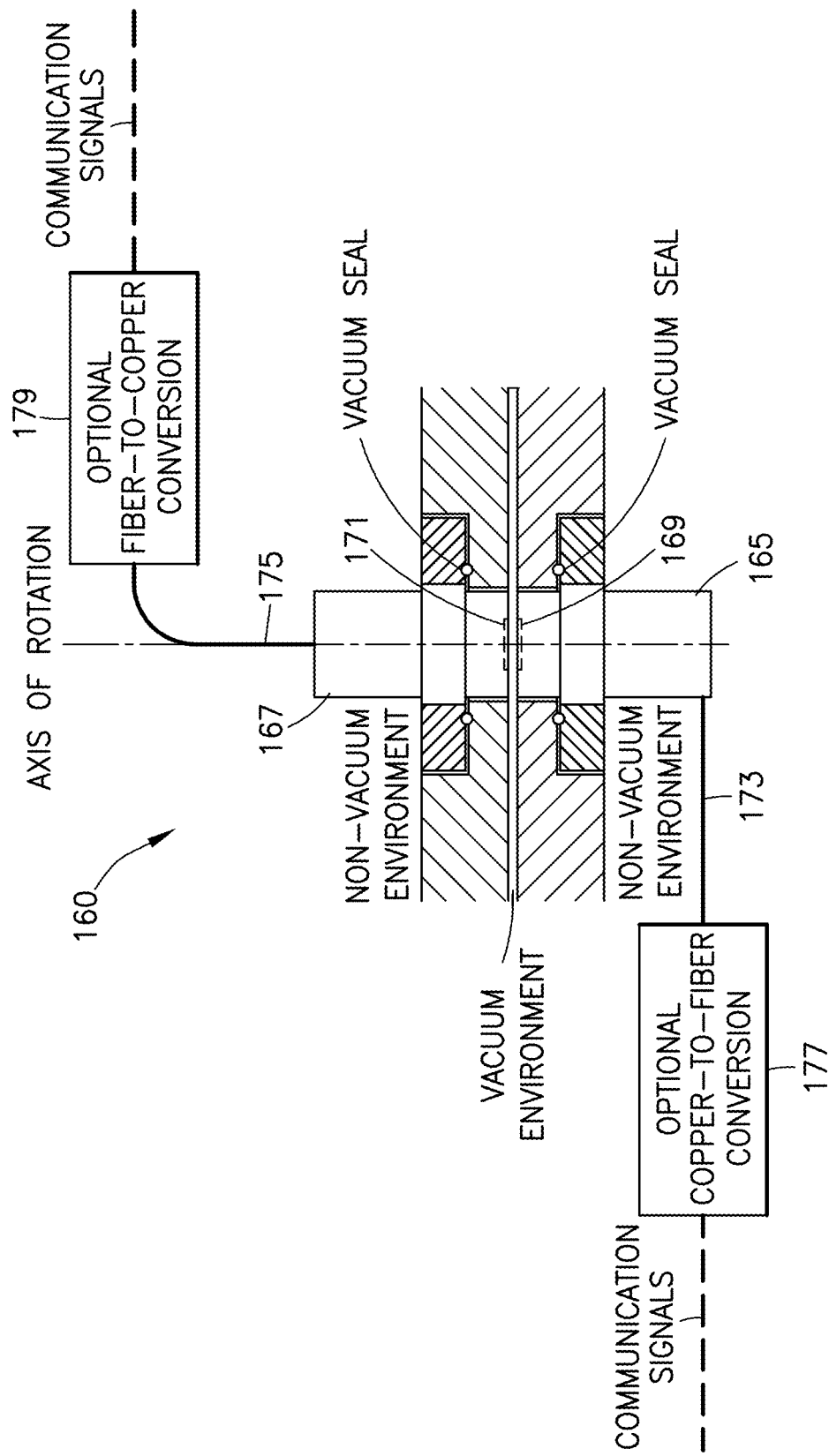
FIG. 4E is a schematic representation of an example configuration of an optical communication link for a robot.

FIG. 4E shows a simplified cross-sectional view of a suitable example configuration of the optical communication link 160 for the robot 110. The optical communication link 160 comprises a first optical communication module 165 and a second optical communication module 167 arranged about an axis of rotation. The first optical communication module 165 comprises a first sealed optical element 169, and the second optical communication module 167 comprises a second sealed optical element 171, the first sealed optical element 169 and the second sealed optical element 171 being arranged to face each other across a portion of the vacuum environment. A first fiber optic cable 173 extends into the first optical communication module 165, and a second fiber optic cable 175 extends from the second optical communication module 167.

The optical communication link 160 may feature optional electronics to convert electrical signals into optical signals and vice versa (see copper-to-fiber conversion block 177 and fiber-to-copper conversion block 179). The conversion electronics (copper-to-fiber conversion block 177 and fiber-to-copper conversion block 179) may be in the form of separate modules, for instance, printed circuit boards. Alternatively, the electronics may be integrated into the first optical communication module 165 and the second optical communication module 167, or the electronics may be integrated into other electronic assemblies, such as the M1 control module and the M2/M3 control module shown in the examples of FIGS. 2A and 2B.

The optical communication link 160 may be conveniently combined with the rotary power coupling into an integrated rotary coupling assembly 610. A simplified cross-sectional view of an example integrated rotary coupling 610, which may include an inductive power coupling and an optical communication link, is depicted diagrammatically in FIG. 4F. In this particular example, the power coupling arrangement of the integrated rotary coupling 610 is based on the example of FIG. 4D (with similar primary cores 153, primary coils 155, secondary cores 157, and secondary coils 159) and the optical link arrangement of the integrated rotary coupling is based on the example of FIG. 4E (copper-to-fiber conversion block 177 and fiber-to-copper conversion block 179).

Figure 4F:
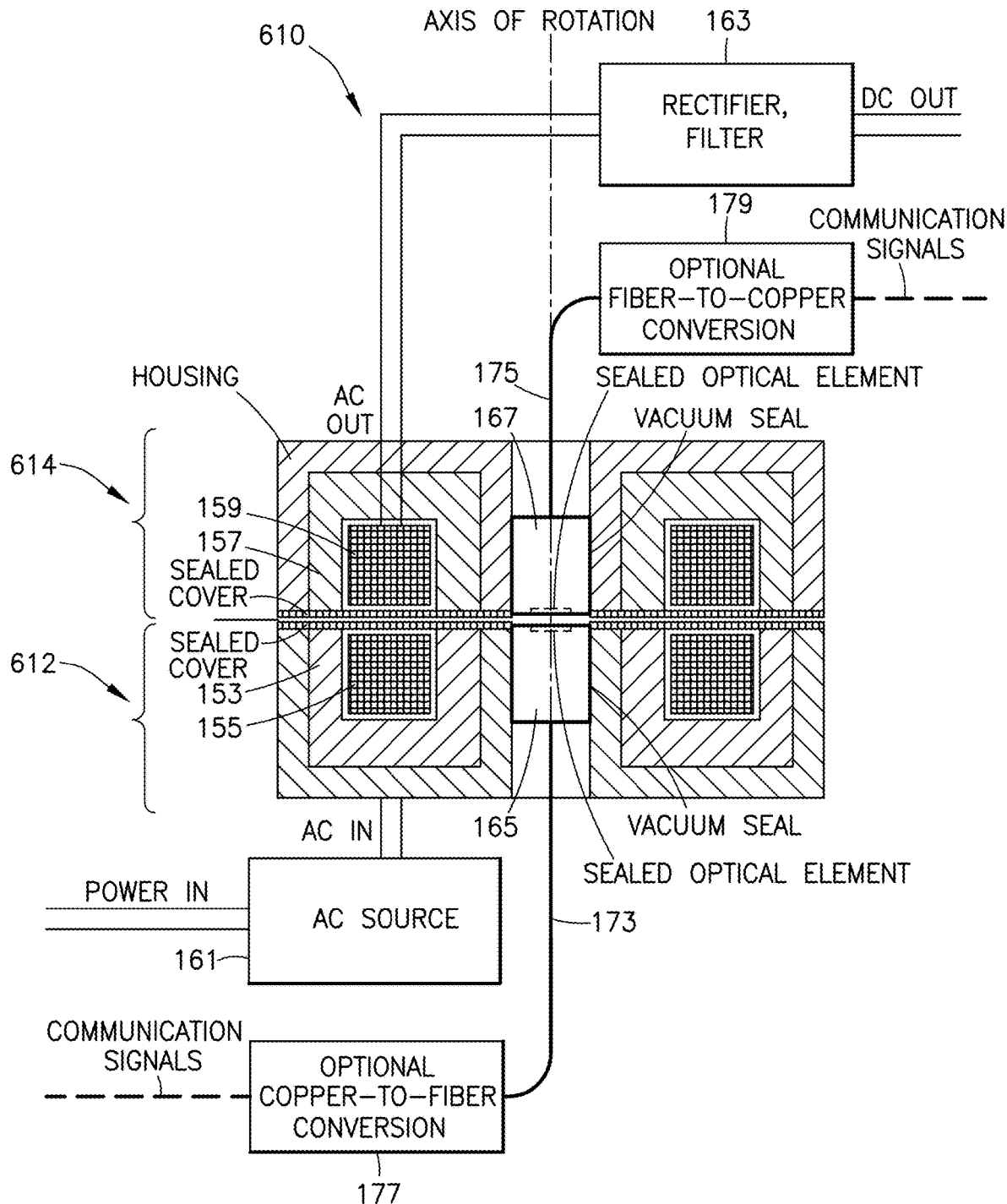
FIG. 4F is a schematic representation of an optical communication link combined with a rotary power coupling to form an integrated rotary coupling assembly.

As depicted in FIG. 4F, the integrated rotary coupling 610 features two portions, a lower portion 612 stationary with respect to the housing of the spindle assembly 136 and an upper portion 614 rotating together with the upper arm 118. The two portions of the integrated rotary coupling 610 may be maintained in alignment utilizing the bearing of the rotary joint of the robot 110, or an additional bearing may be utilized in the integrated rotary coupling 610 to maintain a high degree of alignment of the optical communication link regardless of potential compliance of the structure of the robot 110 under various static and dynamic load conditions.

Figure 5:
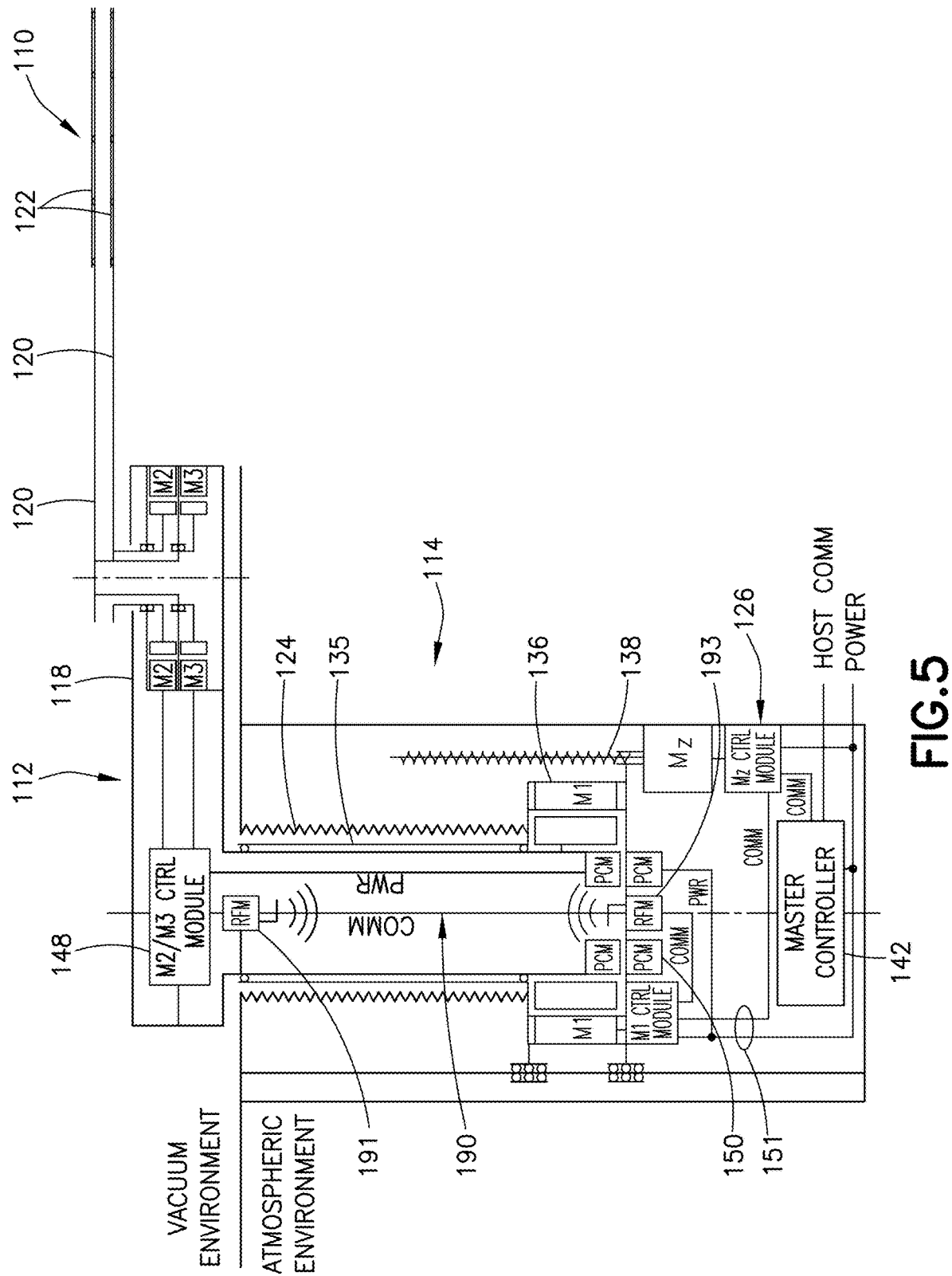
FIG. 5 is a schematic representation of an example robot utilizing a radio-frequency communication system.

Referring to FIG. 5, alternatively, a radio-frequency communication system 190 may be utilized in place of the optical communication link 160 (for example, in the robots of FIGS. 2A and 2B). As shown diagrammatically in the example of FIG. 5, the radio-frequency communication system 190 may include a first radio-frequency communication module 191 (denoted as RFM 191) and a second radio-frequency communication module 193 (denoted as RFM 193), one stationary and the other rotating together with the upper arm 118. The RFM 191, 193 may be separate devices, as shown in FIG. 5, or they may be integrated into other components of the control system.

Figure 6:
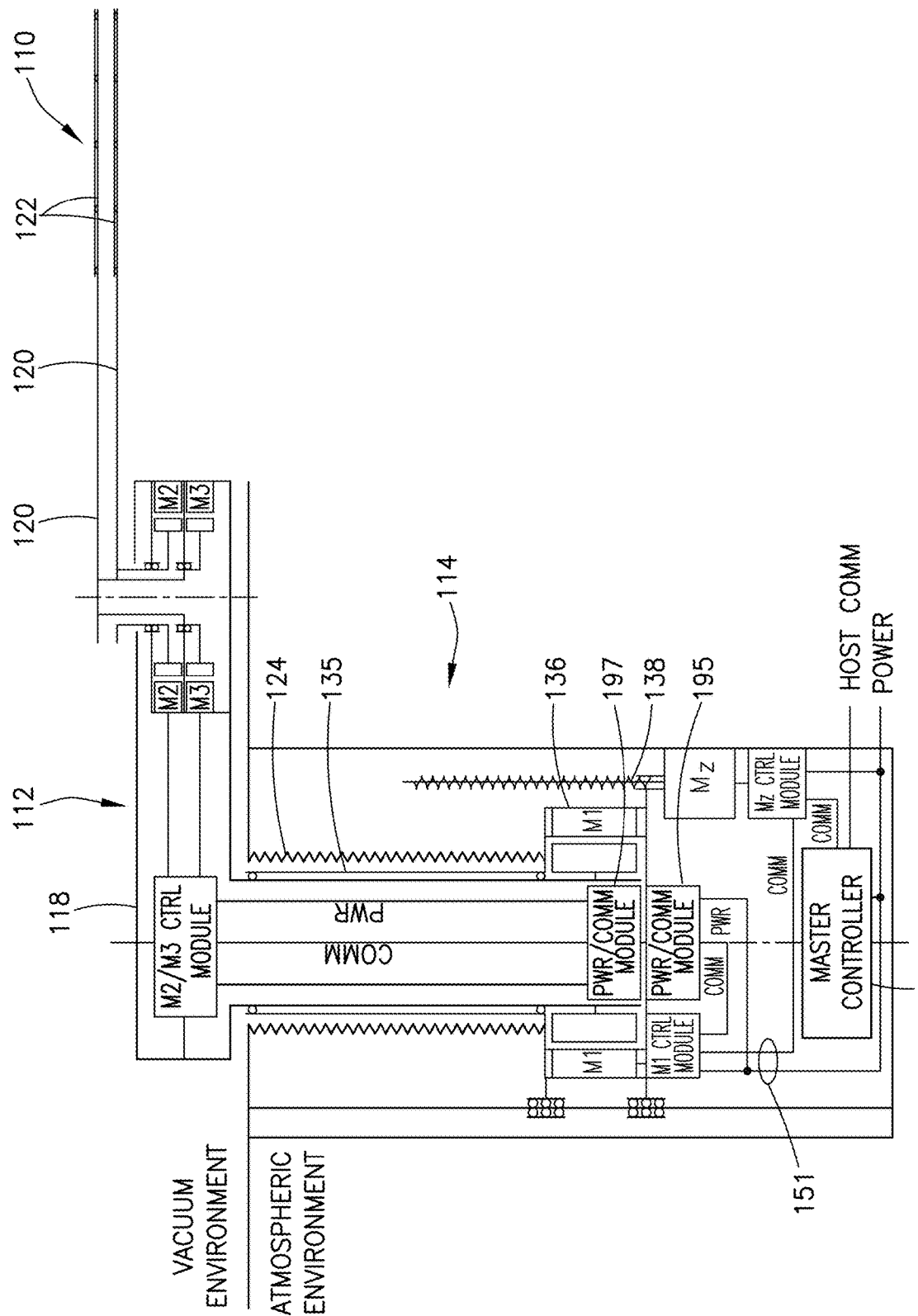
FIG. 6 is a schematic representation of an example robot in which communication signals are routed through a power coupling.

Referring to FIG. 6, as another alternative, the communication signals may be routed through a power coupling comprising a first power/communication module 195 and a second power/communication module 197. In case of a power coupling module arrangement based on an inductive principle, the power coupling module arrangement may employ the same set of coils for power and data transmission or an additional set of coils may be used to transmit data. Alternatively, the coils for data transmission may be packaged in a separate device.

Referring to FIG. 7, the power and communication signals may be routed from the atmospheric environment to the vacuum environment using a multi-channel electrical feedthrough 174. A vacuum-compatible service loop 176 may be employed to accommodate relative rotation of the upper arm 118 with respect to the housing of the spindle assembly 136. For instance, the vacuum-compatible service loop 176 may be implemented in the form of a single coiled cable that may include both power and communication signal conductors.

As another example, the vacuum-compatible service loop 176 may utilize a flexible printed circuit board. Other examples of vacuum-compatible service loop-type flexure-based arrangements that may facilitate power delivery and signal transmission while accommodating relative rotation of the upper arm with respect to the housing of the spindle assembly 136 can be found in U.S. Pat. No. 10,569,430, which is hereby incorporated by reference in its entirety.

Figure 8A:
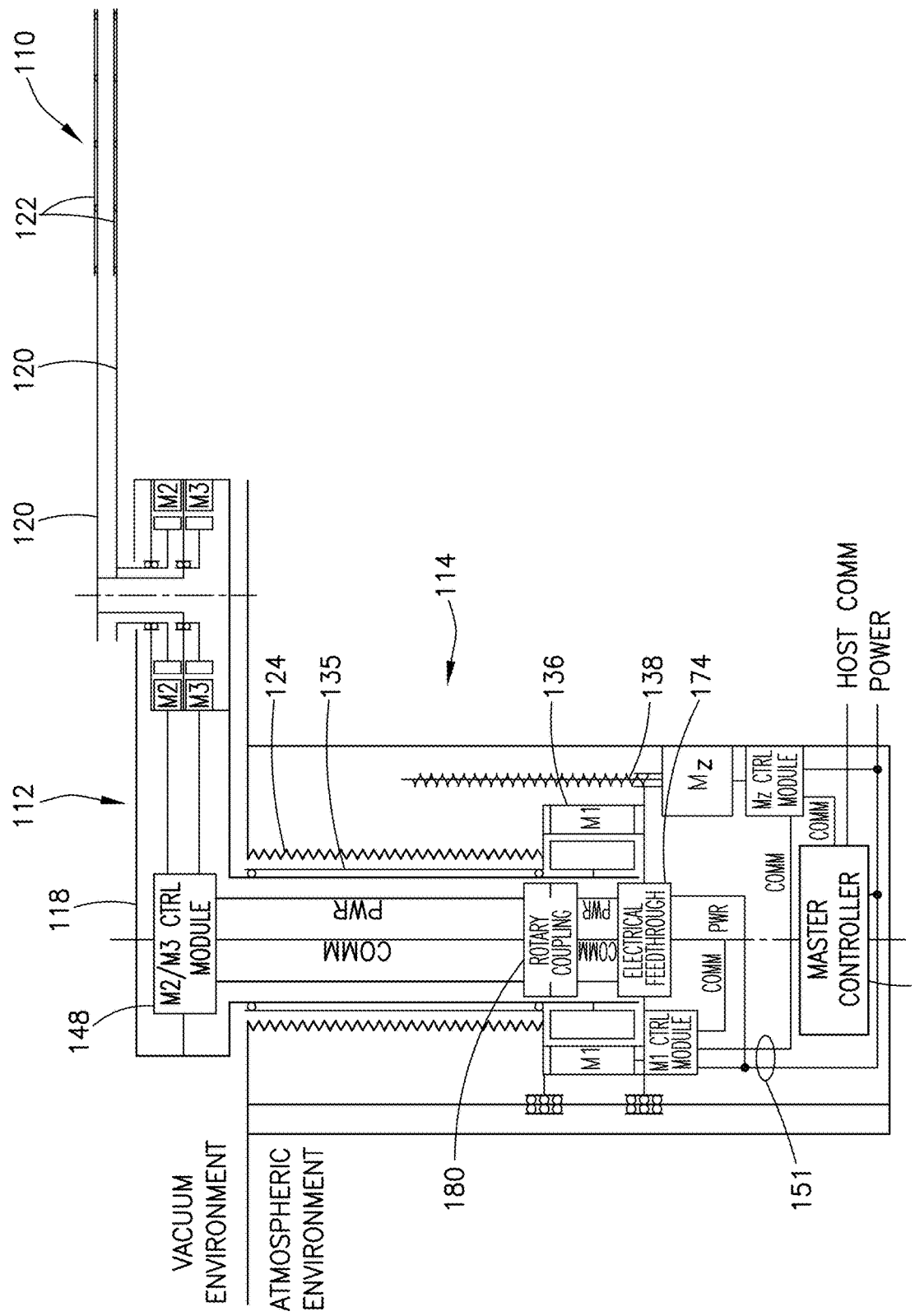
FIG. 8A is a schematic representation of an example robot utilizing a vacuum-compatible multi-channel electrical rotary coupling.

Referring to FIG. 8A, alternatively, a vacuum-compatible multi-channel electrical rotary coupling 180 may be used. The electrical rotary coupling 180 may operate according to various physical principles and their combinations, including a slip-ring arrangement, which may consist of one or more electrically conductive rings, each in contact with one or more electrically conductive brushes, a slip-ring arrangement wetted by an electrically conductive fluid, such as an ionic liquid, and a contactless capacitive coupling. As an example, a slip-ring arrangement may be used for DC power and electrical ground, and a contactless capacitive coupling may be utilized for communication signals.

Figure 8B:
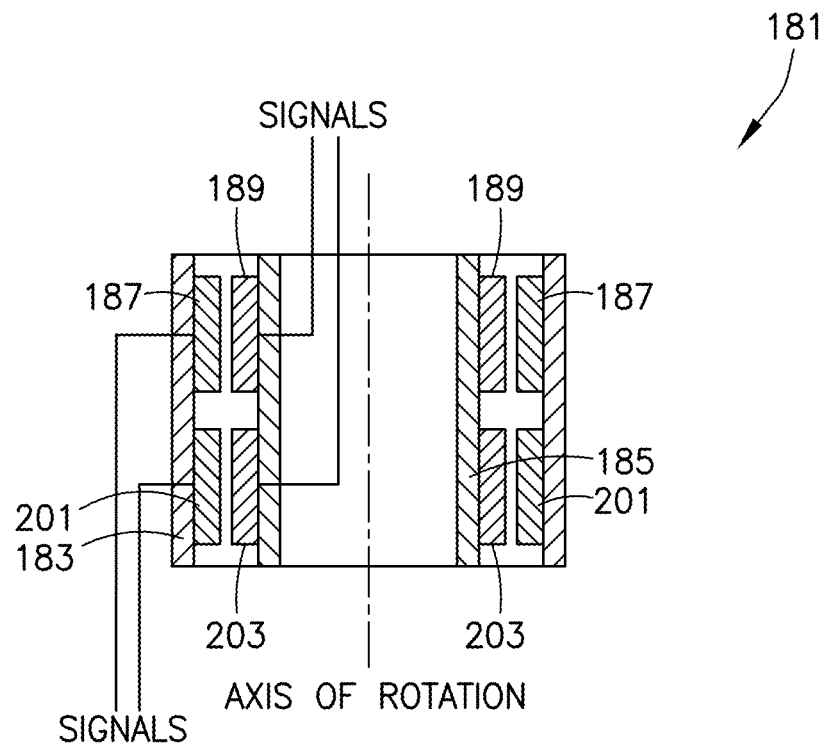
FIGS. 8B and 8C are schematic representations of example capacitive rotary couplings for a robot.

A simplified cross-sectional view of an example capacitive rotary coupling is provided in diagrammatic form at 181 in FIG. 8B in which an annular arrangement of cylinders is arranged around an axis of rotation, the annular arrangement of cylinders comprising an outer cylinder portion 183 and an inner cylinder portion 185. A first outer ring 187 is disposed on an inner surface of the outer cylinder portion 183, and a first inner ring 189 is disposed opposite the first outer ring 187 and on an outer surface of the inner cylinder portion 185. A second outer ring 201 and a second inner ring 203 is similarly positioned proximate the first outer ring 187 and the first inner ring 189. Signals are fed through the inner and outer rings.

Figure 8C:
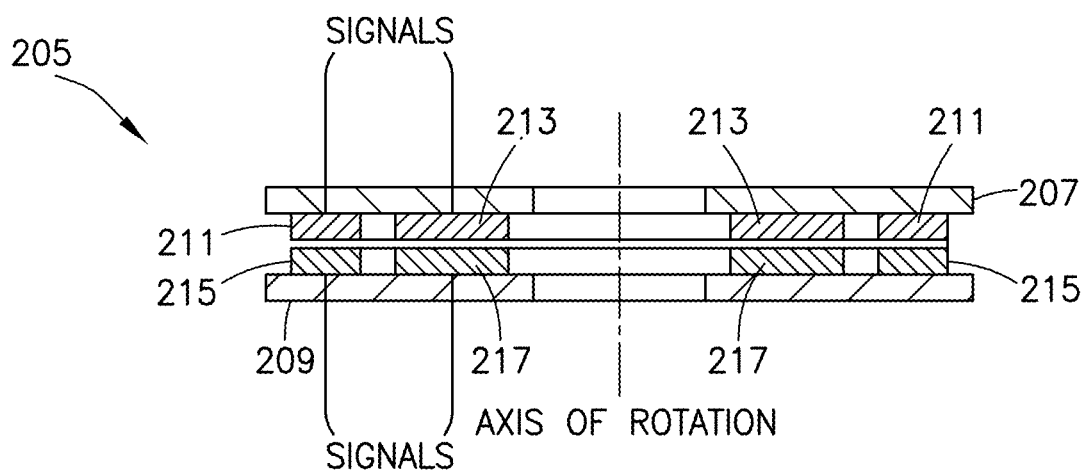

Another example is depicted in FIG. 8C at 205 in which an upper disk portion 207 and a lower disk portion 209 are arranged around an axis of rotation. The upper disk portion 207 includes upper rings 211, 213, and the lower disk portion 209 includes lower rings 215, 217. Signals are fed through the upper and lower rings.

Figure 9:
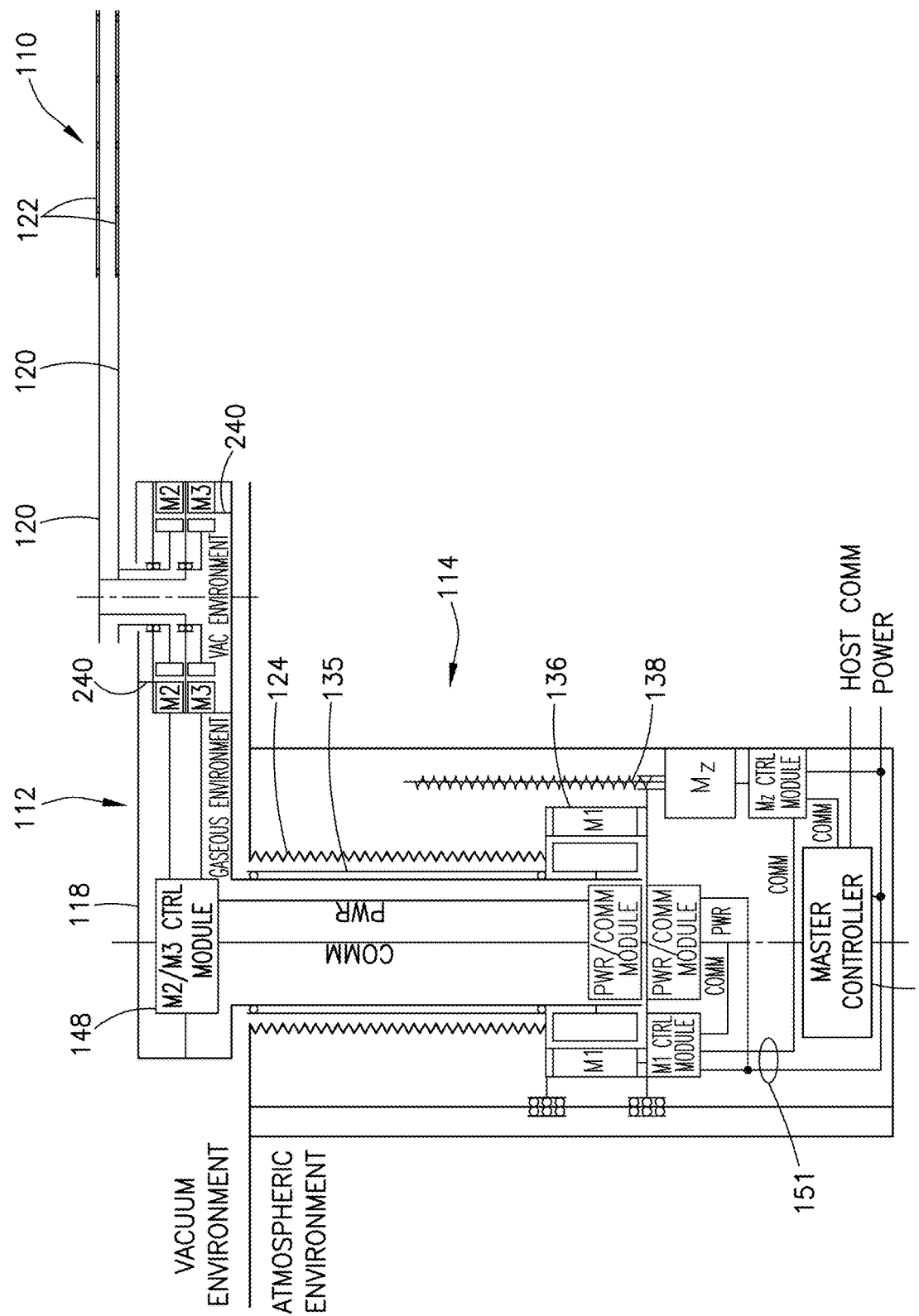
FIG. 9 is a schematic representation of an example robot in which an internal volume of an upper arm is sealed and filled with a gas.

Referring to FIG. 9, the internal volume of the upper arm 118 or a portion of the internal volume of the upper arm 118 may be sealed and filled with air, another mix of gases, or a single gas, such as nitrogen. An isolation barrier 240 may be present between the stators and rotors of motors M2 and M3. In this case, the stators may be part of the sealed internal volume of the upper arm 118 while the rotors may be located on the other side of the isolation barrier 240 in the vacuum environment. Alternatively, motors M2 and M3 may be located in the vacuum environment in their entirety. The power, communication, and cooling arrangements described with respect to FIGS. 2 through 8C above may be utilized in the example embodiment of FIG. 9 (the power and communication arrangements of FIG. 7 and FIGS. 8A-8C may require an additional electrical feedthrough so that the power and communication signals can enter the sealed volume of the upper arm 118).

Figure 10:
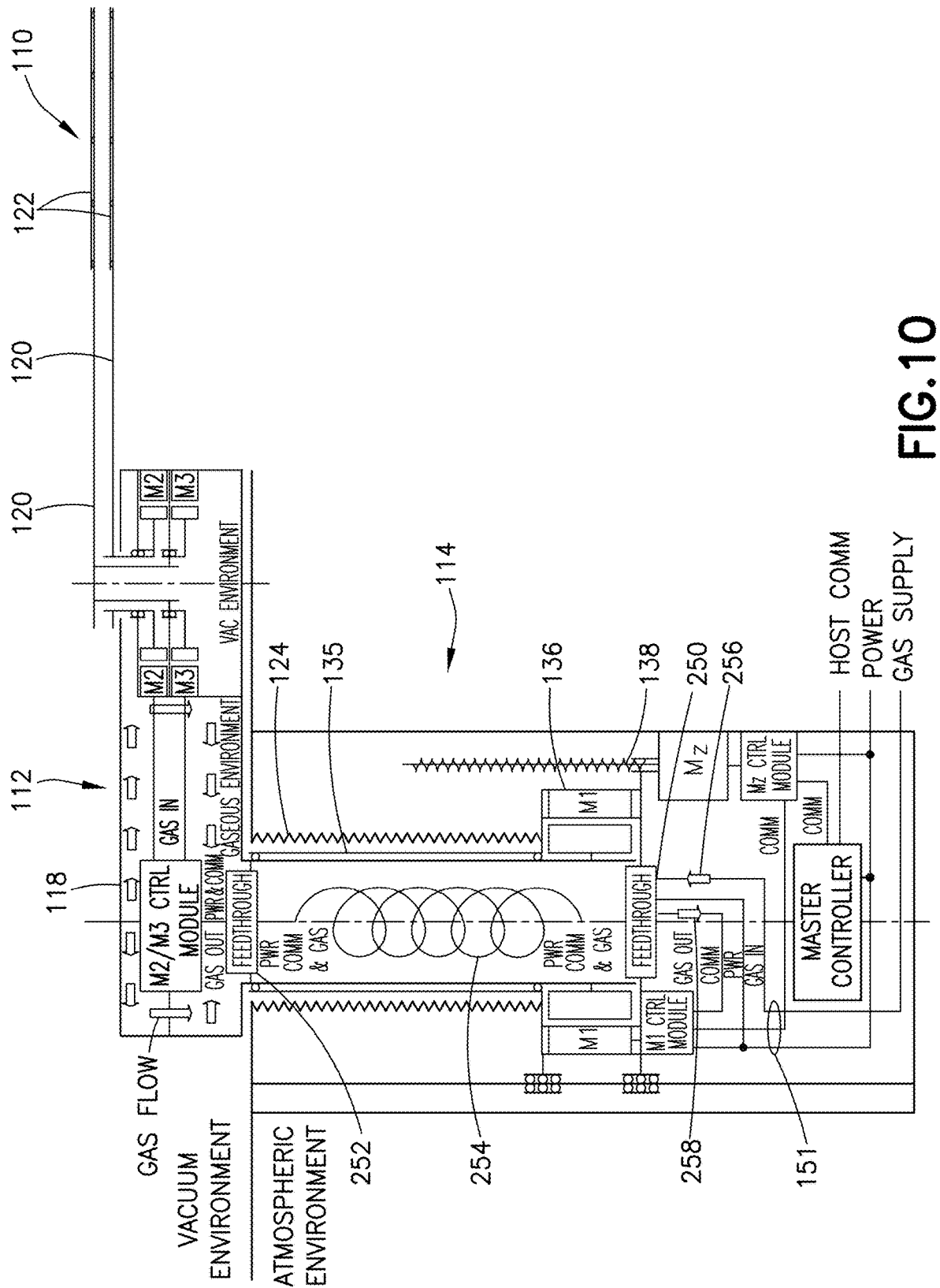
FIG. 10 is a schematic representation of an example robot in which a communication and cooling arrangement utilizes two feedthroughs connected by a service loop to transmit power and communication signals.

Referring to FIG. 10, one example embodiment of a communication and cooling arrangement is illustrated diagrammatically. In this example embodiment, a feedthrough 250 may be attached to the housing of the spindle assembly 136 between the external atmospheric environment and the vacuum environment, another feedthrough 252 may be attached to the upper arm 118 between the sealed internal volume of the upper arm 118 and the vacuum environment, and a service loop 254 may be utilized to connect the two feedthroughs 250, 252. The feedthroughs 250, 252 and the service loop 254 may be configured to transmit power and communication signals between the spindle assembly 136 and the upper arm 118. A gas feed 256 is fed to the feedthrough 250 to feed gas to the internal volume of the upper arm 118. A gas takeoff 258 is received from the feedthrough 250 to exhaust the gas out of the internal volume of the upper arm 118. The gas (for example, air, another mix of gases, or a single gas, such as nitrogen) may be used to remove heat from the components inside the upper arm 118 and/or attached to the upper arm 118. An example flow of the gas is illustrated by arrows (GAS FLOW).

Figure 11A:
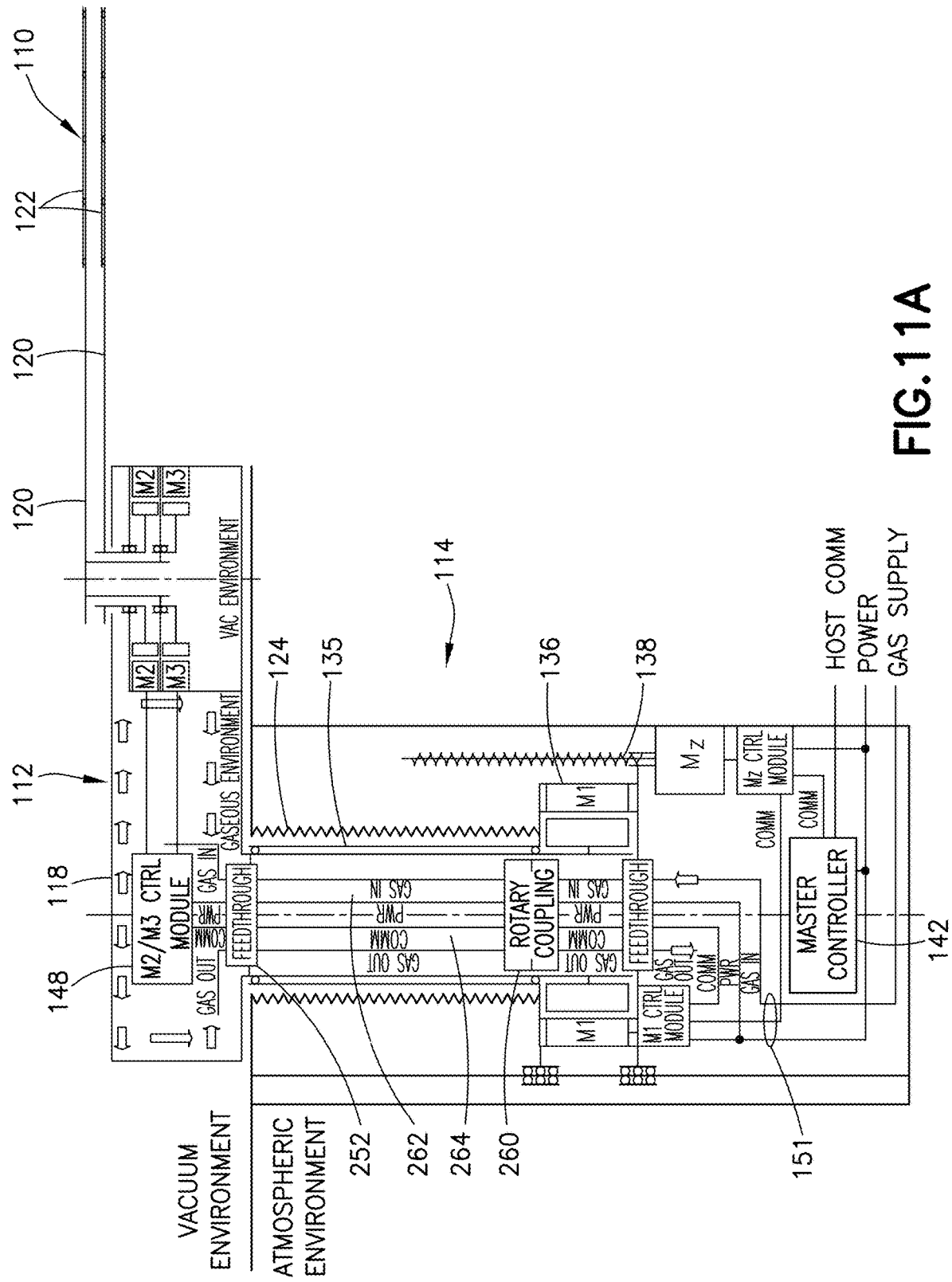
FIG. 11A is a schematic representation of the example robot of FIG. 10 in which the service loop between the feedthroughs is replaced by a multimedium rotary coupling.

Referring to FIG. 11A, alternatively, the service loop between the feedthrough 250 in the example embodiment of FIG. 10 may be replaced by a multimedium rotary coupling 260. In this example embodiment, the rotary coupling 260 may channel electrical signals, such as power and communication signals, along with gases, for instance, in through a first channel 262 (to the upper arm 118) and out through a second channel 264 (from the upper arm 118).

As shown diagrammatically in FIG. 11B, as another alternative, a vacuum-compatible service loop 270 may be used to connect directly the internal volume of the sealed portion of the upper arm 118 or a component in the upper arm 118, such as a control module 148, with the internal volume of the drive unit 114.

Figure 11C:
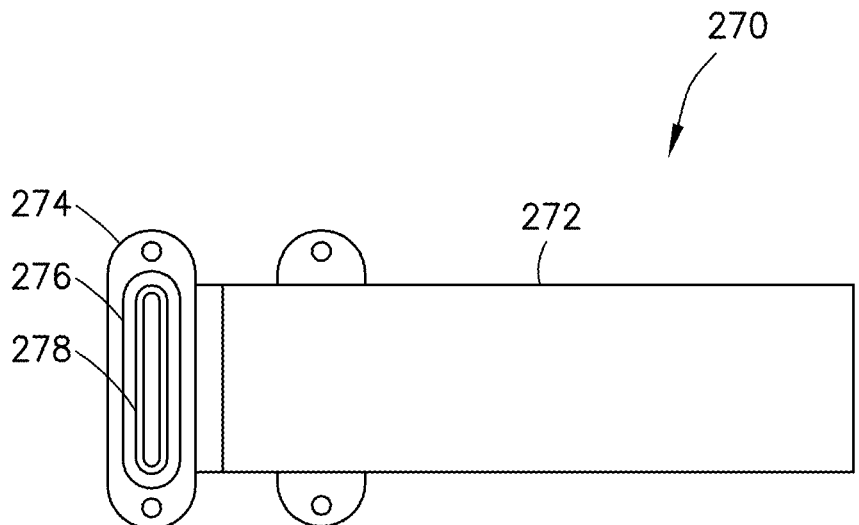
FIGS. 11C(a), 11C(b), 11D(a), and 11D(b) are schematic representations of service loops of FIGS. 11A and 11B in which the service loop(s) comprise one or more tubes.
Figure 11C:
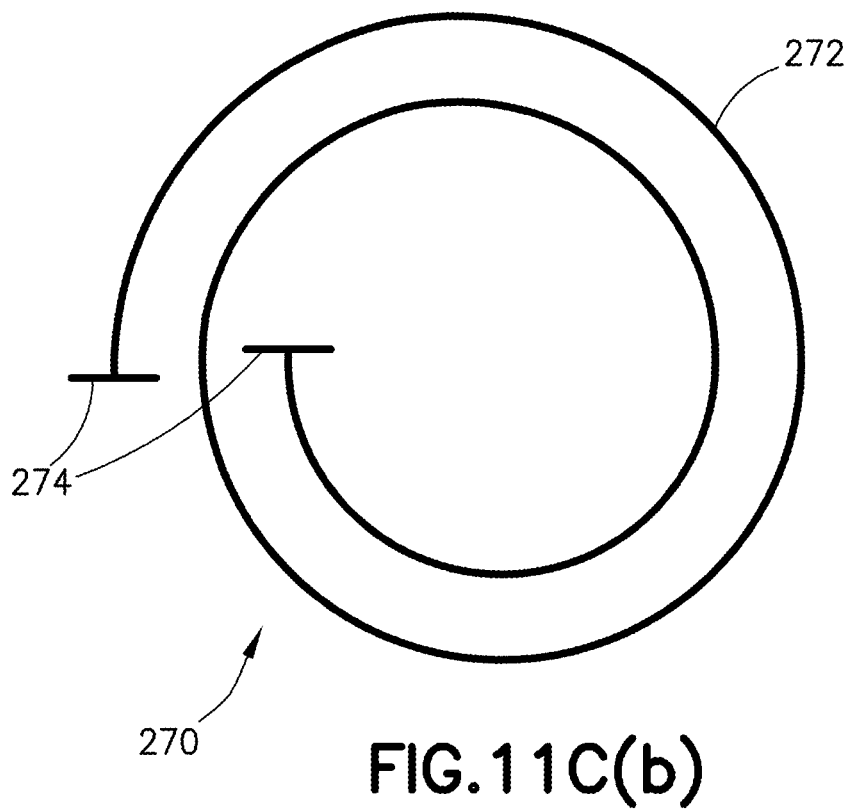

For instance, as depicted diagrammatically in FIGS. 11C(a) and 11C(b), the service loop 270 may comprise a flat tube 272 formed into a coiled-spring shape with attachment and sealing features, such as flanges 274 with seals 276, at each end of the tube 272, and a flat cable 278, such as a ribbon cable, routed through the inside of the tube 272. The flanges 274 may be connected to the sealed portion of the upper arm 118 or a component in the upper arm 118 on one end of the tube 272 and to the housing of the spindle assembly 136 on the other end of the tube 272.

Figure 11D:
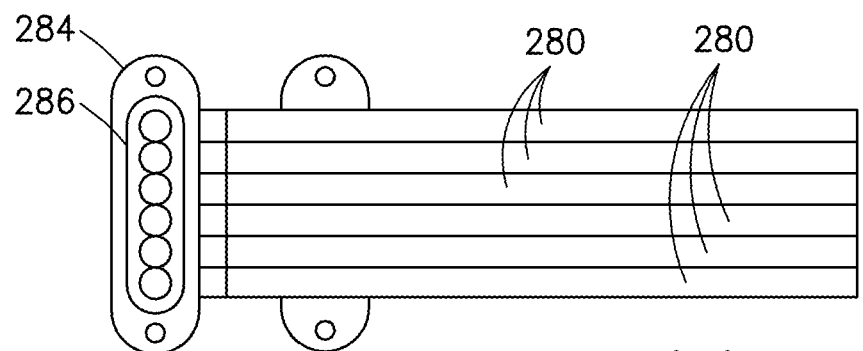
FIG. 11B is a schematic representation of the example robot of FIG. 10 utilizing a vacuum-compatible service loop.
FIG. 11E is a schematic representation of the service loops of FIGS. 11C(a), 11C(b), 11D(a), and 11D(b) in which the service loops are connected at each end via a pivoting joint with a bellows.
FIG. 11F is a schematic representation of an example of a vacuum-compatible service loop comprising a series of bellows, pivoting supports, and cables and/or hoses attached to a semi-circular support.
Figure 11D:
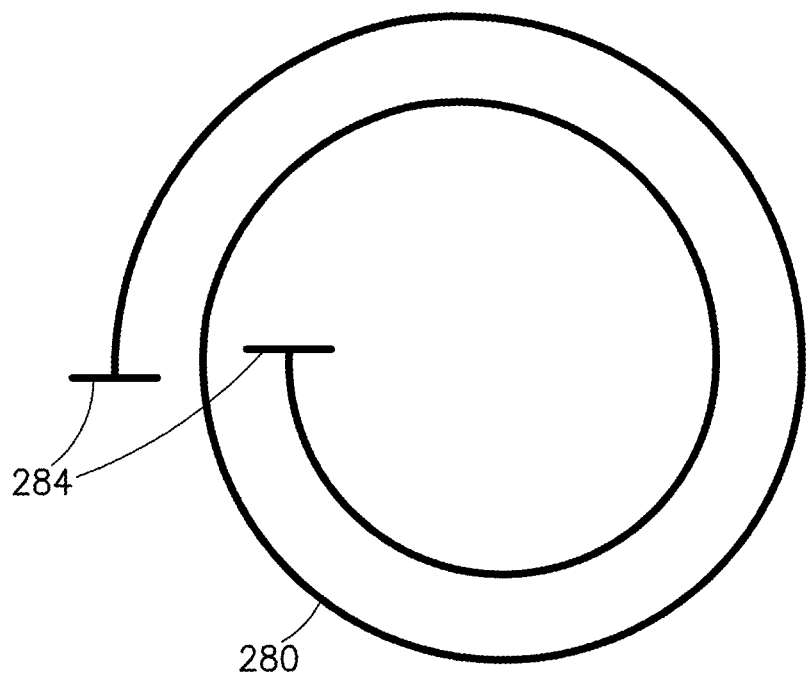

Alternatively, as illustrated in FIGS. 11D(a) and 11D(b), a row of tubes 280, for instance, of a circular cross-section, may be utilized in place of the flat tube 272 of FIGS. 11C(a) and 11C(b). The row of the tubes 280 may include a flange 284 and a seal 286. Each of the tubes 280 may provide a passage for a wire, a cable, and/or a hose, or it may be used to directly pass fluid (gas or liquid). Alternatively, as shown in FIG. 11D(b), the tubes 280 may be formed into a helical shape or any other suitable shape that allows for adequate flexing of the tubes 280.

Figure 11E:
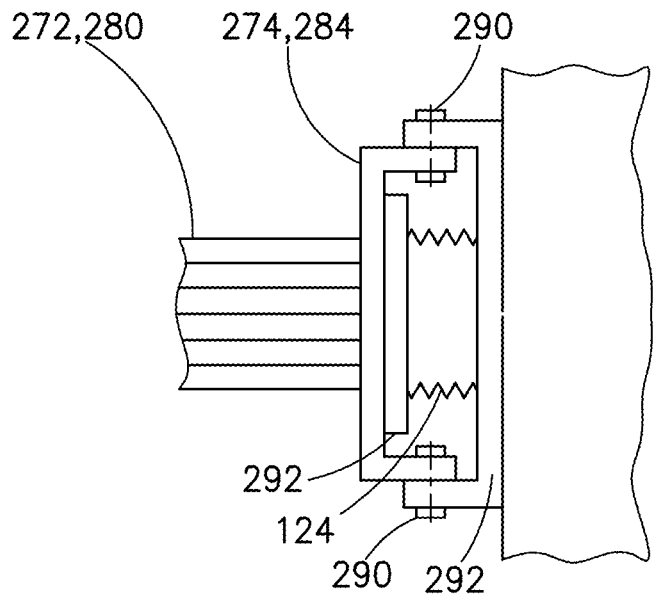

In order to limit bending load at the attachment points, the example service loops 270 may be connected at each end via one or more pivoting joints 290 with a flange 292 or other surface on the bellows 124, as illustrated diagrammatically in FIG. 11E.

In the examples of FIGS. 11C(a), 11C(b), 11D(a), and 11D(b), the tubes 272, 280 that may contain wires, cables, or hoses may be filled with foam, a similar elastic material, or any other suitable material to prevent rubbing of the wires, cables, or hoses against internal walls of the tubes 272,280.

Figure 11F:
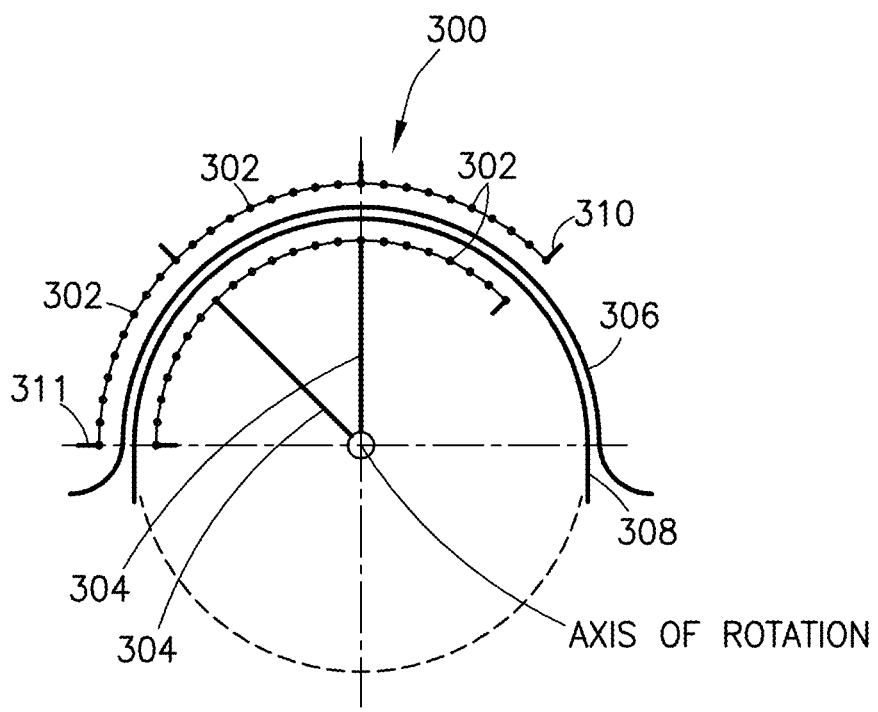

Another example of a vacuum-compatible service loop is shown diagrammatically in FIG. 11F at 300. The service loop 300 may comprise a series of bellows 302, pivoting supports 304 connected to the bellows 302, and one or more cables 306 and/or one or more hoses attached to a substantially rigid semi-circular support 308. The service loop 300 may further include attachment and sealing features, such as flanges with seals 311, which may be connected to the sealed portion of the upper arm 118 or a component in the upper arm 118 on one end of the service loop 300 and to the housing of the spindle assembly 136 on the other end of the service loop 300.

In order to balance the effect of the pressure difference between the inside of the service loop 300 and the external vacuum environment, which may cause a pressure-dependent force or torque, two vacuum-compatible service loops 300 configured to act in opposite directions may be employed.

Figure 12:
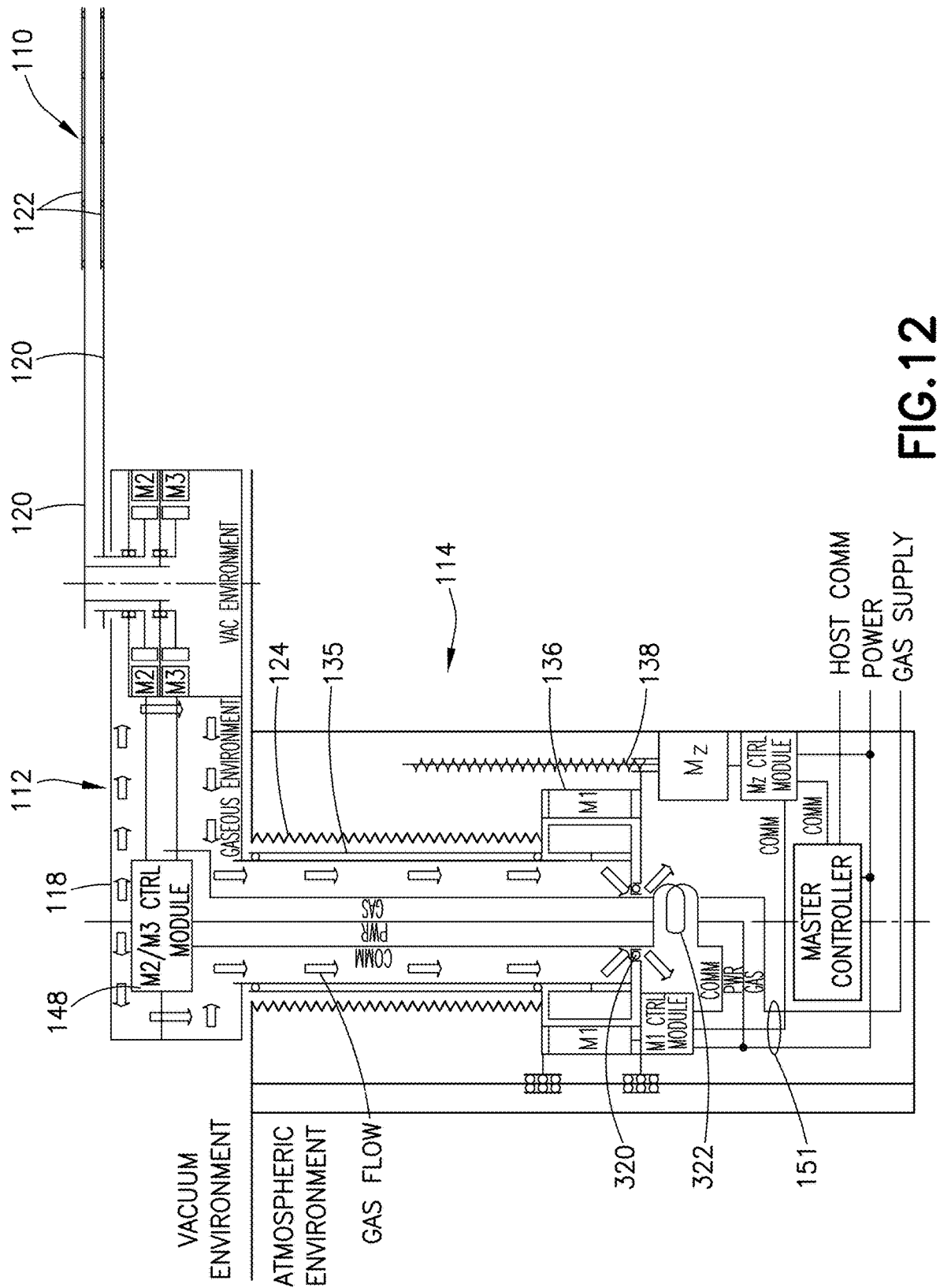
FIG. 12 is a schematic representation of an example of a robot incorporating a dynamic seal.

Referring to FIG. 12, another example embodiment is diagrammatically shown where a dynamic seal 320, such as a ferrofluidic seal, a lip seal, or any other suitable seal, may be used between the upper arm 118 (or its extension or a shaft connected to the upper arm 118) and the housing of the spindle assembly 136. As shown, the internal volume of the upper arm 118 (or a portion of the internal volume of the upper arm 118) may be connected to the internal volume of the drive unit 114. This passage may be utilized to route power and communication to the upper arm 118, feed gas into the upper arm 118, and exhaust gas out from the upper arm 118. A service loop 322 (located conveniently outside of the vacuum environment) may be utilized to accommodate relative rotation between the upper arm 118 and the housing of the spindle assembly 136. Similar to the example of FIGS. 11A to 11F, the gas in the example embodiment of FIG. 12 may be used to cool the components inside of the upper arm 118 and/or attached to the upper arm 118. An example gas flow is indicated by arrows in FIG. 12.

Figure 13:
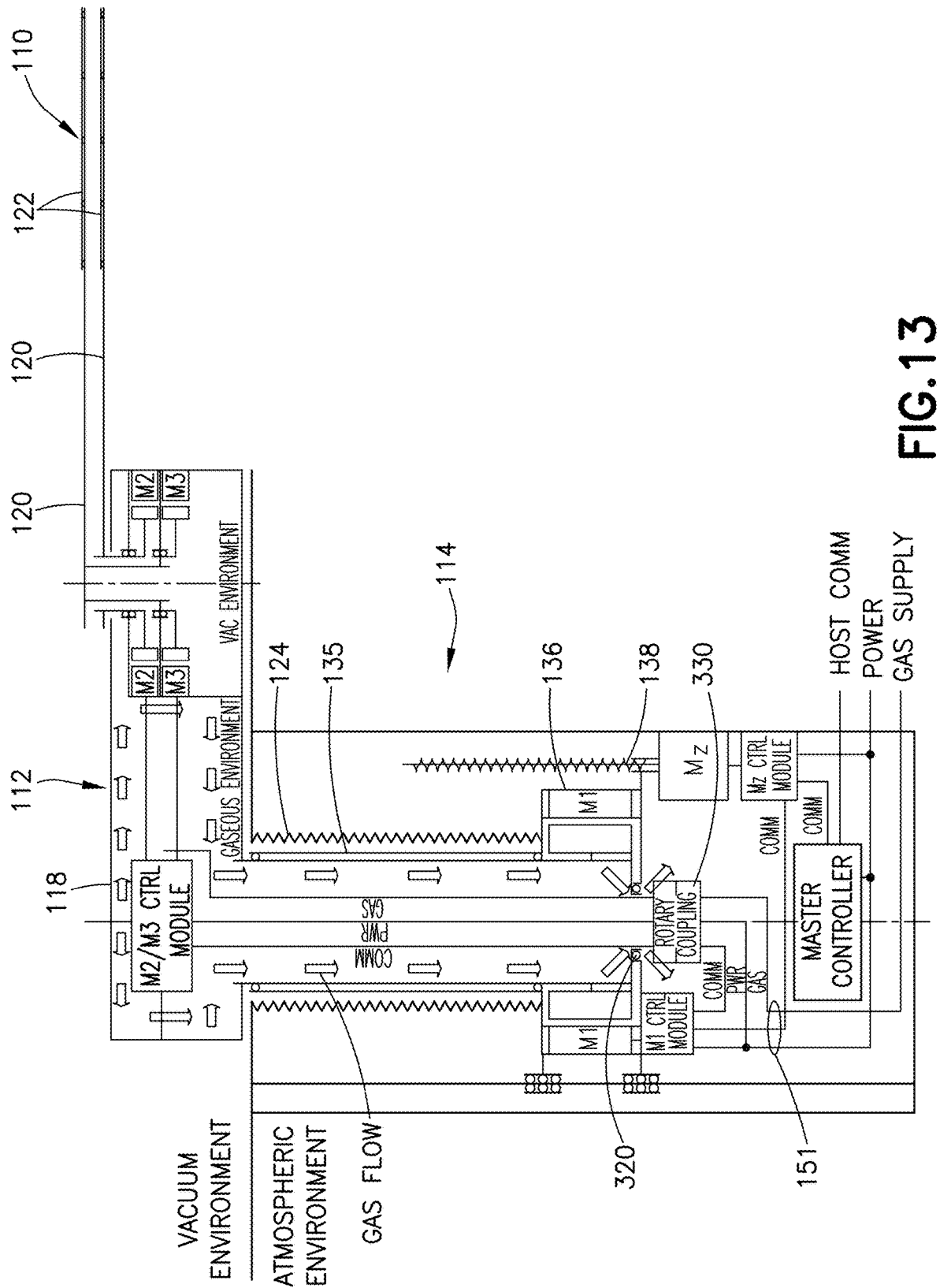
FIG. 13 is a schematic representation of the robot of FIG. 12 in which a service loop is replaced by a multimedium rotary coupling.

Alternatively, the service loop 322 in the example embodiment of FIG. 12 may be replaced by a multimedium rotary coupling 330, as shown diagrammatically in the example of FIG. 13. Again, an example gas flow is indicated by arrows.

Figure 14:
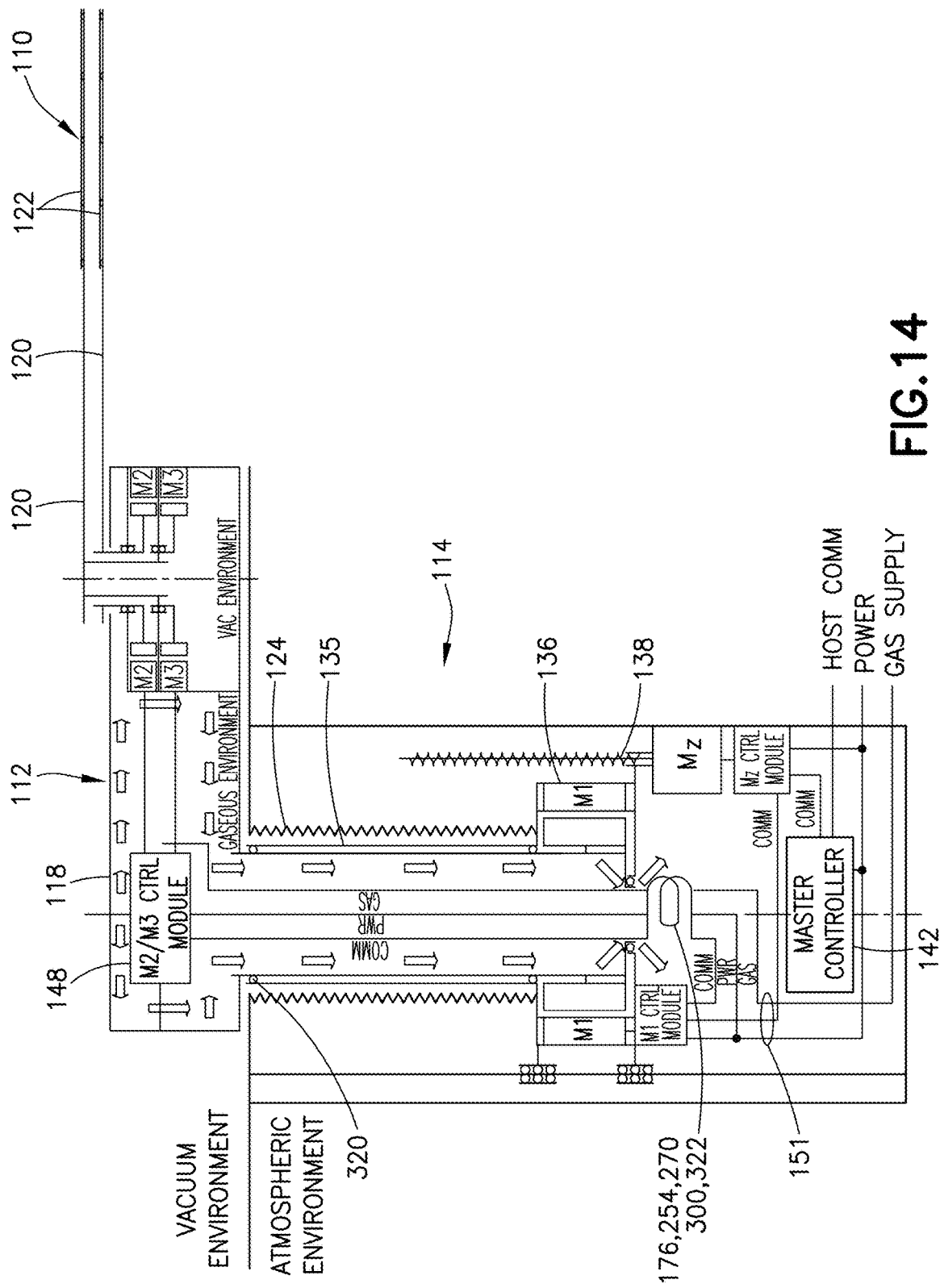
FIG. 14 is a schematic representation of an example robot incorporating a dynamic seal between an upper arm of the robot and a spindle assembly and also incorporating a service loop for relative rotation of the upper arm and a housing of the spindle assembly.
Figure 15A:
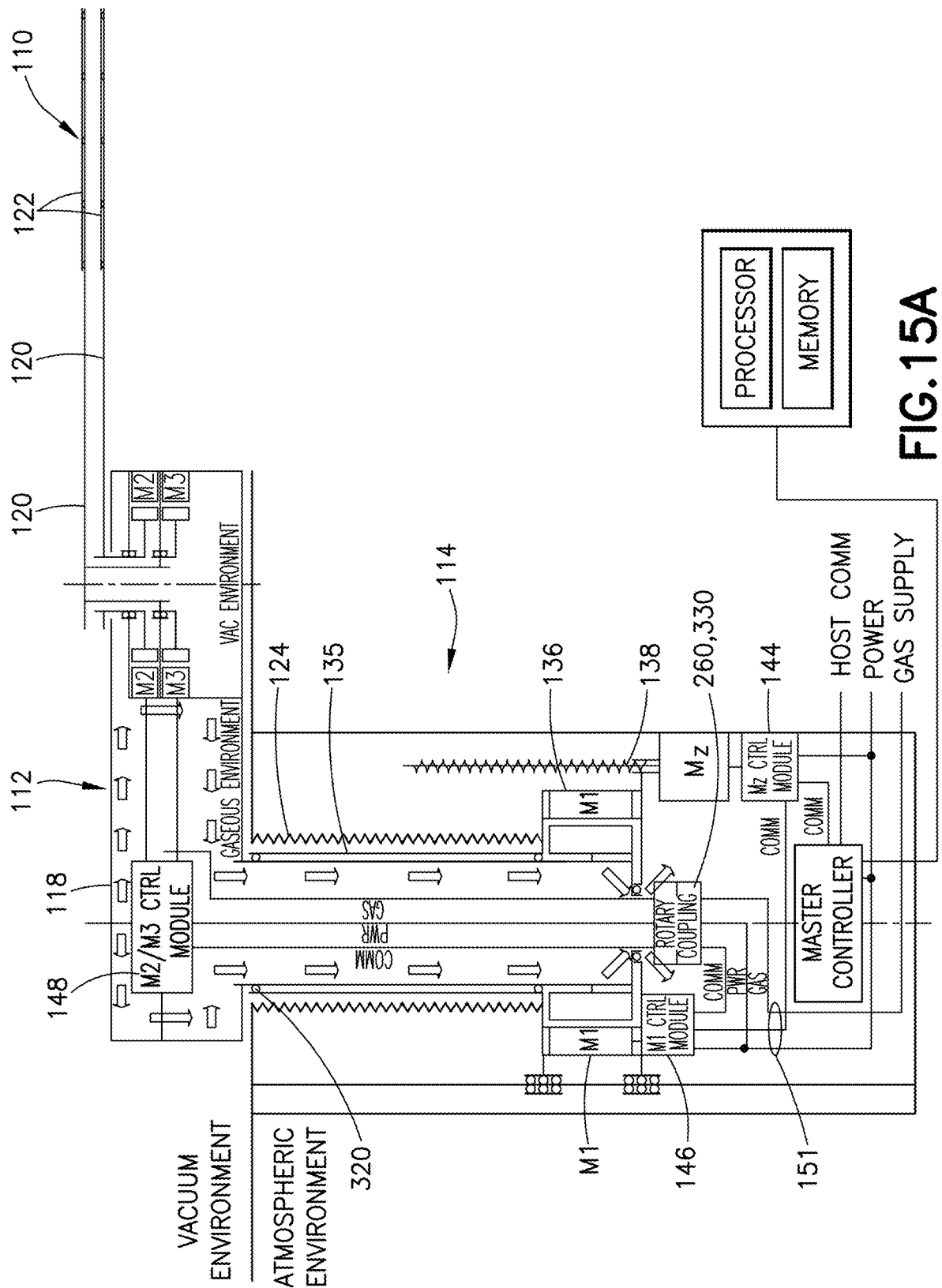
FIG. 15A is a schematic representation of the robot of FIG. 14 in which the service loop is replaced by a multi-medium rotary coupling.

In the above example embodiments, the bearings of the upper arm shaft 118 and the rotor of motor M1 (and in some embodiments also the stator of motor M1) may be exposed to the vacuum environment. This can be addressed by moving the dynamic seal 320 above the top bearing of the upper arm shaft, as illustrated in FIGS. 14 and 15A. In these examples, the upper arm shaft bearings and motor M1 may be in the atmospheric environment.

The example embodiment of FIG. 14 employs the dynamic seal 320, such as a ferrofluidic seal, a lip seal, or any other suitable seal, between the upper arm 118 and the neck 135 of the spindle assembly 136 (which may be part of the housing of the spindle assembly 136). A service loop (for example, 176, 254, 270, 300, 322) may be utilized to allow for relative rotation of the upper arm 118 and the housing of the spindle assembly 136. Alternatively, as depicted diagrammatically in the example of FIG. 15A, the service loop (for example, 176, 254, 270, 300, 322) may be replaced by a multimedium rotary coupling (for example, 260, 330).

Alternatively, a combination of a rotary coupling and a service loop may be utilized. For instance, a rotary coupling (for example, 260, 330) may be used to supply gas, and a service loop (for example, 176, 254, 270, 300, 322) may be used for power and communication signals.

Figure 15C:
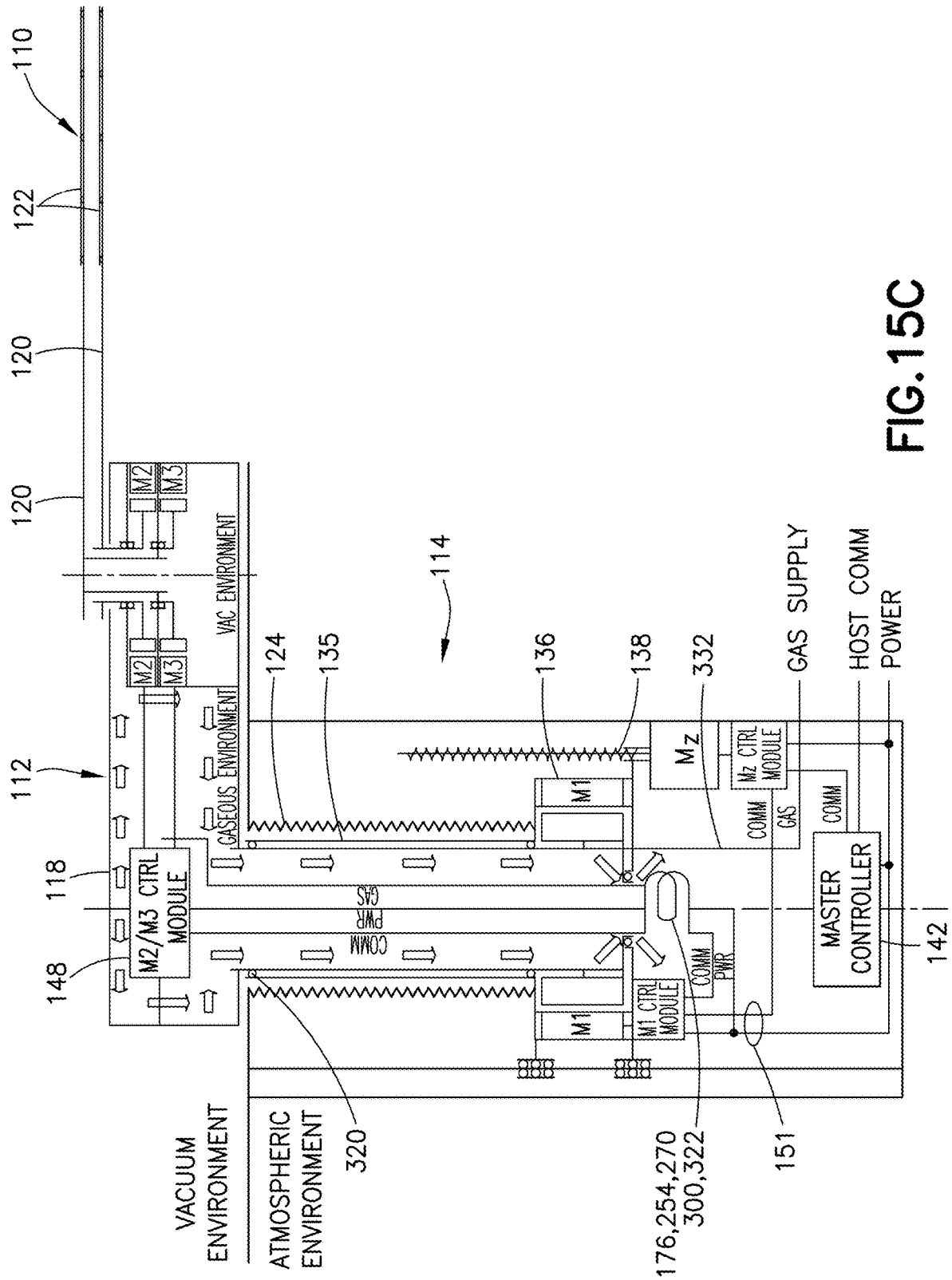
FIG. 15C is a schematic representation of the robot of FIG. 14 in which the gas supply tube is stationary with respect to a base of the drive unit.

As another alternative, a substantially fixed gas supply tube 332 may be utilized to deliver gas to the upper arm 118. The gas supply tube 332 may be stationary with respect to the housing of the spindle assembly 136, as illustrated diagrammatically in the example of FIG. 15B (in which the gas supply tube 332 forms part of the service loop 151), or it may be stationary with respect to the base of the drive unit 114, as shown diagrammatically in the example of FIG. 15C. Although the examples of FIGS. 15B and 15C show a dynamic seal 320 above the top bearing of the upper arm shaft, the dynamic seal 320 may be in any suitable location, such as in that of the examples of FIGS. 12 and 13.

The example diagrams of FIGS. 10 to 15D suggest the use of a gas supply external to the robot 110 (for example, the gas supply tube 332). Alternatively, the robot 110 may feature an internal closed-loop gas circulation system or utilize an open-loop air cooling arrangement where air from the external atmospheric environment is forced through the robot 110 and exhausted back to the external environment. As an example, an electrical fan may be employed for this purpose.

A generalized diagram that encompasses the above options is provided in FIG. 15D. In case of an external gas supply, GAS IN 336 may represent an external gas supply. In case of an internal closed-loop gas circulation system, GAS IN 336 may reuse the gas circulated through the robot 110. And in case of an open-loop air cooling arrangement, GAS IN 336 may take air from the external environment.

Alternatively, liquid cooling of the upper arm 118 (or components associated with the upper arm 118) may be employed. In this case, a liquid may be channeled to the upper arm 118 and may return from the upper arm 118 via substantially the same arrangements that may be used for gas circulation in the examples of FIGS. 12 to 15D. As an example, the liquid cooling system may be of an open-loop configuration where a liquid, such as water, is supplied to the robot 110 from an external source. As another example, the liquid cooling system may be of a closed-loop configuration where a liquid, such as water, is circulated internally within the robot 110. The closed-loop cooling system may include a pump configured to force the liquid through the cooling system. A radiator with or without a fan may be utilized to extract heat from the liquid. Alternatively, a refrigeration unit may be employed to lower the temperature of the liquid.

The example embodiments as shown in FIGS. 12, 14, and 15B to 15D show a two-stage service loop arrangement where the service loop 151 may be used to facilitate translational motion between the spindle assembly 136 and the stationary base of the drive unit 114, and the (second) service loop (for example, 176, 254, 270, 300, 322) may be utilized to facilitate rotational motion between the upper arm 118 and the spindle assembly 136. Alternatively, a single service loop configured to facilitate both translational and rotational motion between the upper arm 118 and the stationary base of the drive unit 114 may be used. As an example, the service loop may be in the form of one or more coiled cables, one or more coiled hoses, or a combination of coiled cable(s) and hoses(s) (for instance, in one or more bundles).

In more complex robot arm configurations, which may utilize, for example, multi-link serial mechanisms, the thermal path from the actuators (motors) in the robot arm 112 to the drive unit 114 may include additional moving joints. The thermal management schemes described herein can be extended to such robot arm configurations, as illustrated diagrammatically in FIG. 15E.

Figure 15E:
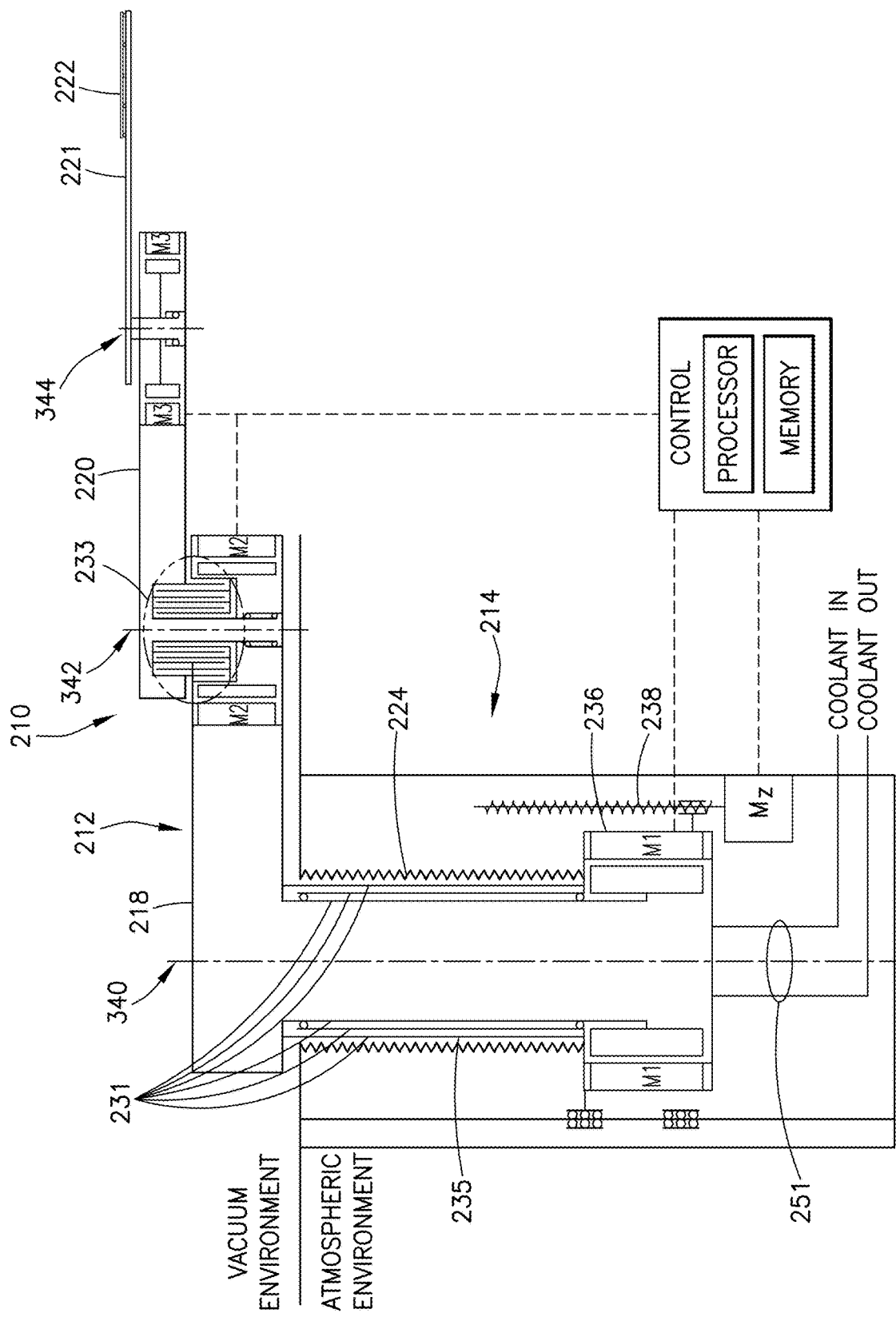
FIG. 15E is a schematic representation of an example robot having a three-link arm.

FIG. 15E shows one embodiment of a simplified cross-sectional view of a robot 210 with a three-link robot arm 212. As with previous example robots, the robot 210 may incorporate suitable controllers having processors, memories, and software. The robot 210 incorporates a bellows 224, a spindle assembly 236 (having a neck 235), and a Z-axis mechanism 238 similar to other example embodiments. Coolant in and out may be directed through a service loop 251. As depicted, the robot arm 212 may include three links that may be arranged in series and coupled to each other via rotary joints. The following terminology is used to describe the robot arm of FIG. 15E: The first link of the example robot arm 212 is referred to as link 1 or upper arm 218, the second link is referred to link 2 or upper forearm 220, and the third link is referred to as link 3 or lower forearm 221. A rotary joint between the spindle assembly 236 and upper arm 218 is referred to as a shoulder joint 340, a rotary joint between the upper arm 218 and the upper forearm 220 is referred to as an elbow joint 342, and a rotary joint between the upper forearm 220 and the lower forearm 221 is referred to as a wrist joint 344. An example is shown in U.S. Provisional Patent Application No. 63/031,883 filed May 29, 2020, which is hereby incorporated by reference in its entirety.

As illustrated in FIG. 15E, the upper arm 218 may be actuated by motor M1, which may be housed in the spindle assembly 236 of a drive unit 214. The upper forearm 220 may be actuated by motor M2, which may be housed in the upper arm 218 at the elbow joint 342 of the robot arm 212. The lower forearm 221 may be actuated by motor M3, which may be housed in the upper forearm 220 at the wrist joint 344 of the robot arm 212. Motors M1, M2, and M3 may be conveniently referred to as the spindle, elbow, and wrist motors, respectively. The lower forearm 221 may be configured to carry a payload. As an example, it may include an end-effector 222 suitable to pick, carry, and place a semiconductor wafer.

One or more of the rotary joints of the robot arm 212 may be complemented by one or more thermal coupling arrangements configured to transfer heat between the links connected by the corresponding rotary joint. In the particular example of FIG. 15E, the shoulder joint 340 is complemented by a shoulder rotary thermal coupling arrangement 231, and the elbow joint 342 is complemented by an elbow rotary thermal coupling arrangement 233.

As shown in FIG. 15F(a), an example elbow rotary thermal coupling arrangement 233, which may be utilized at a rotary joint, for instance, at the elbow joint 342 of the example robot arm 212 of FIG. 15E, may comprise two portions. A first portion 346a features one or more substantially cylindrical surfaces 348a aligned coaxially with the corresponding rotary joint (elbow joint 342) and arranged so that the substantially cylindrical surface 348a faces an opposing substantially cylindrical surface 348b on a second portion 346b of the elbow rotary thermal coupling arrangement 233. The opposing cylindrical surfaces may be configured to transfer heat via radiation across a gap between the opposing substantially cylindrical surfaces 348a, 348b of the elbow rotary thermal coupling arrangement 233. The radiation mechanism may be supplemented by convection/conduction through the environment between the opposing substantially cylindrical surfaces 348a, 348b of the elbow rotary thermal coupling arrangement 233 if residual gases are present in the vacuum environment. Shoulder joints and wrist joints may be similarly configured.

In order to increase the effective area and minimize the volume occupied by the example elbow rotary thermal coupling arrangement 233, an array of substantially cylindrical features may be provided on each of the two portions of the elbow rotary thermal coupling arrangement 233, and the two arrays may be arranged in an interleaving manner (for example, as interleaving fins extending from each of the portions 346a, 346b).

Alternatively, as depicted in the example of FIG. 15F(b), the two portions of the elbow rotary thermal coupling arrangement 233 may provide opposing disk-shaped features configured for contactless heat transfer across the gap between them. As another alternative, any other suitable shapes of the effective features of the rotary thermal coupling, including but not limited to conical and spherical shapes, and their combination may be utilized.

The effective surfaces of the elbow rotary thermal coupling arrangement 233 may be treated to improve their thermal emissivity. For example, the two portions of the elbow rotary thermal coupling arrangement 233 may be made of aluminum and the effective surfaces may be anodized.

Heat transfer through the rotary thermal coupling arrangement 233 may be increased by the introduction of a heat transfer medium 349 in the gap between the two portions of the rotary thermal coupling arrangement 233, as depicted in the example of FIG. 15F(c). The heat transfer medium 349 may be a fluid in contact with the effective surfaces of the two portions of the rotary thermal coupling arrangement 233 and filling fully or partially the volume between them (for example, between the fins) to allow for heat transfer through the fluid by the means of conduction, convection, or their combination.

An example of a suitable heat transfer medium 349 is an ionic liquid with an appropriate vapor pressure, allowing it to function without the need of seal. Another example of a heat transfer medium 349 is a solution of a liquid with suspended particles, such as a ferro fluid or magnetic fluid, where the particles may be chosen to improve vapor pressure and/or thermal conductivity.

The rotary thermal coupling arrangement 233 may incorporate a seal isolating the heat transfer medium 349 from the surrounding vacuum environment. The seal may allow for the use of heat transfer medium 349 with vapor pressure higher than the pressure of the vacuum environment and/or a heat transfer medium 349 that passes through a phase change.

In order for any example rotary thermal coupling arrangement to facilitate heat transfer between two links of a robot arm (for example, the robot arm 212), one portion of the example rotary thermal coupling arrangement may be attached to one link (for example, the upper arm 218 in FIG. 15E) and the other portion of the example rotary thermal coupling may be attached to a neighboring link (for instance, upper forearm 220 in FIG. 15E) in an arrangement substantially coaxial with the rotary joint connecting the two links (for example, the elbow rotary thermal coupling arrangement 233 in FIG. 15E). Alternatively, the features of the rotary thermal coupling may be incorporated directly into the links of a robot arm.

As depicted in FIG. 15E, the shoulder rotary thermal coupling arrangement 231 at the shoulder joint 340 follows substantially the same configuration as described herein. The shoulder rotary thermal coupling arrangement 231 at the shoulder joint 340 may be configured to transfer the heat from the upper arm 218 of the robot arm 212 to the neck and housing of the spindle assembly 236 of the drive unit 214, which in turn may be cooled, for instance, by liquid or other coolant, as depicted in the example of FIG. 15E.

In addition to removing heat from the motors in the robot arm 212, a thermal management scheme described with respect to the robot 210 of FIG. 15E may be conveniently extended and utilized to manage heat received by the robot arm 212 from other sources, such as the payload carried by the robot arm 212 and the surroundings of the robot arm 212. This may prevent various challenges due to excessive rise of the temperature of the components of the robot arm 212, including thermal expansion issues, reduced life of bearings, premature lubricant breakdown, and thermal damage to active components, such as motor control modules, sensors, and other electronics, which may be integrated into the robot arm 212.

Figure 15G:
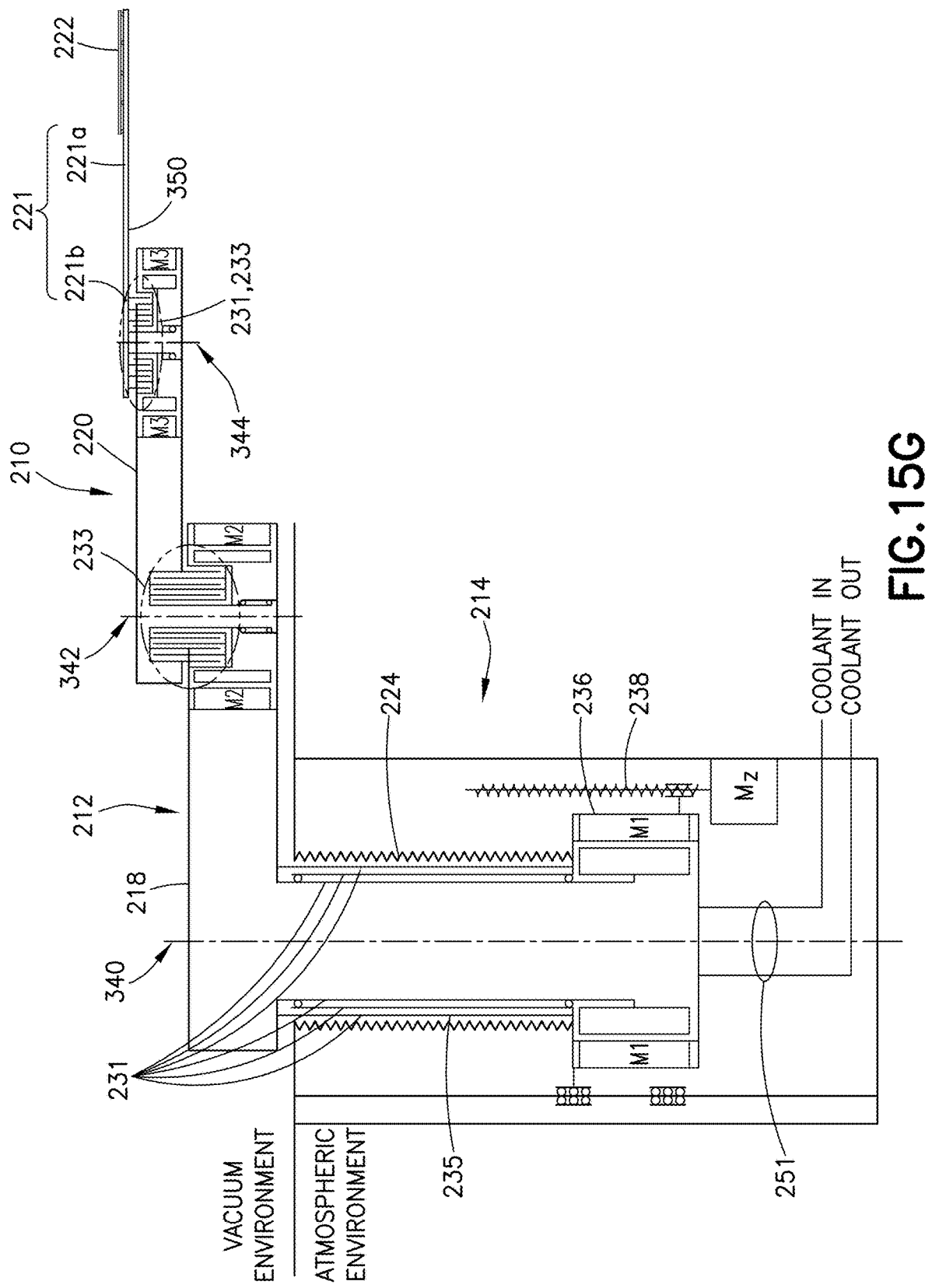
FIG. 15G is a schematic representation of the robot of FIG. 15E having a heat choke and a rotary thermal coupling.

In order to manage the flow of the heat that may emanate from a hot payload or the environment the payload is picked from or placed to, a heat choke 350 and another rotary thermal coupling may be introduced, as illustrated in FIG. 15G.

As shown diagrammatically in FIG. 15G, link 3 or the lower forearm 221 may comprise a first portion 221a adjacent to a payload carried by the end-effector 222, a second portion 221b adjacent to the wrist joint 344, and the heat choke 350 between the first portion 221a and the second portion 221b. The heat choke 350 may be configured to limit heat transfer from the first portion 221a to the second portion 221b. The amount of the heat transferred through the heat choke 350 may be controlled by its thermal resistance, which may be selected along with other design parameters to achieve the desired balance between the temperature of the first portion 221a and the temperature of the second portion 221b. The heat choke 350 may be implemented, for instance, in the form of a section of material with low thermal conductivity, such as a ceramic.

In addition, as depicted in FIG. 15G, a rotary thermal coupling (for example, 231, 233) may be included to complement the wrist joint 344 of the robot arm 212. The rotary thermal coupling 231, 233 may be configured to transfer heat from the second portion 221b to link 2 (the upper forearm 220), thus reducing the temperature of the second portion 221b of link 3. The properties of the rotary thermal coupling 231, 233 may be selected along with the thermal resistance of the heat choke 350 and other design parameters to achieve the desired balance between the temperature of the second portion 221b of link 3 and the temperature of the upper forearm 220 (link 2).

Figure 15H:
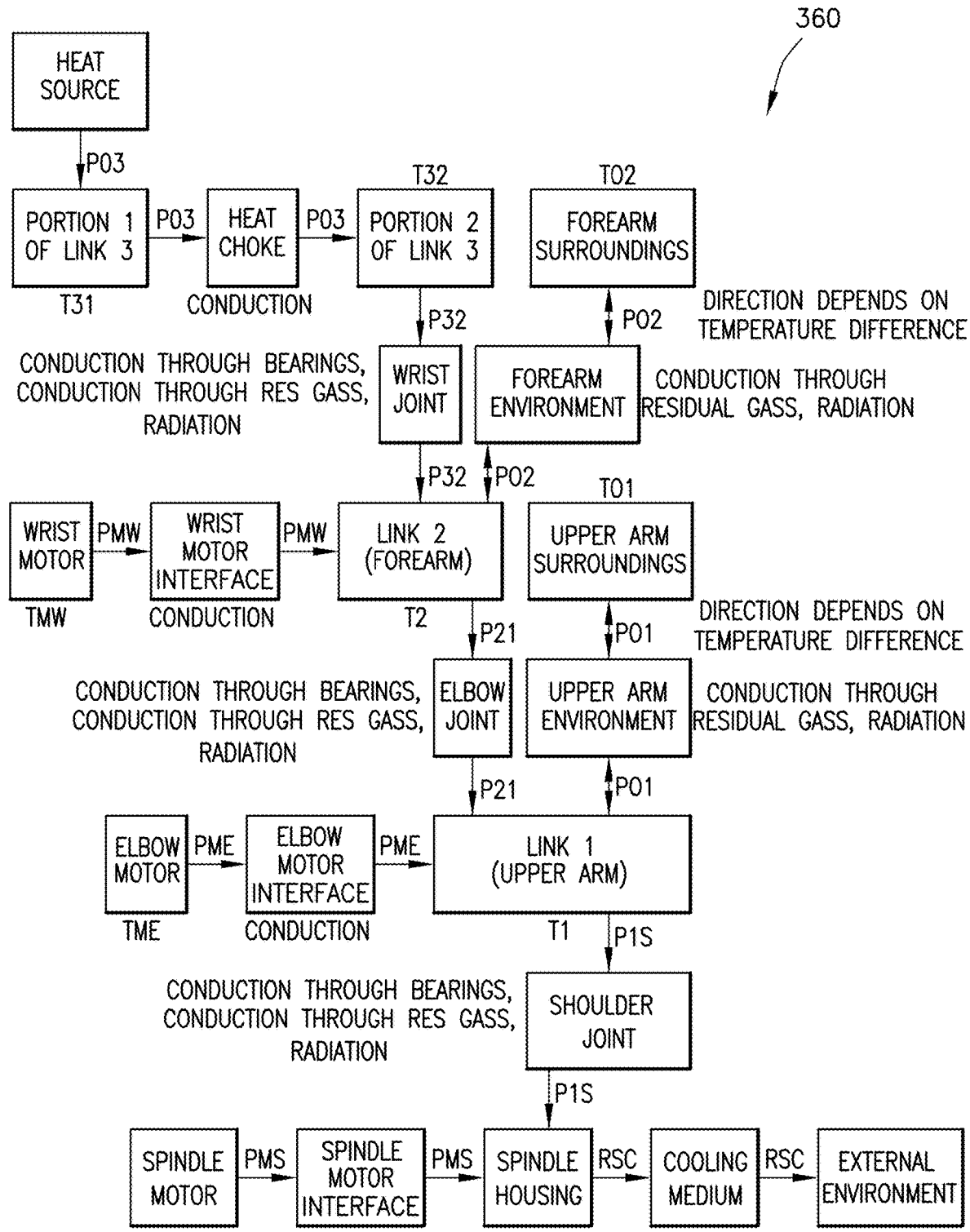
FIG. 15H is a flow of a thermal model of the robot of FIG. 15G.

A simplified thermal model of the example robot 210 of FIG. 15G is shown at 360 in the flow or block diagram of FIG. 15H. The following nomenclature is used in FIG. 15H:

P01 heat transmitted from surrounding environment to link 1 (W)
P02 heat transmitted from surrounding environment to link 2 (W)
P03 heat transmitted from payload and surrounding environment to link 3 (W)
P1S heat transmitted from link 1 to spindle housing (W)
P21 heat transmitted from link 2 to link 1 (W)
P32 heat transmitted from link 3 to link 2 (W)
PME heat transmitted from elbow motor to link 1 (W)
PMS heat transmitted from spindle motor to spindle housing (W)
PMW heat transmitted from wrist motor to link 2 (W)
PSC heat transmitted from spindle housing to cooling medium (W)
T01 temperature of link 1 surroundings (deg C.)
T02 temperature of link 2 surroundings (deg C.)
T1 temperature of link 1 (upper arm) (deg C.)
T2 temperature of link 2 (forearm) (deg C.)
T31 temperature of first portion of link 3 (between payload
and heat choke 350) (deg C.)
T32 temperature of second portion of link 3 (between heat choke 350 and wrist joint 344) (deg C.)
TC inlet temperature of cooling medium at spindle housing (deg C.)
TME temperature of elbow motor (deg C.)
TMS temperature of spindle motor (deg C.)
TMW temperature of wrist motor (deg C.)
TS temperature of spindle housing (deg C.)

As shown in FIG. 15H, major components of the robot 210, including the spindle housing (or housing of the spindle assembly 236), link 1 (upper arm 218), link 2 (upper forearm 220), first portion 221a of link 3 (between the payload and the heat choke 350), and second portion 221b of link 3 (between the heat choke 350 and the wrist joint 344), are represented by discrete lumped thermal masses in the simplified thermal model 360.

Considering that the example robot 210 may handle hot payloads and operate in high-temperature environments, it is assumed that heat may be transferred to the lower forearm 221 defining link 3 from a payload and from the environment the payload may be picked from or placed to (this is represented by the HEAT SOURCE block in FIG. 15H). As indicated in FIG. 15H, it is also assumed that heat may be transferred to link 1 and link 2 (the upper arm 218 and the upper forearm 220) from their surroundings. The heat transfer mechanisms may include radiation from the surroundings as well as convection/conduction if residual gases are present in the vacuum environment. Consistently with the example of FIG. 15G, the block diagram of FIG. 15H reflects that the heat may be removed from the robot 210 by cooling the housing of the spindle assembly 236.

The thermal model 360 of FIG. 15H can be converted to 11 heat transfer equations and 4 energy conservation equations, which may be used to analyze a robot thermal management scheme. For instance, given the heat source and environmental conditions, the temperatures of the robot arm 212 components, including TS, T1, T2, T31, T32, TMS, TME, and TMW, as well as P01, P02, P03, P32, P21, P1S, and PSC may be obtained for a given robot design.

Figure 15I:
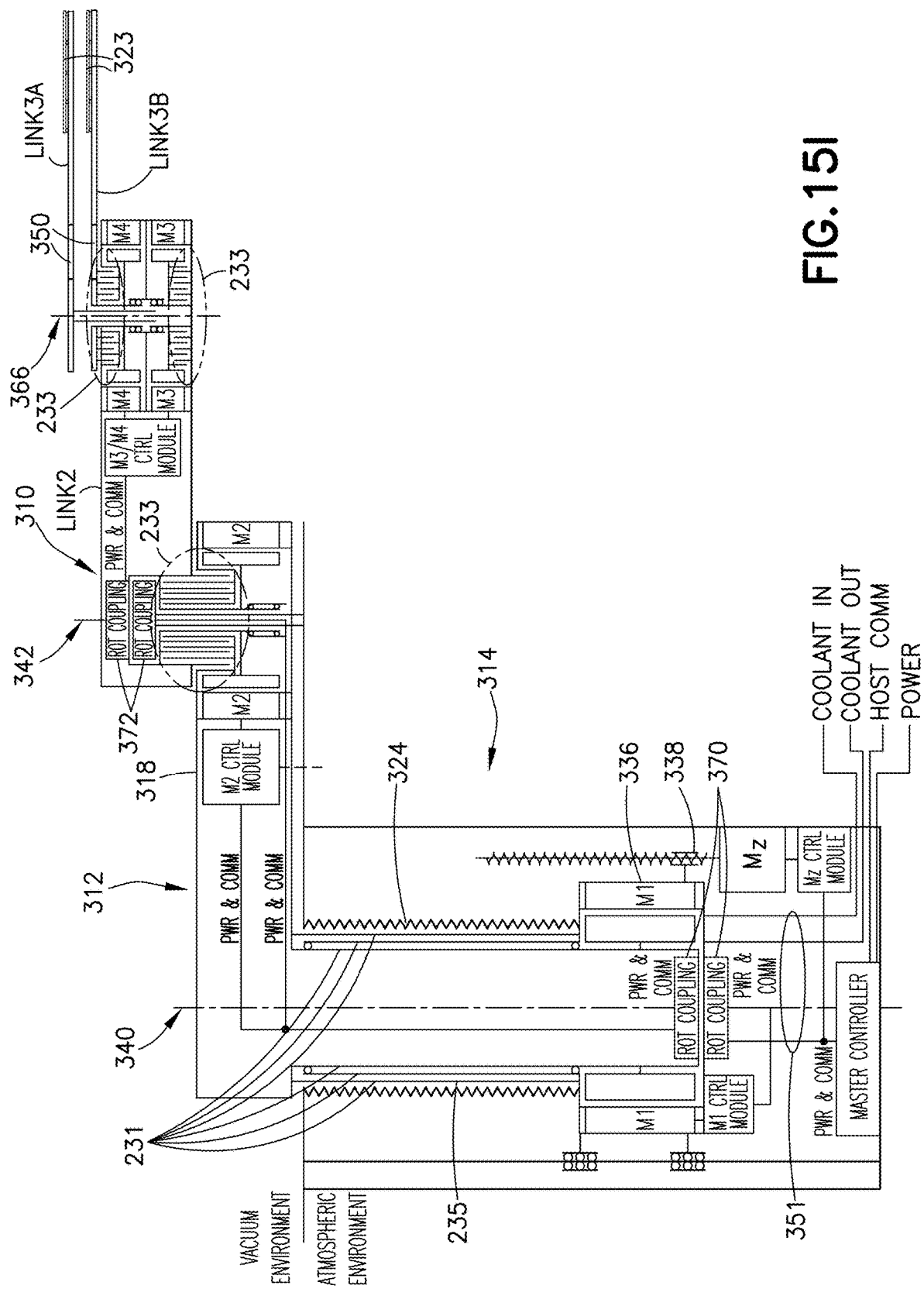
FIG. 15I is a schematic representation of the thermal model of the robot of FIG. 15G extended to an example robot having a robot arm with a two-axis wrist joint.

An extension of the thermal management scheme of the above thermal model 360 to an example robot 310 having a robot arm 312 with a two-axis wrist joint 366 is shown diagrammatically in FIG. 15I. The robot arm 312 has an upper link 318 (link 1), links 2, 3A, and 3B, as well as end-effectors 323 and heat chokes 350, similar to previous example embodiments. The robot arm 312 extends from a drive unit 314 having a bellows 324, a spindle assembly 336, and a Z-axis drive mechanism 338. Power, communication, and coolant lines may run through a service loop 351.

FIG. 15I also illustrates how the power and communication arrangements described earlier can be extended to more complex robot arm configurations where the electrical path through the robot arm 312 may include additional moving joints. In alignment with the power and communication arrangements described earlier, a first electrical rotary coupling 370 at a shoulder joint 340 and a second electrical rotary coupling 372 at an elbow joint 342 may represent, for example, a service loop (for example, similar to service loop 151), electrical slip-ring, inductive coupling, capacitive coupling, optical communication link, radio frequency communication system, and any combination of these and other suitable arrangements. For example, an electrical slip-ring or inductive coupling may be utilized for power transmission, and a capacitive coupling or optical communication link may be used for communication signals.

Figure 15J:
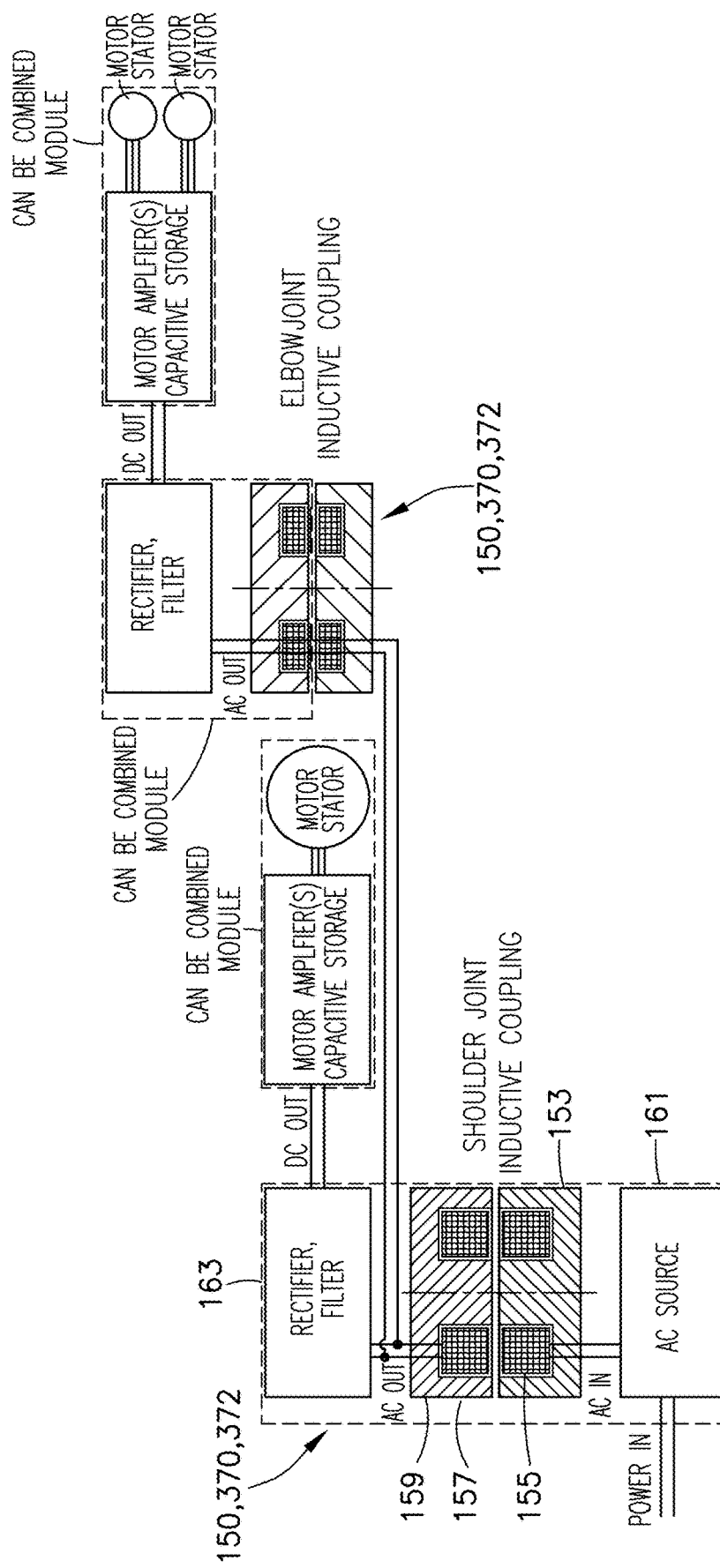
FIGS. 15J(a), 15J(b), and 15J(c) are schematic representations of the thermal model of FIG. 15I utilizing inductive power coupling arrangements.
Figure 15J:
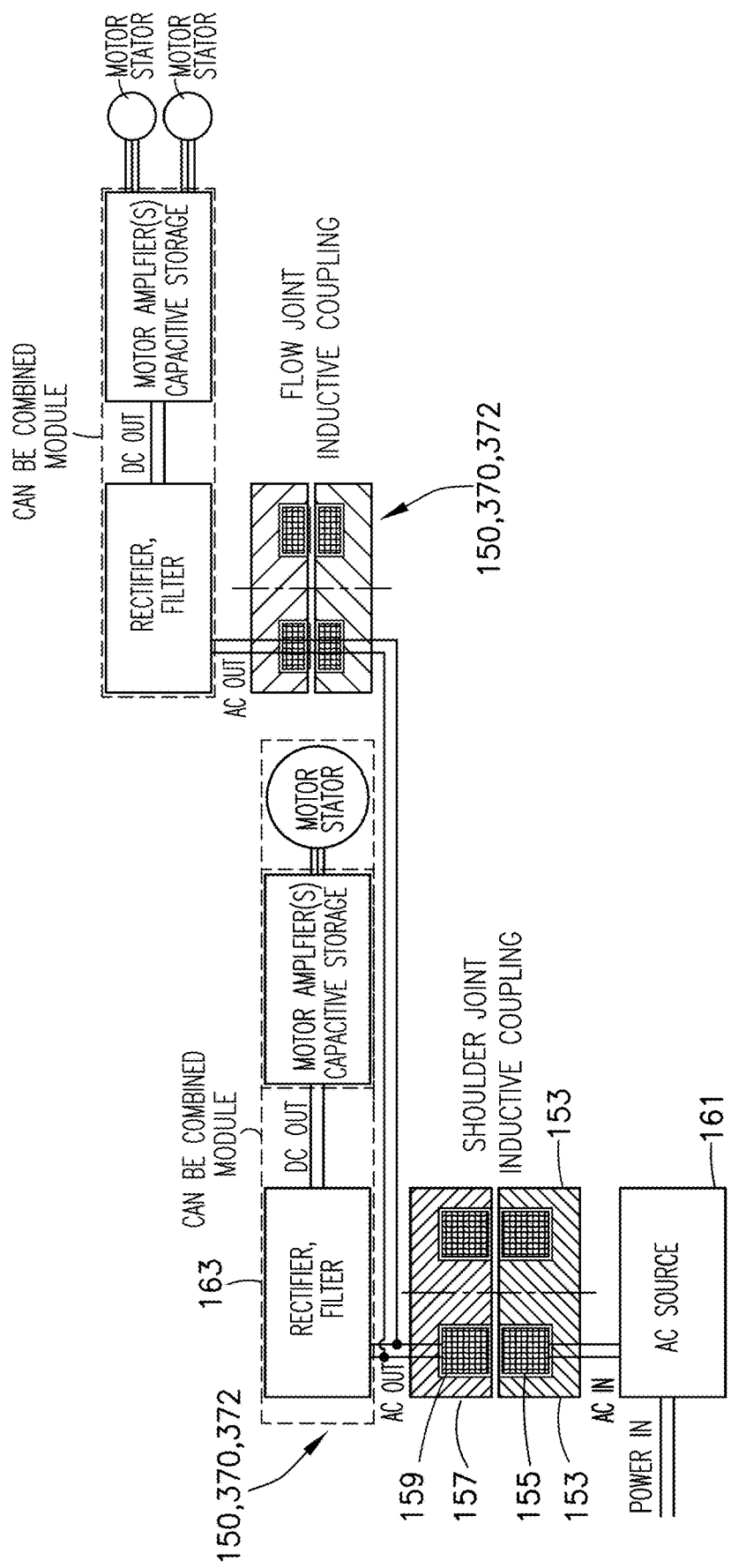
Figure 15J:
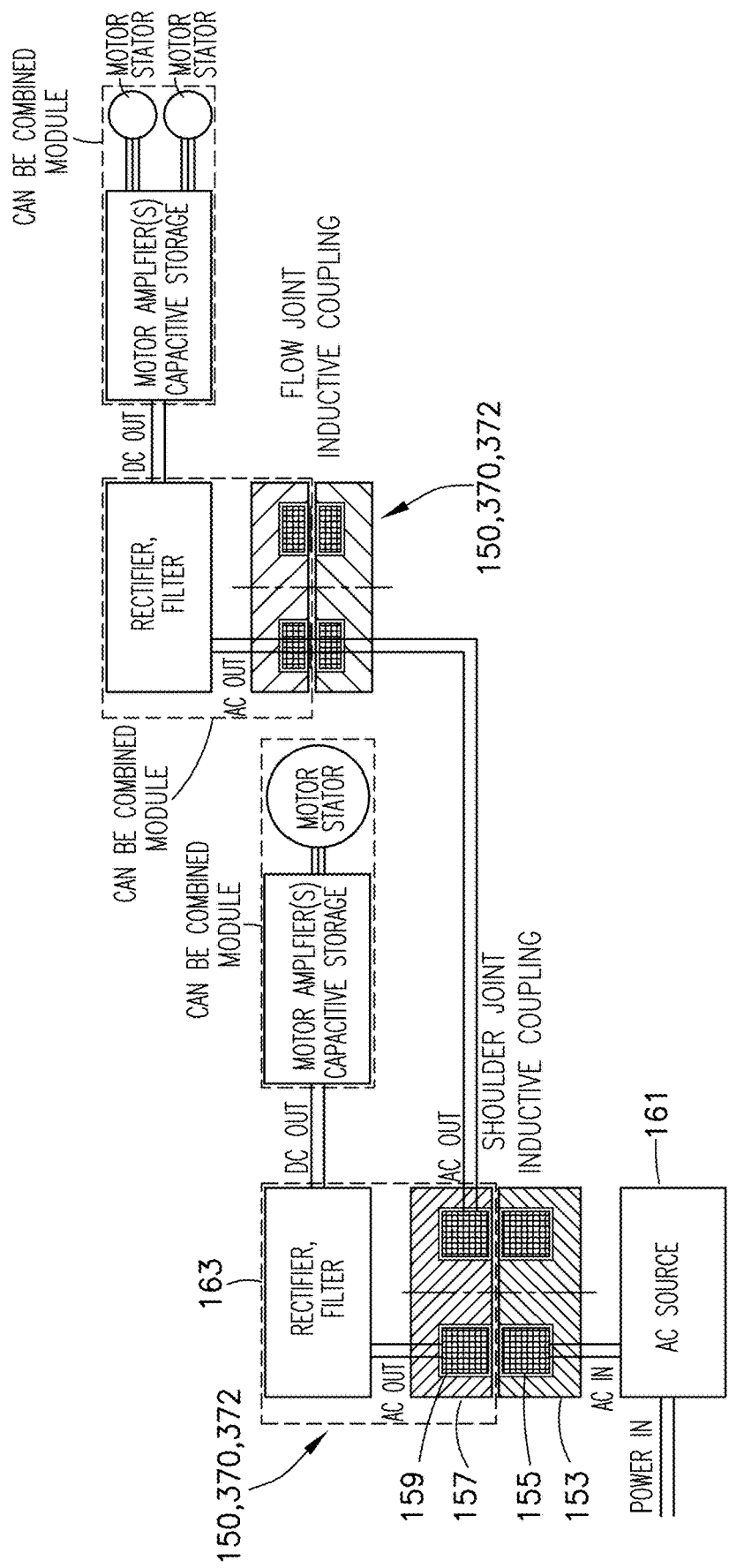

As an example, the concept of inductive power coupling 150 of FIG. 4D, which may provide a non-contact solution with an unlimited range of rotation, can be conveniently extended to the rotary couplings 370, 372 of the example robot arm of FIG. 15I, as depicted diagrammatically in FIGS. 15J(a) to 15J(c). A first example configuration of a suitable inductive power coupling arrangement is shown in FIG. 15J(a), a second example configuration of a suitable inductive power coupling arrangement is shown in FIG. 15J(b), and a third example configuration of a suitable inductive power coupling arrangement is shown in FIG. 15J(c). FIG. 15J(a) shows an example arrangement where the shoulder joint power coupling may feature a single secondary winding, which may feed the rectifier electronics as well as the primary winding of the elbow joint power coupling. The electronics associated with each of the inductive power couplings, such as an AC source on the stationary side of the shoulder power coupling and a rectifier with a filter on the moving side of the shoulder power coupling, may be in the form of separate modules, for instance, printed circuit boards. Alternatively, the electronics may be integrated into the inductive power couplings, as indicated in FIG. 15J(a), or it may be integrated into other electronic assemblies, such as adjacent control modules, as indicated in FIG. 15J(b). FIG. 15J(c) depicts another example arrangement where the shoulder joint power coupling may feature two single secondary windings, one to feed the rectifier electronics and the other to power the primary winding of the elbow joint power coupling. In all three examples, each of the inductive power couplings may be part of an integrated rotary coupling, which may combine an inductive power coupling and an optical communication as described earlier with respect to FIG. 4F.

Figure 15K:
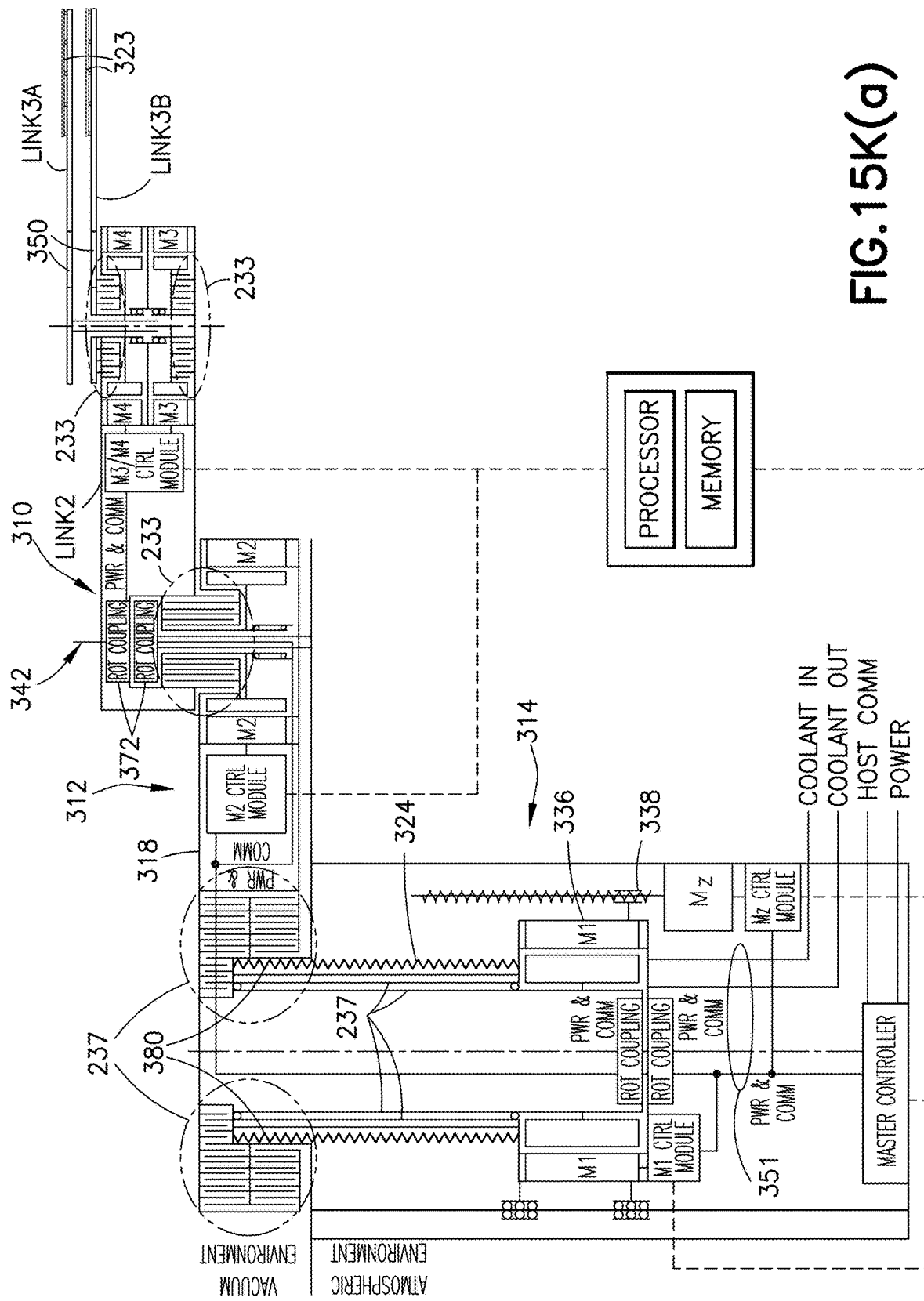
FIGS. 15K(a) and 15K(b) are schematic representations of example robots with distributed actuators and incorporating a thermal management, power distribution, and communication scheme.
Figure 15K:
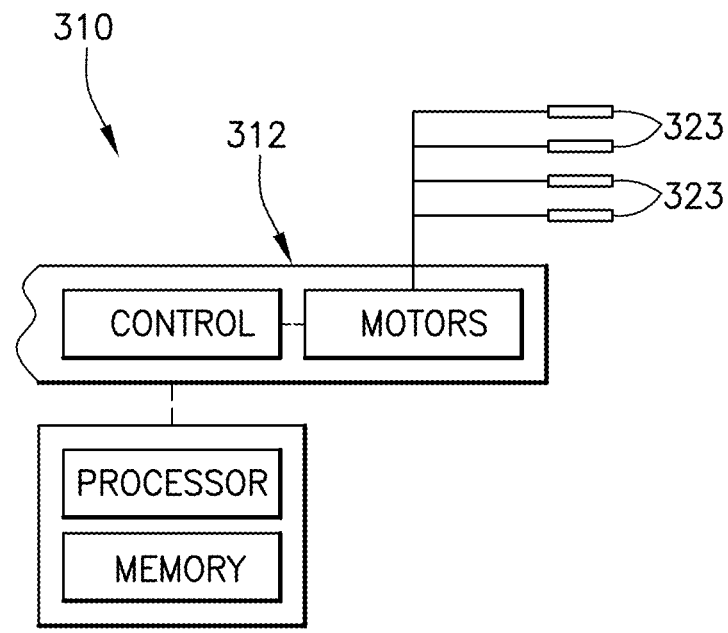

FIG. 15K(a) shows another example of a thermal management, power distribution, and communication scheme suitable for the above example robot with distributed actuators. In the particular example of FIG. 15K(a), the internal volume of link 1 at the shoulder of the robot arm 312 may be utilized for an additional thermal coupling arrangement 237. As indicated in FIG. 15K(a), the internal volume of link 1 at the shoulder of the robot arm 312 may also be recessed, as shown at 380, or otherwise utilized to accommodate B an upper portion of the drive unit 314 and/or a portion of the bellows 124, thus reducing the overall height of the robot 310. This is possible because the example robot 310 with distributed actuators 132 according to FIG. 15K(a), unlike a conventional robot with centralized actuators (see FIGS. 1A and 1B), does not use shoulder pulleys. As shown in FIG. 15K(b), the robot 310 may include the robot arm 312 with more than two end-effectors 323, for example, with three or four end-effectors 323 as shown, each end-effector 323 being driven by a motor or a bank of motors. As with other example embodiments, the motor or bank of motors may be controlled using a controller having processor(s) and memory.

The example thermal management, power distribution, and communication scheme may be viewed as a combination and extension of selected elements described in detail elsewhere in this document, in particular a sealed internal volume of links according to FIG. 2B, an open-loop liquid-cooled spindle and neck assembly according to FIG. 3B, rotary thermal couplings at all joints according to FIG. 15F(a), integrated rotary couplings at the shoulder and elbow joints according to FIG. 4F, power distribution through the robot arm according to FIG. 15J(b), and a control system architecture consistent with the control system architecture described here (for example, incorporating controllers with processors, memories, and software).

With regard to magnetic field containment, the actuators, such as electric motors, distributed through the robot arm may utilize magnetic field for their operation. Some applications, however, may be sensitive to magnetic field effects, for instance, due to the risk of interference with the processes that may be taking place in the vicinity of the robot arm. In this case, it may be advantageous to minimize potential magnetic field leakage from the actuators distributed through the robot arm. As an example, magnetic shielding may be utilized, as illustrated in FIGS. 15L(a) and 15L(b).

Figure 15L:
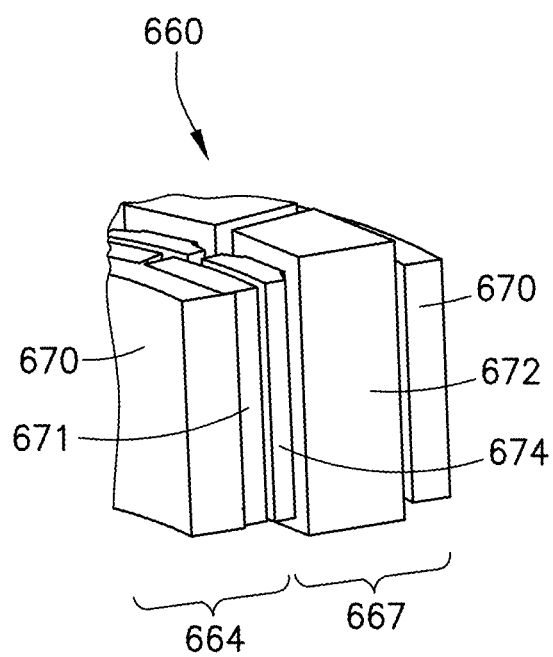
FIG. 15L(a) is a schematic representation of a rotor and stator of a motor of an example robot.
Figure 15L:
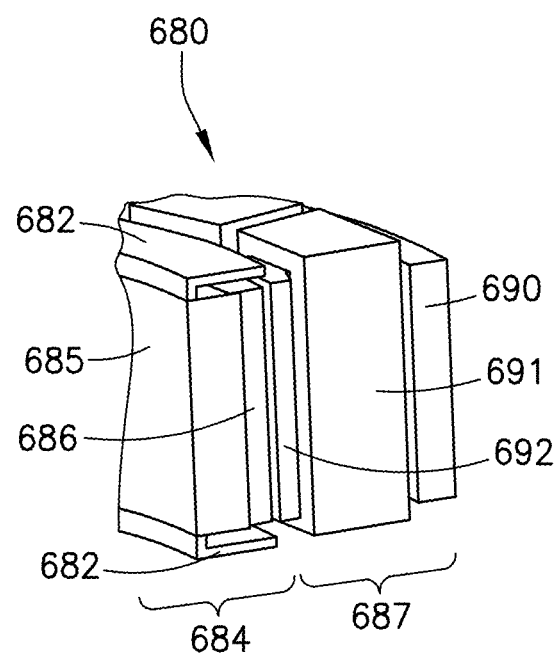

In FIG. 15L(a), a section of an example permanent-magnet brushless direct-current motor in a conventional arrangement without magnetic shielding is shown at 660. A rotor 664 rotates relative to a stator 667. The rotor 664 includes a yoke 670 and a magnet 671, and the stator 667 includes a core 670, a winding 672, and a tooth 674. FIG. 15L(b) depicts a section of a permanent-magnet brushless direct-current motor 680 with an example magnetic shielding arrangement 682 according to the present invention.

As illustrated in FIG. 15L(b), a rotor 684 of the motor 680 rotates relative to a stator 687 and may include one or more magnetic shields 682 configured to contain magnetic field from the magnets 686 of the rotor 684 of the motor 680. In this particular example, the magnetic shields 682 may comprise two ring-shaped structures, which may be made of a soft-magnetic material and which may be located above and below the rotor 684, extending radially up to or beyond the imaginary cylindrical surface defined by the outer surfaces of the magnets 686 of the rotor 684 of the motor 680. Again, the stator 689 includes a core 690, a winding 691, and a tooth 692.

In the example embodiment of FIG. 15L(b), the magnetic shields 682 are shown over-hanging the magnets 686 of the rotor 684 of the motor 680 with a gap between the magnetic shields 682 and the magnets 686 of the rotor 684 of the motor 680. Alternatively, the magnetic shields 682 and the magnets 686 of the rotor 684 of the motor 680 may be in contact with substantially no gap between them. The magnetic shields 682 may be designed as an integral part of the yoke 685 of the rotor 684 of the motor 680 or as separate parts attached to the rotor 684 of the motor 680.

Figure 16:
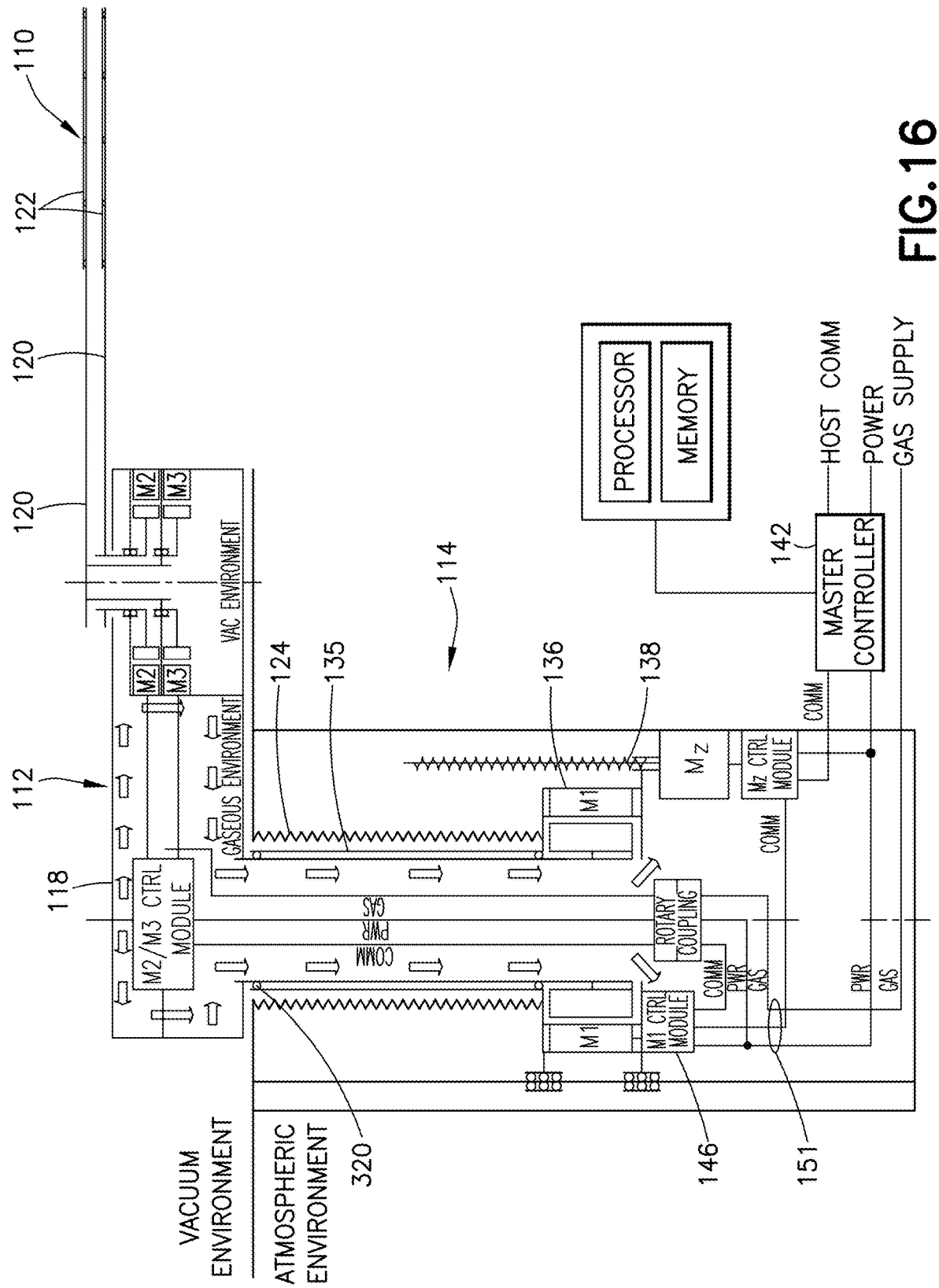
FIG. 16 is a schematic representation of an example robot having a control system architecture in which a master controller resides outside of a robot drive unit.

Turning now to control system architecture, in one example embodiment, as illustrated diagrammatically, for instance, in FIG. 15A, the actuators 132 in the robot arm 112 may be controlled by the control module 148 located conveniently in close proximity to the actuators 132 in the robot arm 112. The motor M1 located in the spindle assembly 136 of the robot drive unit 114 may be controlled by a control module 146 attached to the spindle assembly 136. The Z-motor Mz may be controlled by a control module 144 stationary in the robot drive unit 214. The control modules 144, 146, 148 may be coordinated, for instance, over a communication network, by a master controller 142 which may be also located in the robot drive unit 114. The master controller 142 may comprise, for example, at least one respective processor (PROCESSOR) and at least one respective memory (MEMORY) storing a program of instructions. In another example embodiment, the master controller 142 may comprise a servo motor controller. The master controller 142 and the Z-motor control module 144 may be separate devices or they may be combined into a single integrated device. Alternatively, as depicted diagrammatically in FIG. 16, the master controller 142 may reside outside of the robot drive unit 114.

Figure 17:
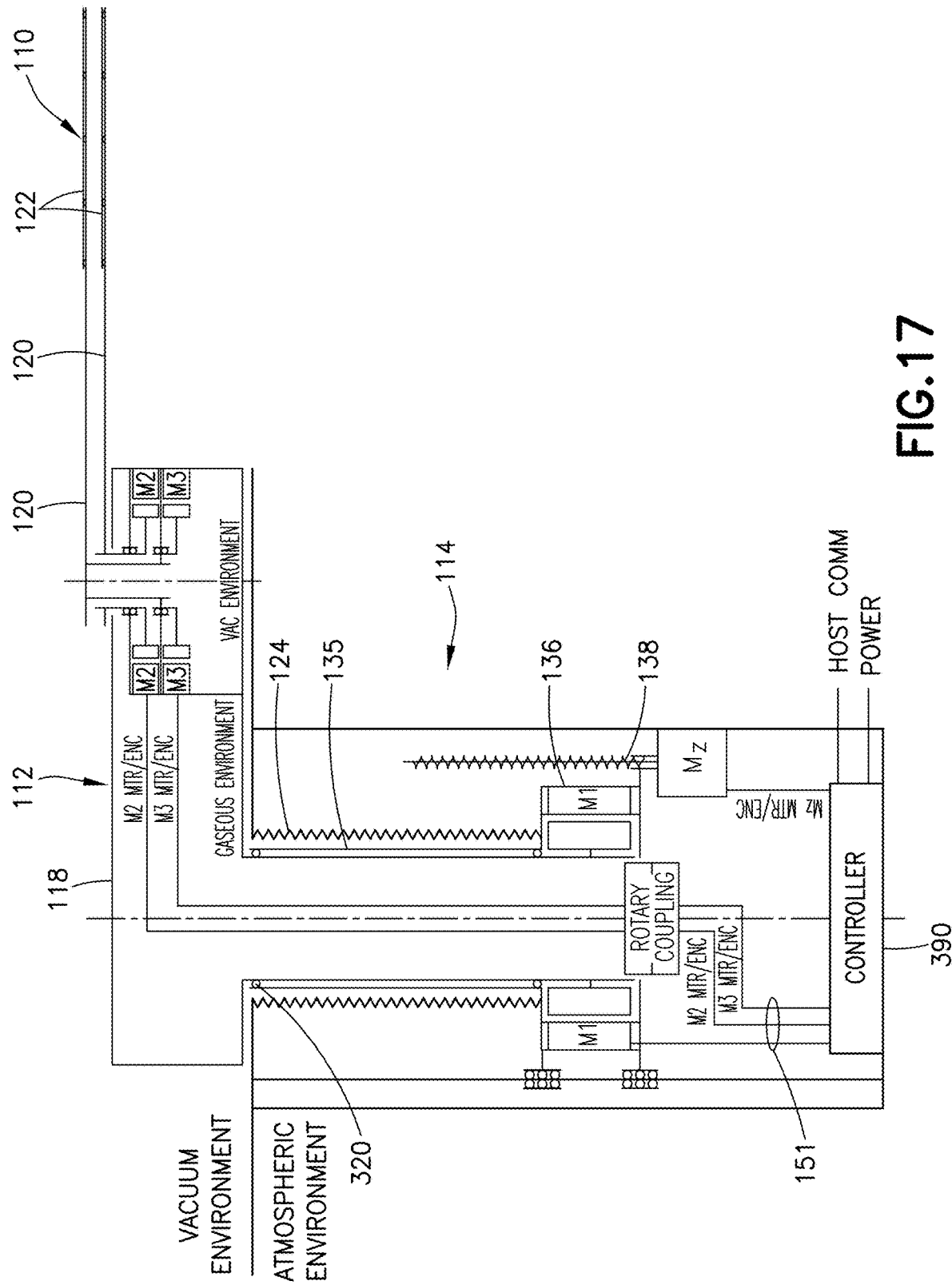
FIG. 17 is a schematic representation of an example robot in which a centralized controller inside a robot drive unit receives signals and power.
Figure 18A:
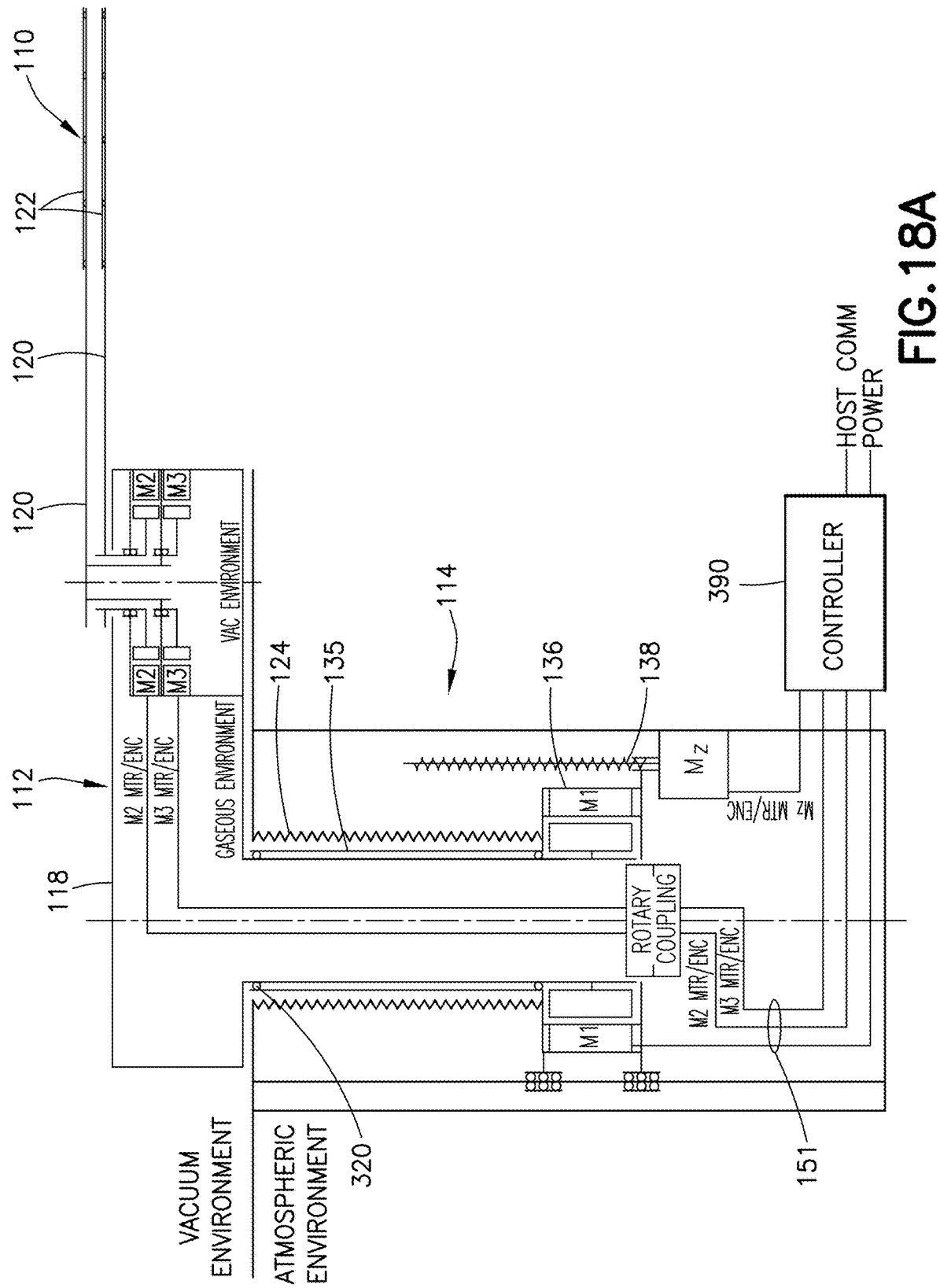
FIG. 18A is a schematic representation of an example robot in which a centralized controller outside of a robot drive unit receives signals and power.

In another example embodiment, encoder signals and motor lines may be brought to a centralized controller 390 located inside the robot drive unit 114 or outside of the robot drive unit 114, as shown diagrammatically in FIGS. 17 and 18A, respectively. Alternatively, any combination of the configurations of FIGS. 15A to 18A may be used. Also, although the above example control system architectures are depicted in FIGS. 15A to 18A with respect to one example power, communication, and cooling arrangement, they are applicable to other power, communication, and cooling arrangements described earlier.

Figure 18B:
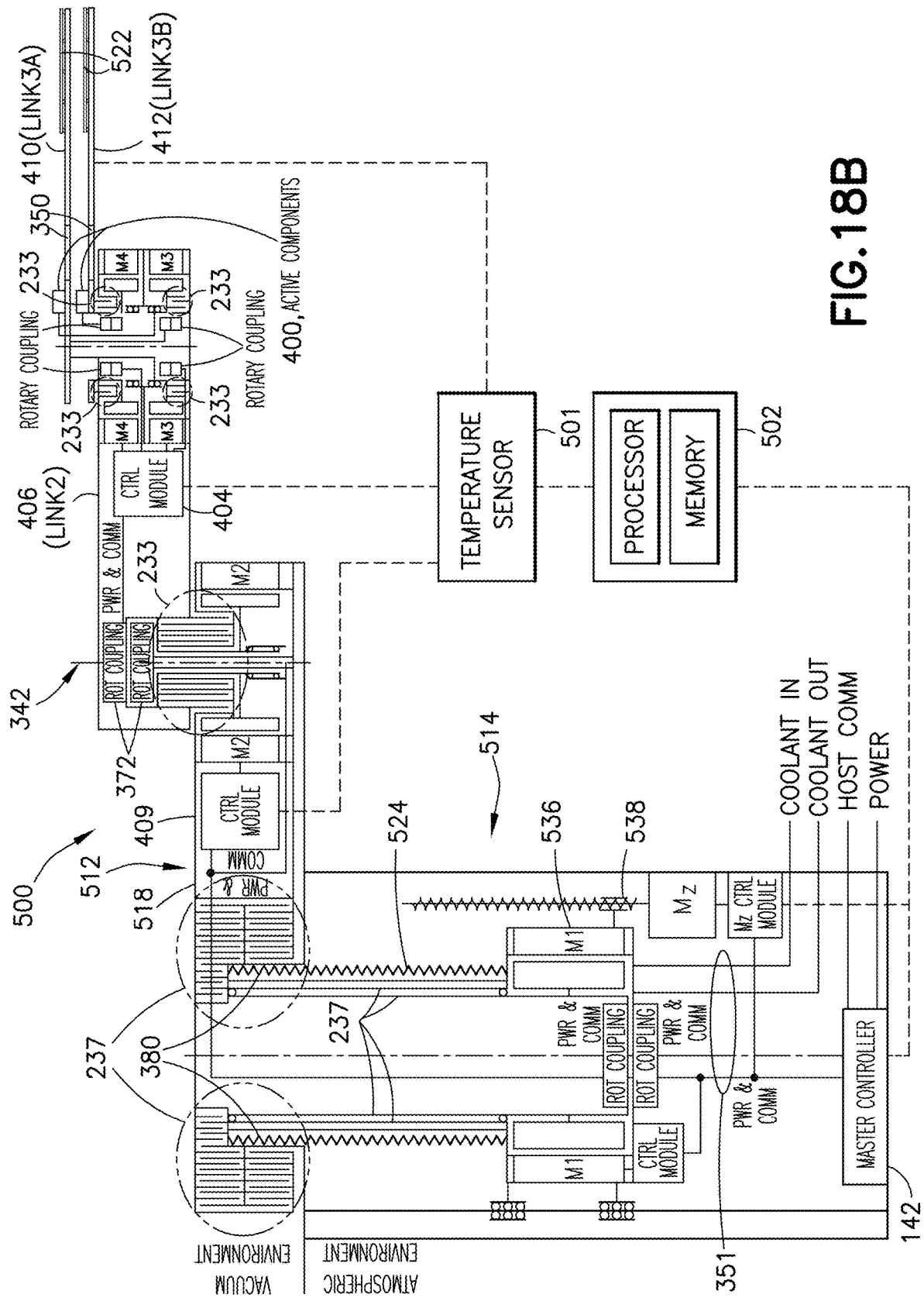
FIG. 18B is a schematic representation of an example robot incorporating additional active components.

Additional active components 400 may be incorporated as shown in a robot 500 having a robot arm 512 (and a bellows 524, a drive unit 514, a spindle assembly 536, a Z-axis mechanism 538, and a service loop 551, similar to previous example embodiments), as illustrated in the example embodiment of FIG. 18B. In the robot 500 of FIG. 18B, the active components 400 are understood to be any devices that may utilize power (electrical or otherwise) and/or communication signals (electrical or otherwise). Example active components may include actuators, grippers, heaters, sensors (proximity, position, temperature, pressure), and cameras.

As an example, the active components 400 may include sensors that may be used to detect the presence of a payload on one or more end-effectors 522 and/or to determine the position of a payload on the end-effector 522. As another example, the active components 400 may include sensors and cameras, which individually and/or in conjunction may be utilized to determine the location of the end-effector(s) 522 with respect to features in the surrounding environment. Information from such active components 400 may be used to teach (automatically or with manual assistance) a location of a workstation and/or to improve the accuracy of payload placement.

Considering the particular example of FIG. 18B, a control module 404 located in a link 2 406 may be conveniently utilized to interact with active components 400 (such as a material-handling component for use with a robot) associated with a lower arm or link 3A 410 and a lower arm or link 3B 412, each having end-effectors 522 configured to accept payloads. As indicated in FIG. 18B, a rotary coupling 470 at the rotary joint between the lower arm or link 3A 410 and link 2 406 may be used to facilitate interaction, for example, via electrical connection(s) or optical signals, between the active components 400 associated with the lower arm or link 3A 410 and the control module 404 in link 2 406. Similarly, a rotary coupling 416 at the rotary joint between the lower arm or link 3B 412 and link 2 406 may be used to facilitate interaction, for example, via electrical connection(s) or optical signals, between the active components 400 associated with the lower arm or link 3B 412 and the control module 404 in link 2 406. In this arrangement, the active components 400 associated with the lower arm or link 3A 410 and the lower arm or link 3B 412 may be conveniently controlled or otherwise interacted with via the same communication channel, such as a communication network, that may be utilized to communicate with the control module 404 in link 2 406, thus significantly reducing the complexity of the wiring through the robot arm 512. As with previously-described example embodiments, the motors (or any portions thereof) may be sealed within the links, and thermal, power, and communication may be effected through sealing structures.

As an example, the active components 400 associated with the lower arm or link 3A 410 and the lower arm or link 3B 412 may include a gripper, such as an electrostatic chuck, or any other material-handling utensil or device suitable for use in wafer processing or other processing in which the example robots described herein may be used, and the control module 404 in link 2 406 may include electronics necessary to operate the gripper. In this arrangement, the gripper may be conveniently controlled via the same communication channel, such as a communication network, that may be utilized to communicate with the control module in link 2 406.

Alternatively, active components 400 associated with the lower arm or link 3A 410 and the lower arm or link 3B 412 may be controlled or otherwise interacted with using separate electronics that may be connected directly to the communication network or interact through another channel with the control module in link 2 406.

With respect to thermal expansion compensation, the robot 500 may include temperature sensors 501 configured to measure temperature of its structural components, such as the links of the robot arm 512. As an example, the temperature sensors 501 may be implemented in the form of individual devices attached to the links of the robot arm 512 or they may be integrated into the electronics, such as the control modules thermally connected to the links of the robot arm 512 (for example, the control module 404 in link 2 406 and a control module 409 in a link 1 411). The information from the temperature sensors 501 may be utilized by the control system (for example, controller 502 having a processor and a memory and which may be coupled to, integrated with, or in communication with the master controller 142) to compensate for the effect of temperature expansion of the structural components of the robot 500 on the position of the end-effector(s) 522 of the robot 500.

As an example, the following steps may be used by the control system to compensate for the effect of temperature expansion of the structural components of the robot 500 on the position of the end-effector(s) 522 of the robot 500 so that the robot 500 can pick or place a payload accurately regardless of the temperature of the structural components of the robot 500 (Method A):

A1. Measure temperatures of structural components of the robot 500, the dimensions of which affect the actual position of the end-effector(s) 522 of the robot 500. As an example, the structural components may be the links of the robot arm 512.

A2. Utilizing the measured temperatures, estimate parameters of the kinematic model of the robot 500. The kinematic model of the robot 500 may be a mathematic expression (equation) or a set of expressions (equations) utilized to convert joint coordinates of the robot 500 to end-effector coordinates of the robot 500 (direct kinematics) and vice versa (inverse kinematics). The parameters of the kinematic model of the robot 500 may be, for instance, dimensions of the links of the robot arm 512, such as the joint-to-joint lengths of the links of the robot arm 512. The estimated parameters of the kinematic model of the robot 500 may be referred to as the adjusted parameters of the kinematic model.

A3. Using the adjusted parameters of the kinematic model, use inverse kinematics to calculate joint coordinates of the robot 500 that correspond to the destination end-effector coordinates of the robot 500 (the coordinates of the end-effector 522 of the robot 500 at the desired end point of the move). The calculated joint coordinates of the robot 500 may be referred to as the adjusted destination joint coordinates of the robot 500.

A4. Based on the adjusted destination joint coordinates of the robot 500 and utilizing the nominal parameters of the kinematic model, use direct kinematics to calculate the corresponding end-effector coordinates of the robot 500. The calculated end-effector coordinates of the robot 500 may be referred to as the adjusted destination end-effector coordinates of the robot 500.

A5. Generate a trajectory from the current commanded end-effector coordinates of the robot 500 to the adjusted destination end-effector coordinates of the robot 500 in the end-effector coordinate space. The result may be a set of commanded intermediate points in the end-effector coordinate space between the current commanded end-effector coordinates of the robot 500 and the adjusted destination end-effector coordinates of the robot 500.

A6. For each commanded intermediate point in the coordinate end-effector space, utilizing the nominal parameters of the kinematic model, use the inverse kinematics to calculate the corresponding joint coordinates of the robot 500. The resulting joint coordinates of the robot 500 may be referred to as the commanded joint coordinates of the robot 500.

A7. Utilize the commanded joint coordinates of the robot 500 to control the motors of the robot 500 so that the actual joint coordinates of the robot 500 follow closely the commanded joint coordinates of the robot 500.

In the above steps, the joint coordinates may be, for instance, angular positions of the actuators (motors) that drive the links of the robot arm 512, and the end-effector coordinates may be Cartesian coordinates of a reference point on the robot end-effectors. As another example, the end-effector coordinates may be Cartesian coordinates of a reference point on the robot end-effector and orientation of the robot end-effector.

Step A6 above may be performed either prior to the start of the move of the robot 500, periodically during execution of the move of the robot 500, for example, substantially in parallel with step A7, or a combination of these two schemes may be used. For example, step A5 may generate a coarse set of commanded intermediate points in the end-effector coordinate space prior to the move of the robot 500, and finer commanded intermediate points may be calculated during execution of the move. In this case, step A6 may be applied to each of the finer intermediate commanded points during execution of the robot move.

The objective of the above method is to correct the position of an end-effector of the robot 500 at the end-points of moves, which may allow the robot 500 to pick or place a payload accurately regardless of the temperature of its structural components. However, the actual motion path of the end-effector 522 of the robot 500 between the end-points may not accurately follow the desired path because the nominal values of the kinematic parameters used by the control system to calculated commanded joint coordinates may not reflect the actual dimensions of the structural components of the robot 500. For example, if the desired path of the end-effector 522 of the robot 500 to an end-point of a move is a straight line, the actual path of the end-effector 522 may deviate from the desired straight-line path between the start point and the end-point of the move.

Alternatively, if accurate motion between end points is desired, the following steps may be used by the control system to compensate for the effect of temperature expansion of the structural components of the robot 500 on the position of the end-effector(s) 522 of the robot 500 during motion (Method B):

B1. Measure temperatures of structural components of the robot 500, the dimensions of which affect the actual position of the end-effector(s) 522 of the robot 500.

B2. Utilizing the measured temperatures, estimate parameters of the kinematic model of the robot 500. The estimated parameters of the kinematic model of the robot 500 may be referred to as the adjusted parameters of the kinematic model.

B3. Based on the current commanded joint coordinates of the robot 500 and utilizing the adjusted parameters of the kinematic model, use the direct kinematics to calculate the corresponding end-effector coordinates of the robot 500. The calculated end-effector coordinates of the robot 500 may be referred to as the adjusted start end-effector coordinates of the robot 500.

B4. Generate trajectory from the adjusted start end-effector coordinates of the robot to the destination end-effector coordinates of the robot (the coordinates of the end-effector of the robot at the desired end point of the move) in the end-effector coordinate space. The result may be a set of commanded intermediate points in the end-effector coordinate space between the adjusted start end-effector coordinates of the robot and the destination end-effector coordinates of the robot.

B5. For each commanded intermediate point in the coordinate end-effector space, utilizing the adjusted parameters of the kinematic model, use the inverse kinematics to calculate the corresponding joint coordinates of the robot 500. The resulting joint coordinates of the robot 500 may be referred to as the commanded joint coordinates of the robot 500.

B6. Utilize the commanded joint coordinates of the robot 500 to control the motors of the robot 500 so that the actual joint coordinates of the robot 500 follow closely the commanded joint coordinates of the robot 500.

Step B5 above may be performed either prior to the start of the move of the robot 500, periodically during execution of the move of the robot 500, for example, substantially in parallel with step B6, or a combination of these two schemes may be used. For example, step B4 may generate a coarse set of commanded intermediate points in the end-effector coordinate space prior to the move of the robot 500, and finer commanded intermediate points may be calculated during execution of the move. In this case, step B5 may be applied to each of the finer intermediate commanded points during execution of the robot move.

In the above methods, prior to executing the steps outlined above, the destination end-effector coordinates (end point) may be adjusted to reflect the thermal expansion of the system where the robot 500 operates. For example, the destination end-effector coordinates may be adjusted to reflect the change in the distance between the robot drive unit 514 in a transfer chamber and a station in a process module of a semiconductor wafer processing system due to thermal expansion of the transfer chamber and the process module.

The above thermal expansion compensation methods can be illustrated, for instance, on the example robot of FIG. 2A or FIG. 2B. The kinematic model of this example robot can be derived from the graph of FIG. 18C, which depicts the upper arm (link 1) and one forearm (link 2) of the robot. The following nomenclature is used in the figure:

L1 length of link 1 (upper arm) from shoulder joint to elbow joint (m)
L2 length of link 2 (forearm) from elbow joint to reference point on robot end-effector (m)
X x-coordinate of reference point on robot end-effector (m)
Y y-coordinate of reference point on robot end-effector (m)
θ1 angle of link 1 (upper arm) with respect to fixed coordinate frame (rad)
θ2 angle of link 2 (forearm) with respect to link 1 (upper arm) (rad)

Figure 18C:
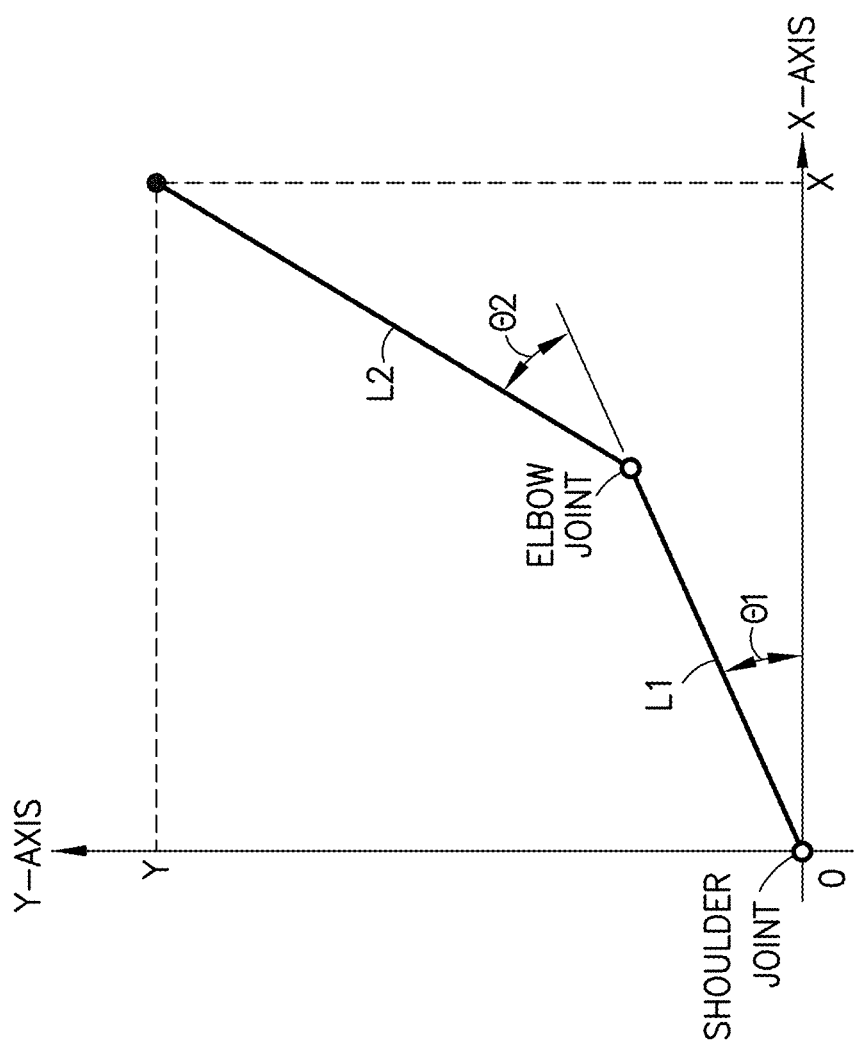
FIG. 18C is a graphical representation showing example kinematics of an example robot.

Considering the diagram of FIG. 18C, the direct kinematics of the example robot of FIG. 2A or FIG. 2B can be described by the following equations:

$$X = L1 \cos \theta1 + L2 \cos(\theta1 + \theta2) \quad (1)$$

$$Y = L1 \sin \theta1 + L2 \sin(\theta1 + \theta2) \quad (2)$$

Similarly, referring still to FIG. 18C, the equations for the inverse kinematics of the example robot of FIG. 2A or 2B can be formulated as follows:

$$\theta2 = a \cos [(X^2 + Y^2 - L1^2 - L2^2)/(2L1\ L2)] \quad (3)$$

$$\theta1 = a \tan(Y/X) - a \tan [L2 \sin \theta2/(L1 + L2 \cos \theta2)] \quad (4)$$

In accordance with the terminology established earlier, the length of link 1 (upper arm), L1, and the length of link 2 (forearm), L2, are referred to as the parameters of the kinematic model of the example robot.

The actual values of the above parameters of the kinematic model can be estimated based on their nominal values and the measured temperatures of link 1 (upper arm) and link 2 (forearm) according to the following expressions:

$$L1adj = L1nom\ CTE1(T1act - Tnom) \quad (5)$$

$$L2adj = L2nom\ CTE2(T2act - Tnom) \quad (6)$$

where
CTE1 coefficient of thermal expansion for link 1 (upper arm) (1/K)
CTE2 coefficient of thermal expansion for link 2 (forearm) (1/K)
L1adj adjusted length of link 1 (upper arm) (m)
L1nom nominal length of link 1 (upper arm) at temperature Tnom (K)
L2adj adjusted length of link 2 (forearm) (m)
L2nom nominal length of link 1 (forearm) at temperature Tnom (K)

T1$act$ measured temperature of link 1 (upper arm) (K)
T2$act$ measured temperature of link 2 (forearm) (K)
Tnom nominal temperature of robot arm (K)

Utilizing the above equations, thermal expansion compensation Method A can be applied to the example robot of FIG. 2A or FIG. 2B as follows:

A1. Measure temperature of link 1 (upper arm), T1$act$, and temperature (forearm) of link 2 (forearm), T2$act$.

A2. Calculate adjusted length of link 1 (upper arm), L1$adj$, and adjusted length of link 2 (forearm), L2$adj$, using Equations (5) and (6).

A3. Calculate adjusted destination joint coordinates of the robot, $\theta1dstadj$ and $\theta2dstadj$, based on the inverse kinematic equations (3) and (4):

$$\theta2dstadj = a\cos[(Xdst^2+Ydst^2-L1adj^2-L2adj^2)/(2L1adj\,L2adj)] \quad (7)$$

$$\theta1dstadj = a\tan(Ydst/Xdst) - a\tan[L2adj\sin\theta2dstadj/(L1adj+L2adj\cos\theta2dstadj)] \quad (8)$$

where

Xdst x-coordinate of reference point on robot end-effector at desired move endpoint (m)
Ydst y-coordinate of reference point on robot end-effector at desired move end point (m)
$\theta1dstadj$ adjusted angle of link 1 (upper arm) at desired move end point (rad)
$\theta2dstadj$ adjusted angle of link 2 (forearm) at desired move end point (rad)

A4. Determine adjusted destination end-effector coordinates, Xdstadj and Ydsadj, based on the direct kinematic equations (1) and (2):

$$Xdstadj = L1nom\cos\theta1dstadj + L2nom\cos(\theta1dstadj+\theta2dstadj) \quad (9)$$

$$Ydstadj = L1nom\sin\theta1dstadj + L2nom\sin(\theta1dstadj+\theta2dstadj) \quad (10)$$

where

Xdstadj adjusted x-coordinate of reference point on robot end-effector at move endpoint (m)
Ydstadj adjusted y-coordinate of reference point on robot end-effector at move end point (m)

A5. Generate trajectory from the current commanded end-effector coordinates of the robot, Xcmd0 and Ycmd0, to the adjusted destination end-effector coordinates of the robot, Ydstadj and Ydstadj, in the end-effector coordinate space. The result may be a set of commanded intermediate points Xcdmi and Ycmdi, i=1, 2, . . . , N, where N is the number of trajectory points.

A6. For each commanded intermediate point Xcmdi and Ycmdi, calculate the corresponding commanded joint coordinates of the robot, $\theta1cmdi$ and $\theta2cmdi$, based on the inverse kinematic equations (3) and (4):

$$\theta2cmdi = a\cos[(Xcmdi^2+Ycmdi^2-L1nom^2-L2nom^2)/(2L1nom\,L2nom)\} \quad (11)$$

$$\theta1cmdi = a\tan(Ycmdi/Xcmdi) - a\tan[L2nom\sin\theta2cmdi/(L1nom+L2nom\cos\theta2cmdi)] \quad (12)$$

where $\theta1cmdi$ adjusted angle of link 1 (upper arm) at trajectory point i (rad)
$\theta2cmdi$ adjusted angle of link 2 (forearm) at trajectory point I (rad)

A7. Utilize the commanded joint coordinates of the robot, $\theta1cmdi$ and $\theta2cmdi$, to control the motors of the robot, for example, motor M1 and motor M2, so that the actual joint coordinates of the robot follow closely the commanded joint coordinates of the robot.

Similarly, utilizing Equations (1) to (6), thermal expansion compensation Method B can be applied to the example robot of FIG. 2A or FIG. 2B as follows:

B1. Measure temperature of link 1 (upper arm), T1$act$, and temperature (forearm) of link 2 (forearm), T2$act$.

B2. Calculate adjusted length of link 1 (upper arm), L1$adj$, and adjusted length of link 2 (forearm), L2$adj$, using Equations (5) and (6).

B3. Based on the current commanded joint coordinates of the robot, $\theta1cmd0$ and $\theta2cmd0$, and utilizing the adjusted parameters of the kinematic model, L1$adj$ and L2$adj$, adapt the direct kinematic equations (1) and (2) to calculate the adjusted start end-effector coordinates of the robot, Xcm0 and Ycmd0:

$$Xcmd0 = L1adj\cos\theta1cmd0 + L2adj\cos(\theta1cmd0+\theta2cmd0) \quad (13)$$

$$Ycmd0 = L1adj\sin\theta1cmd0 + L2adj\sin(\theta1cmd0+\theta2cmd0) \quad (14)$$

B4. Generate trajectory from the adjusted start end-effector coordinates of the robot, Xcm0 and Ycmd0, to the destination end-effector coordinates of the robot, Xdst and Ydst, in the end-effector coordinate space. The result may be a set of commanded intermediate points in the end-effector coordinate space, Xcmdi and Ycmdi, i=1, 2, . . . , N, where N is the number of trajectory points.

B5. For each commanded intermediate point, Xcmdi and Ycmdi, utilize the adjusted parameters of the kinematic model, L1$adj$ and L2$adj$, in the inverse kinematic equations (3) and (4) to calculate the corresponding commanded joint coordinates of the robot $\theta1cmdi$ and $\theta2cmdi$:

$$\theta2cmdi = a\cos[(Xcmdi^2+Ycmdi^2-L1adj^2-L2adj^2)/(2L1adj\,L2adj)] \quad (15)$$

$$\theta1cmdi = a\tan(Ycmdi/Xcmdi) - a\tan[L2adj\sin\theta2cmdi/(L1adj+L2adj\cos\theta2cmdi)] \quad (16)$$

B6. Utilize the commanded joint coordinates of the robot, $\theta1cmdi$ and $\theta2cmdi$, to control the motors of the robot, for example, motor M1 and motor M2, so that the actual joint coordinates of the robot follow closely the commanded joint coordinates of the robot.

Figure 19A:
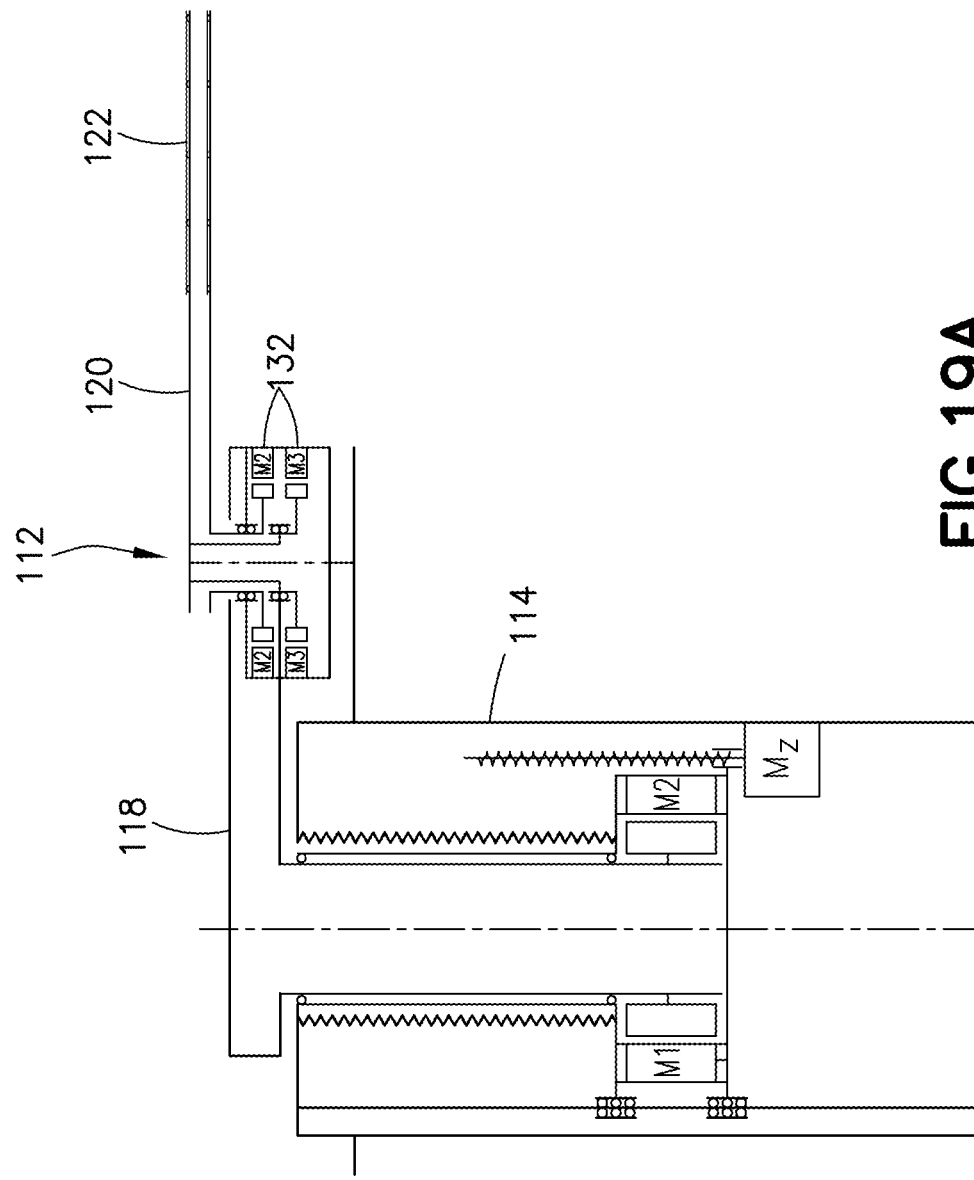
FIGS. 19A to 19C are schematic representations of an example robot incorporating various combinations of power, communication, cooling arrangements, and control system architectures.
Figure 19B:
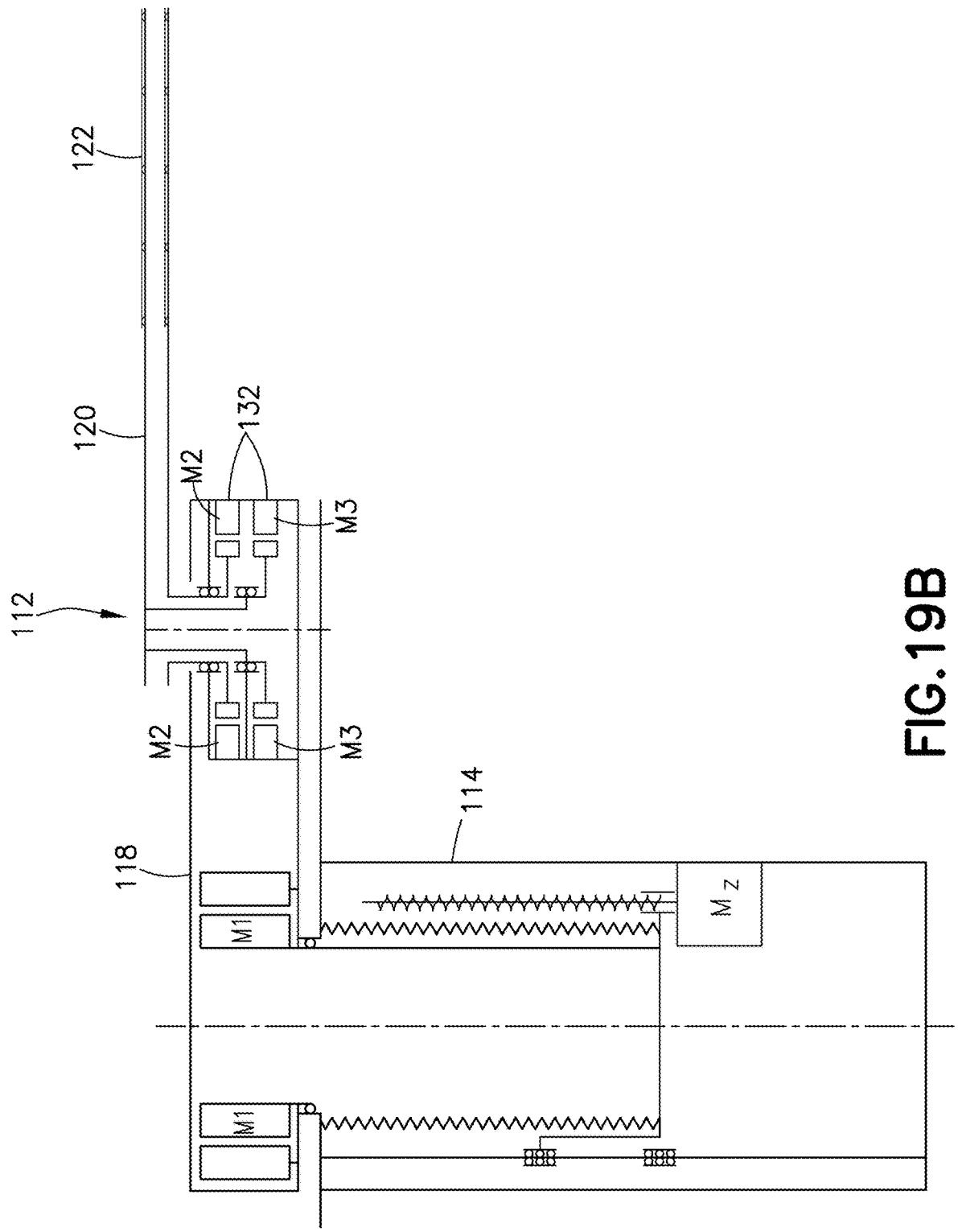
Figure 19C:
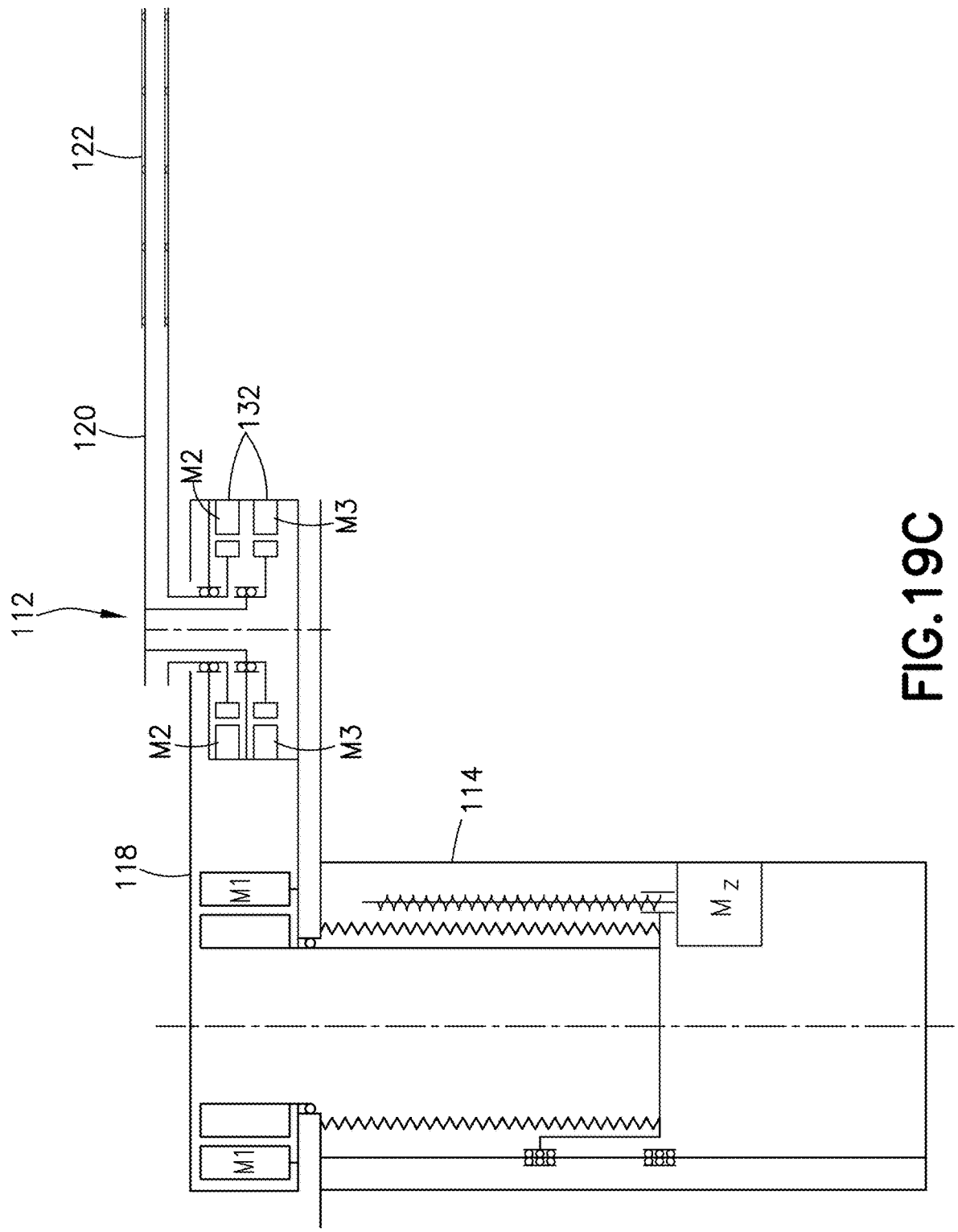

Example robot configurations with respect to various example embodiments of a material-handling vacuum-environment robot according to the present invention are represented by simplified cross-sectional diagrams of FIGS. 19A to 28C (including FIGS. 19B, 19C, and 27A). These embodiments may conveniently incorporate various combinations of the example power, communication, and cooling arrangements and control system architectures described earlier. In FIG. 19A, the actuators (motor M1) are located in the drive unit 114, and the actuators 132 (motors M2/M3) are distributed into the robot arm 112 at the elbow joint between the upper arm 118 and the forearm 120. In FIG. 19B, the actuator (motor M1) is removed from the drive unit 114 and is located in the upper arm 118 at the shoulder joint, and again the actuators 132 (motors M2/M3) are distributed into the robot arm 112 at the elbow joint between the upper arm 118 and the forearm 120. FIGS. 28A to 28C show a robot 110 having a first arm 112$a$ and a second arm 112$b$.

If moving joints are present between some of the motors in the robot arm 112 and the first link of the robot arm 112, such as in the example embodiments of FIGS. 24 to 27A, the example power, communication, and cooling arrangements described earlier may be conveniently extended to these joints. In all of the robot arms 112 in FIGS. 24 to 27A, at least a shoulder joint 800 is positioned between the motor in the drive unit 114 and the displaced motor in the robot arm 112. In the example embodiment of FIG. 19C, the stators of all motors M1, M2, M3 are attached to the first link (upper arm 118) of the robot arm 112 (unlike in other examples where the stator of motor M1 is shown connected directly or indirectly to the housing of the spindle assembly 136). This allows for the use of a single service loop, which may be configured to facilitate both translational and rotational motion between the upper arm 118 of the robot arm 112 and the stationary base of the drive unit 114.

Figure 21:
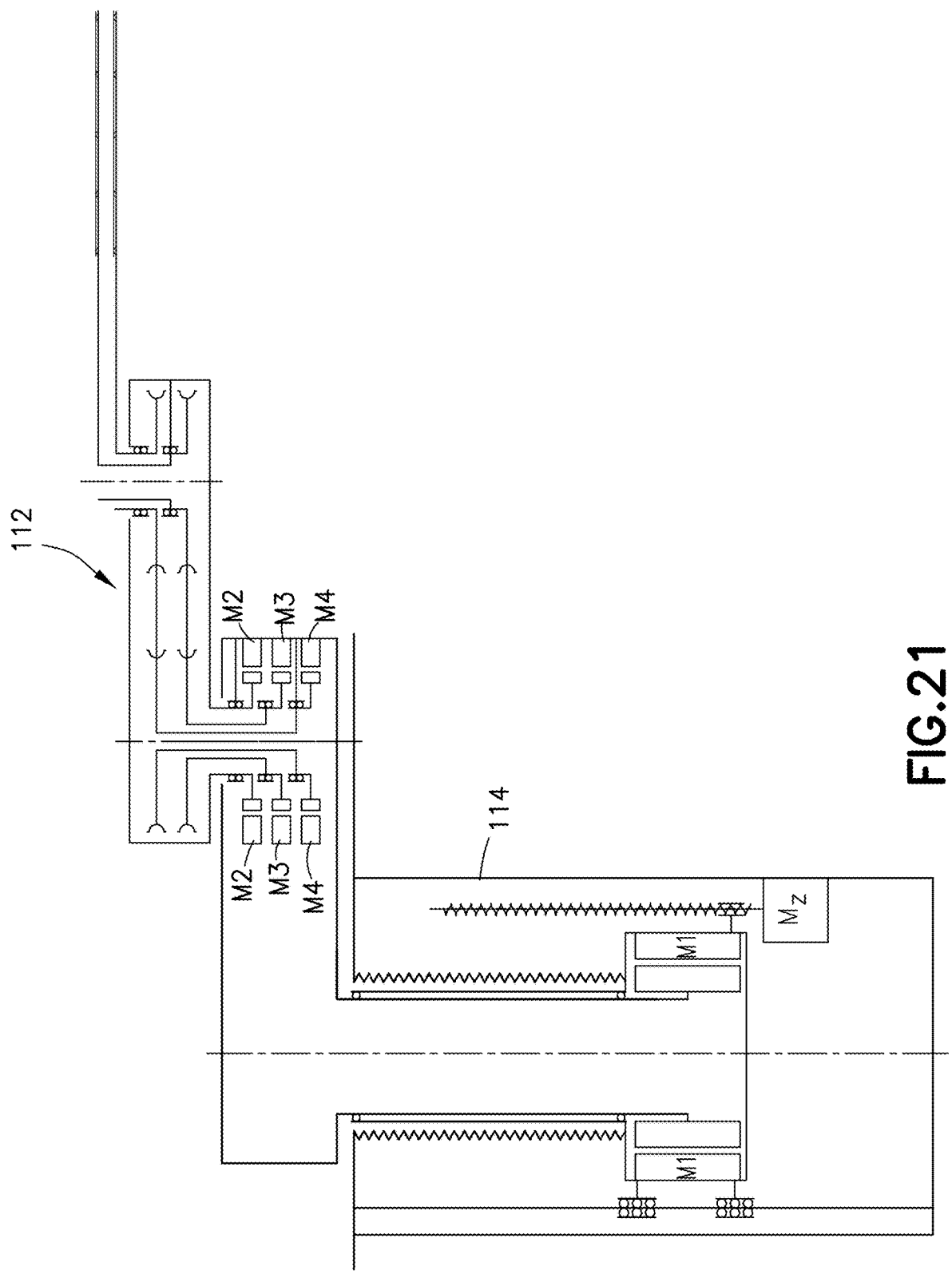
Figure 22:
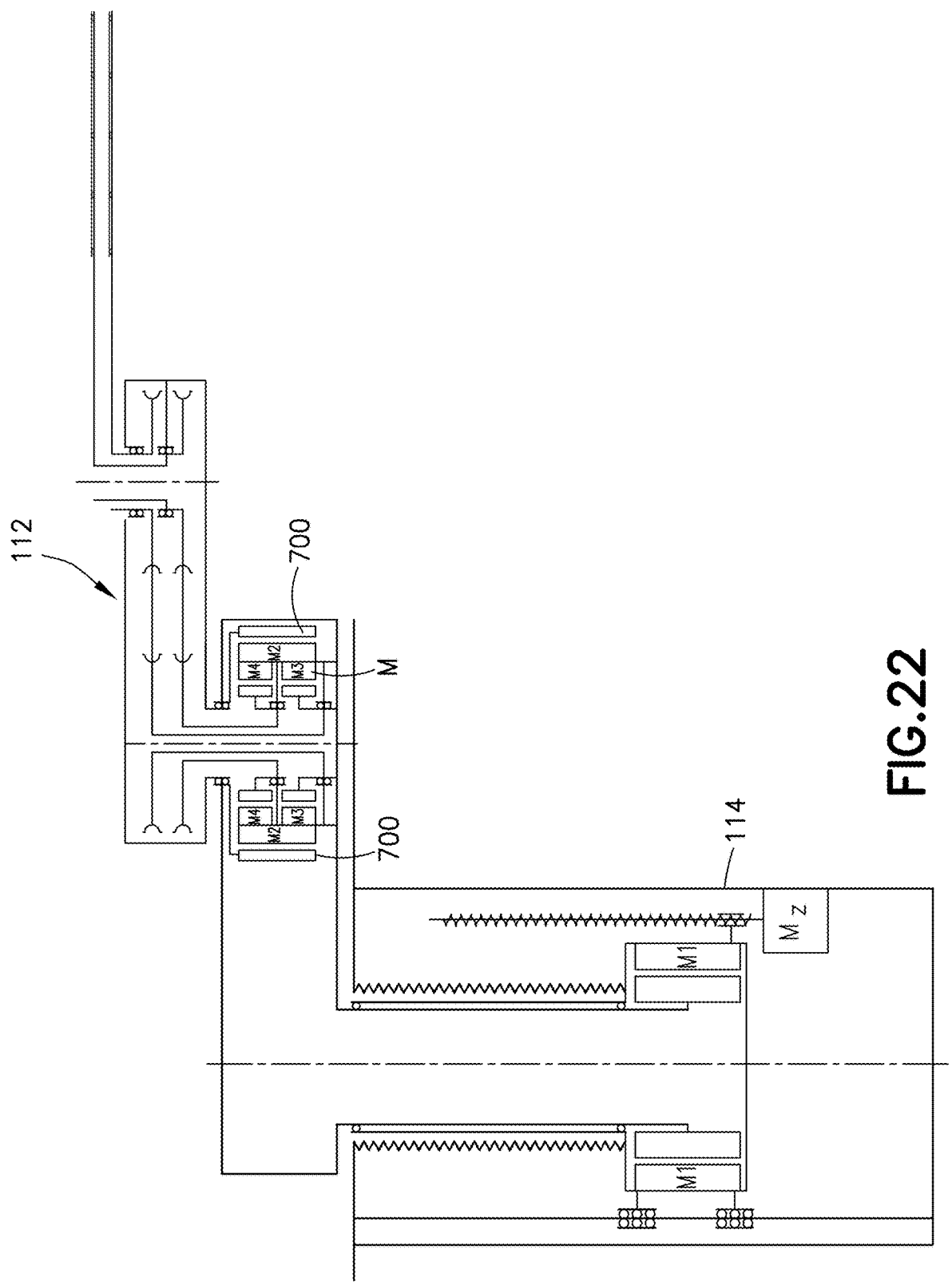
FIGS. 22 and 23 are schematic representations of example robots in which motors have rotors external to the respective stators.
Figure 23:
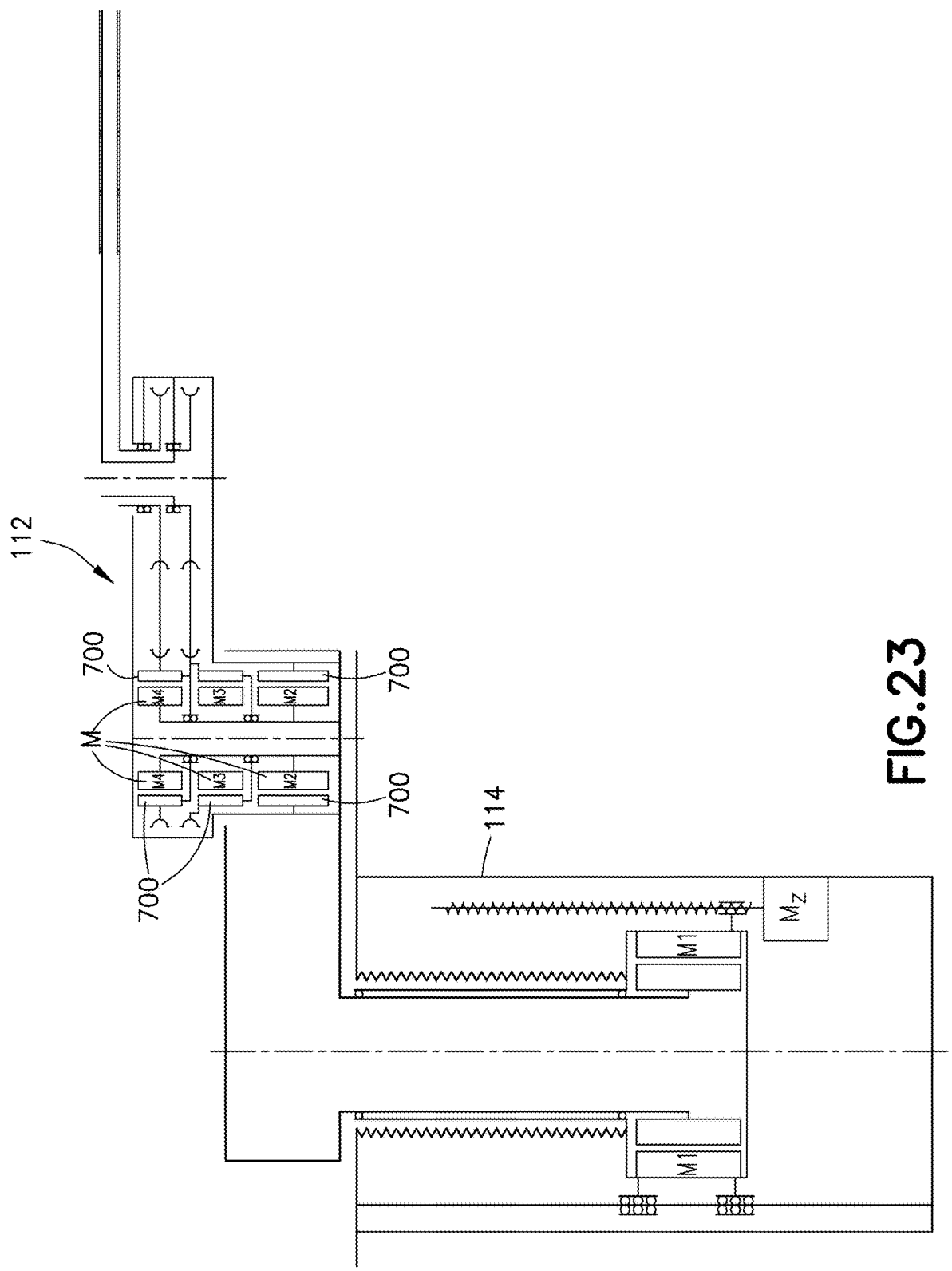
Figure 24:
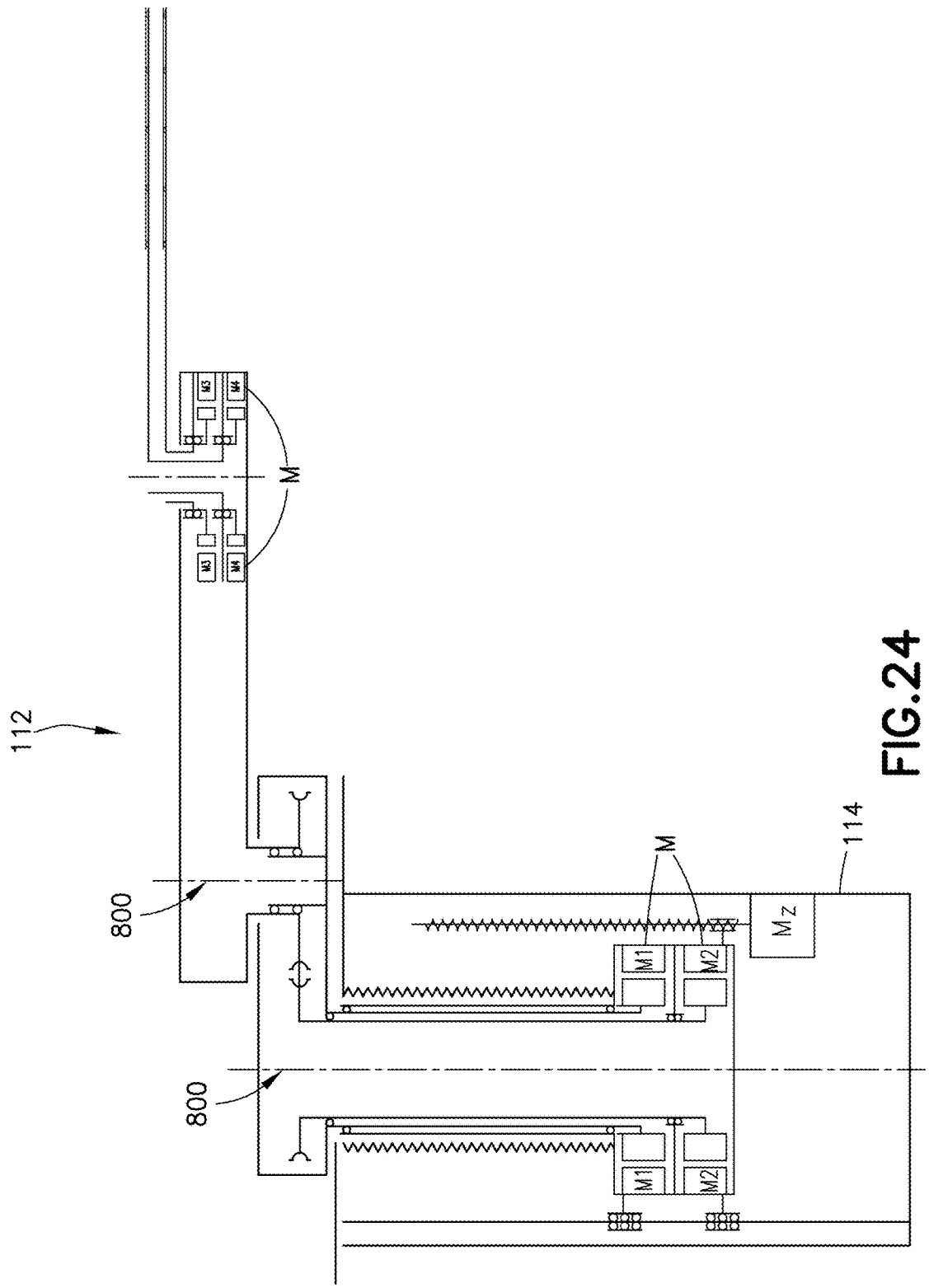
Figure 25:
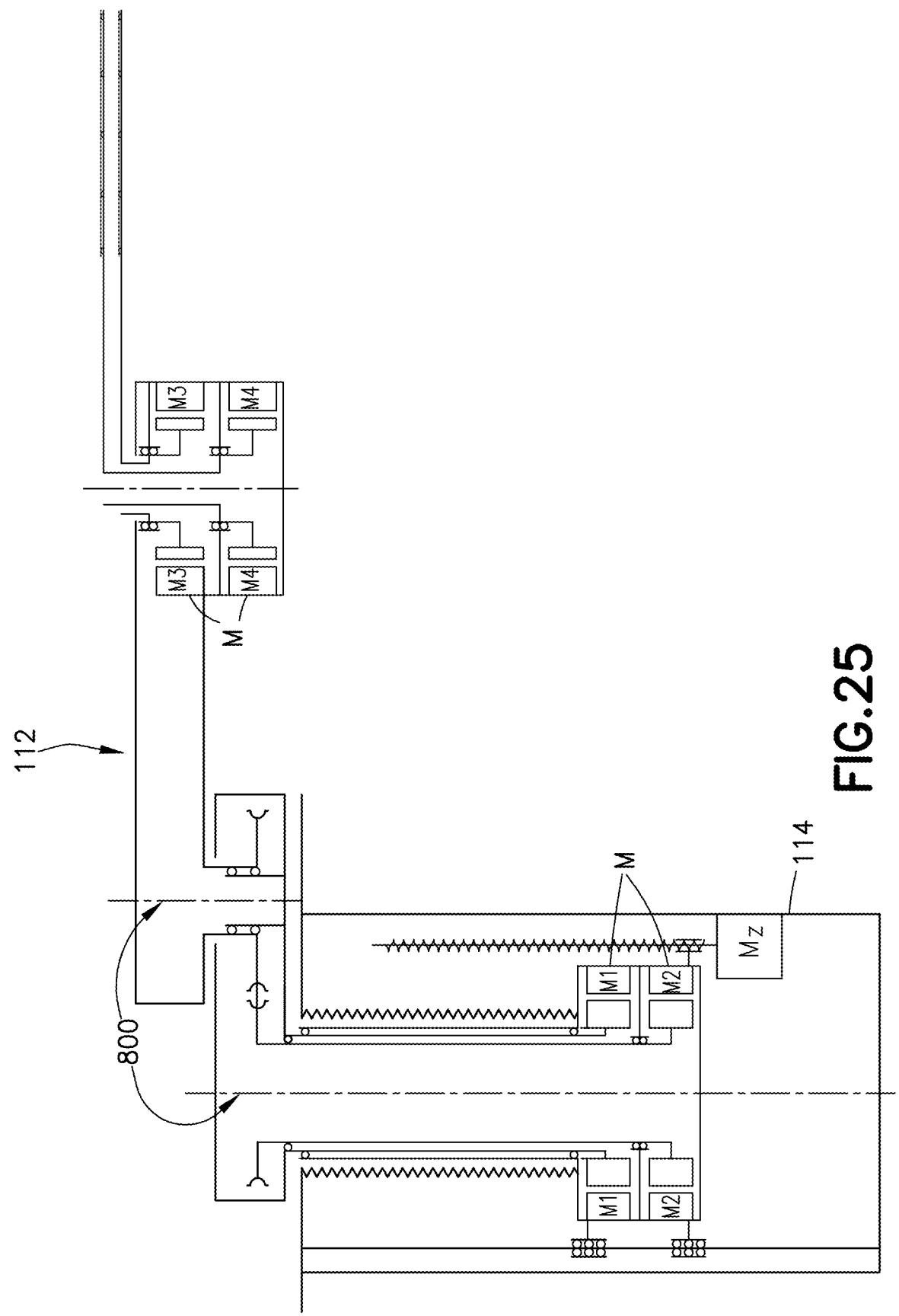
Figure 26:
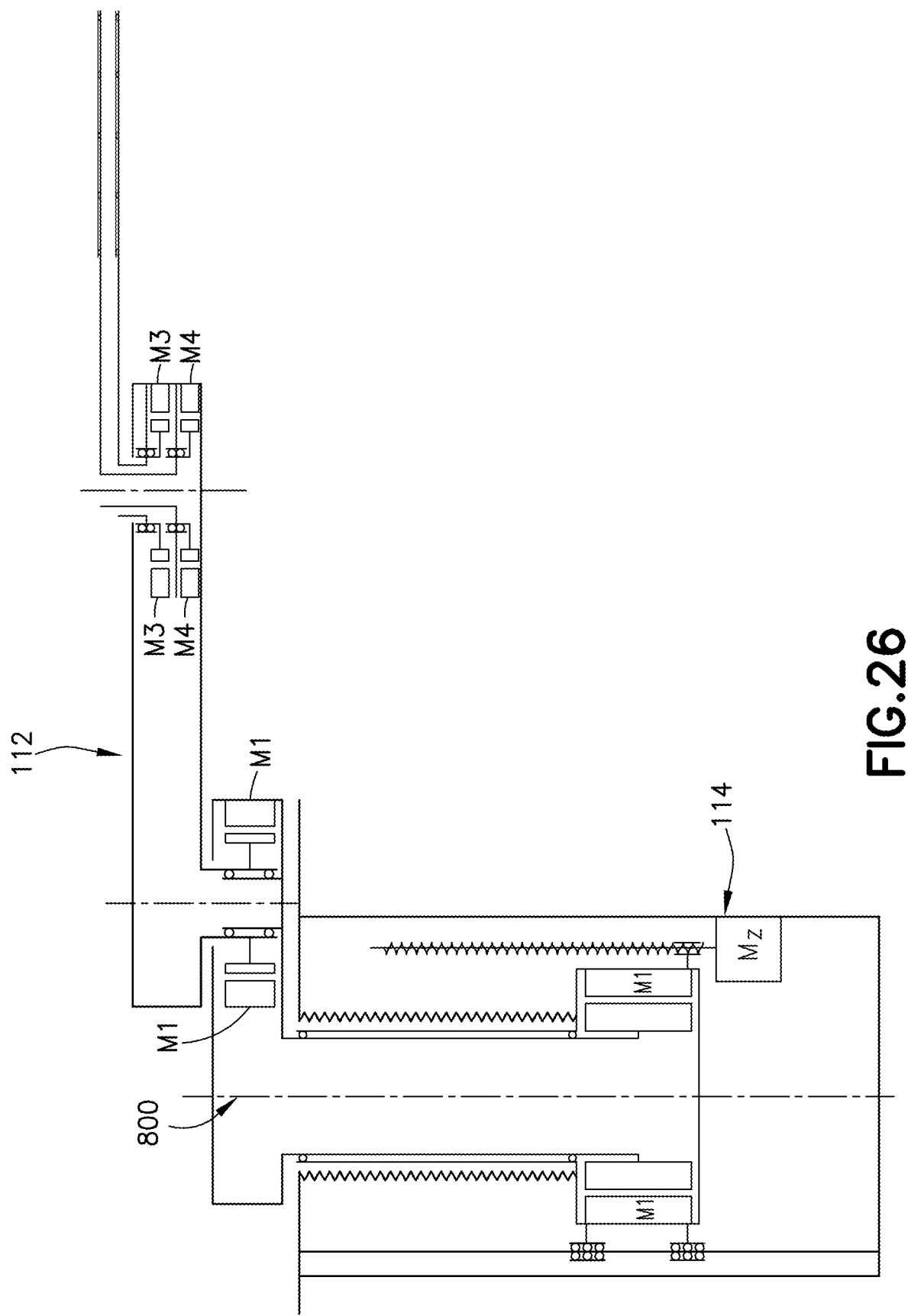

The example diagrams of FIGS. 19B, 22, and 23 show example embodiments of inside-out motors, that is, motors M that have rotors 700 on the outside of their stators (external rotors), which may be used to better utilize the available space. However, any suitable motor configuration, including without limitation radial motors with internal rotors, radial motors with external rotors, axial motors and their combinations, may be utilized in any of the embodiments. FIG. 20 illustrates a configuration in which the robot arm 112 has two motors M1/M2 in the drive unit 114 and two motors M3/M4 at the elbow joint. FIG. 21 illustrates a configuration in which the robot arm 112 has one motor M1 in the drive unit 114 and three motors M2/M3/M4 at the elbow joint.

Figure 29A:
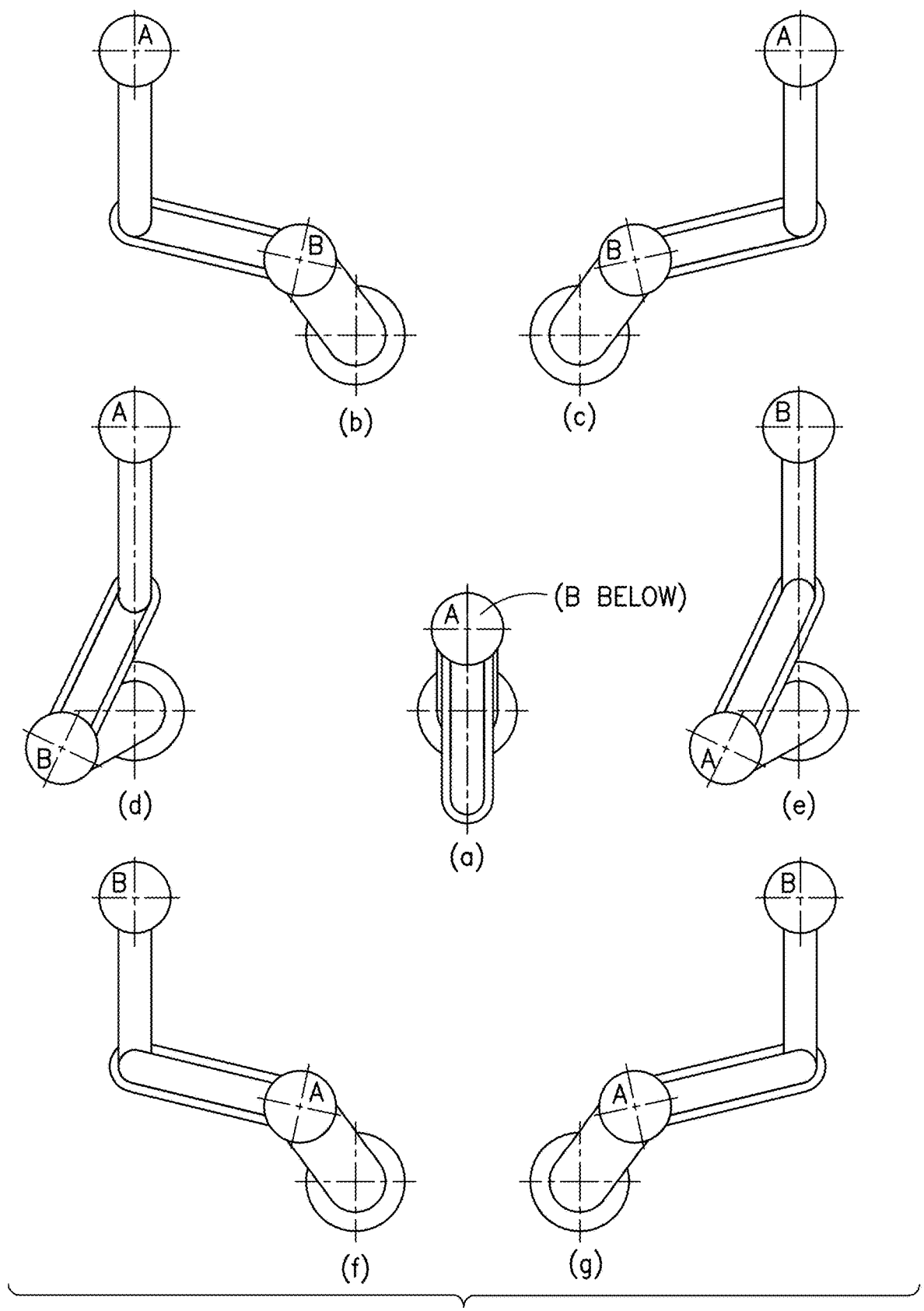

The operation of a robot consistent with the examples of FIGS. 15E, 15G, 15I, 15K(a) and (b), 18B, and 20 to 27D is depicted diagrammatically in FIGS. 29A and 29B, which show the robot in a retracted position and various extended positions.

Figure 27B:
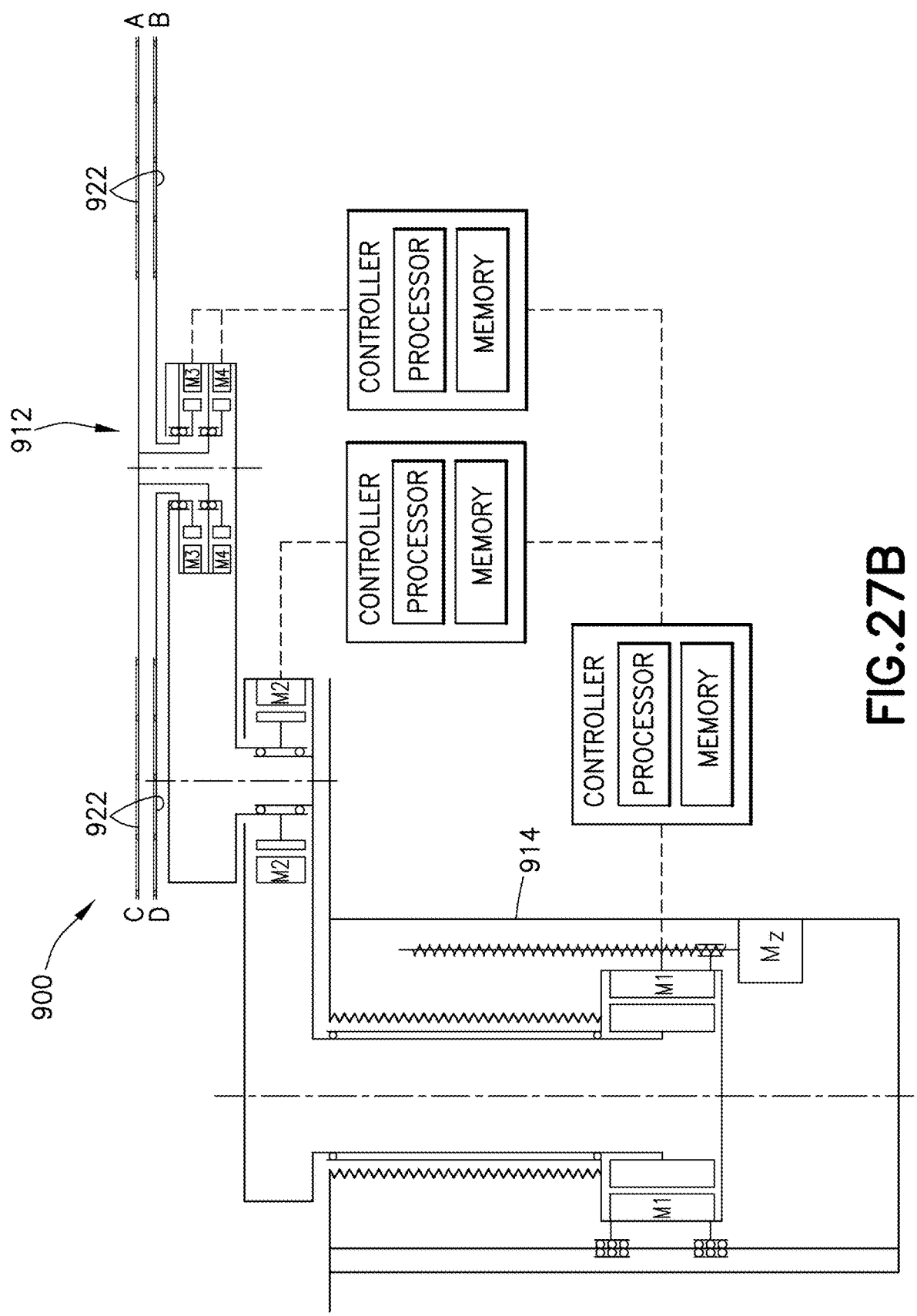
FIGS. 27B and 27C are schematic representations of an example robot with four end-effectors.
Figure 27C:
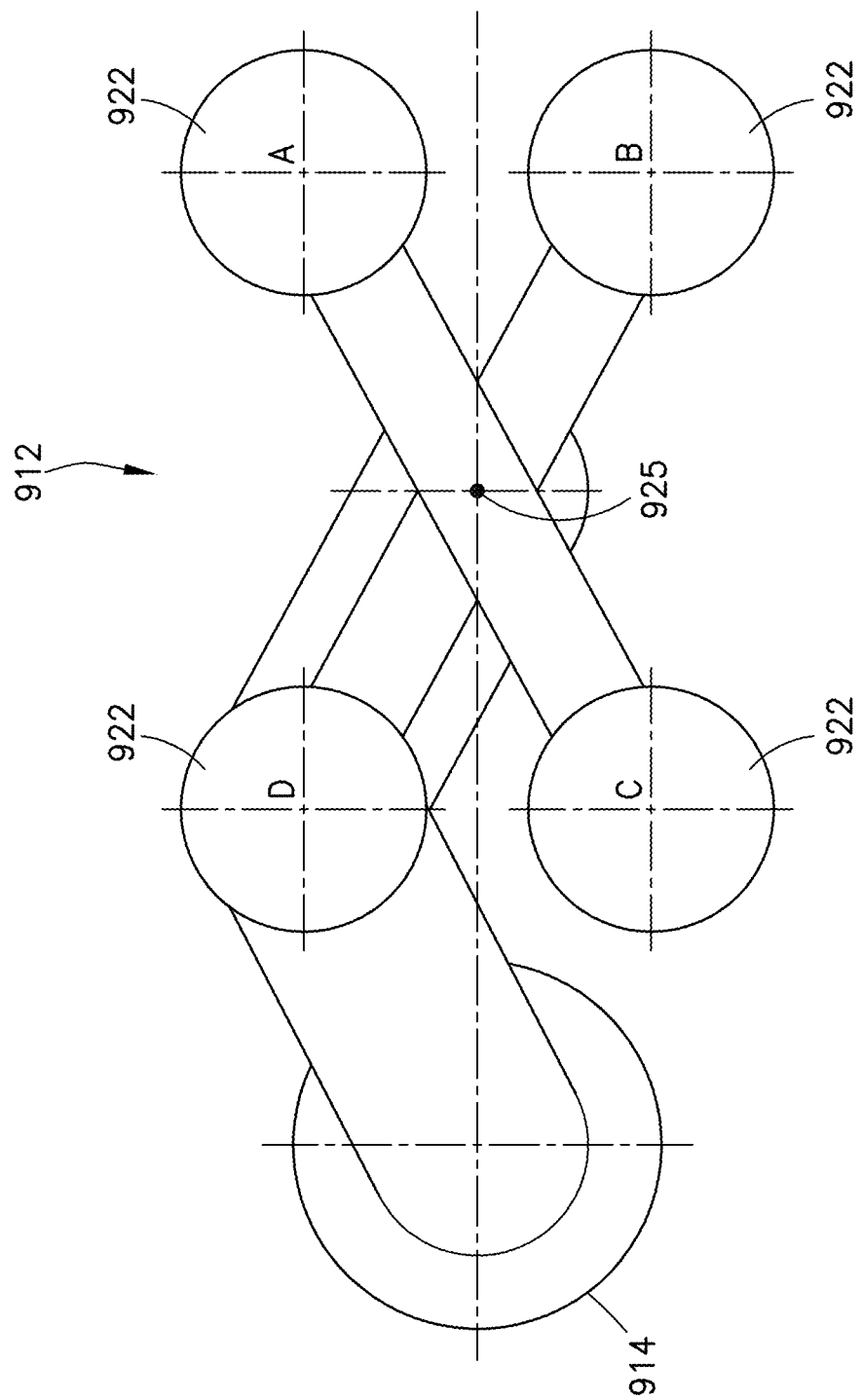

FIGS. 27B and 27C depict an example embodiment of a robot 900 having a drive unit 914 with a robot arm 112 with four end-effectors 922. As indicated in FIG. 27B, at least motors M1, M2, M3, and M4 may be controlled using suitable controllers having processors and memories, some or all of which may be linked through a communication system. FIG. 27B shows a side view of the robot 900 in the form of a simplified cross-sectional diagram, and FIG. 27C provides a diagrammatic depiction of the top view of the robot 900. As shown in FIGS. 27B and 27C, the four end-effectors 922 may be configured as two pairs of two opposing end-effectors on an arm 912 where the two opposing end-effectors in each of the pairs may be connected to each other in a substantially rigid manner. For example, opposing end-effectors A and C may connected to each other in a substantially rigid manner, and opposing end-effectors B and D may be connected to each other in a substantially rigid manner. The two pairs of end-effectors, for example, pair A-C and pair B-D, may be configured to rotate independently of each other. The two pairs of end-effectors may be coupled to each either at a midpoint 925 which forms a pivot point on the wrist of the robot arm 912 such that the two pairs move in a scissors-like operation.

Figure 27D:
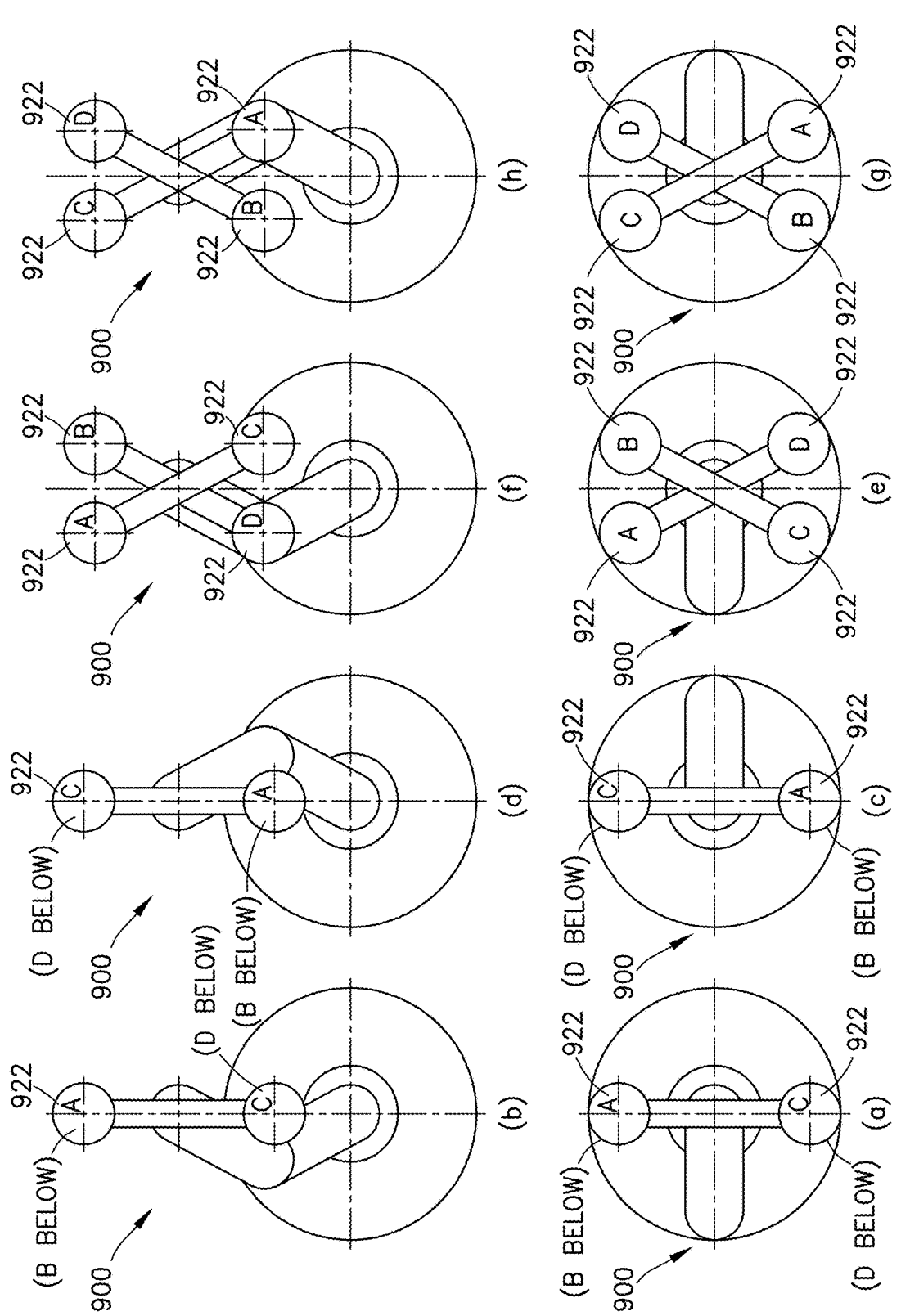
FIG. 27D is a schematic representation of an operation of the robot of FIGS. 27B and 27C.

The operation of the robot of FIGS. 27B and 27C is illustrated diagrammatically in (a) to (h) of FIG. 27D. Diagram (a) shows the robot 900 in the retracted position with end-effectors A and B stacked and ready to extend. Diagram (b) depicts the robot 900 with end-effectors A and B extended in their stacked configuration. Diagram (c) shows the robot 900 in the retracted position with end-effectors C and D stacked and ready to extend. Diagram (d) depicts the robot 900 with end-effectors C and D extended in their stacked configuration. Diagram (e) shows the robot 900 in the retracted position with end-effectors A and B fanned out in a side-by-side configuration, ready to extend. Diagram (f) depicts the robot 900 with end-effectors A and B extended in their side-by-side configuration. Diagram (f) shows the robot 900 in the retracted position with end-effectors C and D fanned out in a side-by-side configuration, ready to extend. Diagram (g) depicts the robot 900 with end-effectors C and D extended in their side-by-side configuration.

As an example, utilizing the operations illustrated in FIG. 27C, the robot 900 may transfer material between stacked stations, such as load locks, and side-by-side stations, such as process modules. For example, the robot 900 may utilize end-effectors A and B to pick a pair of fresh wafers from a pair of stacked stations (stacked load lock), use end-effectors C and D to pick a pair of processed wafers from a pair of side-by-side stations (twin process module), immediately replace the pair of processed wafers in the pair of side-by-side stations (twin process module) with the fresh wafers on end-effectors A and B, and place the pair of processed wafers on end-effectors C and D to a pair of stacked stations (stacked load lock).

FIGS. 28A to 28C depict diagrammatically an example robot with an example arm that may comprise two linkages, for example, a left linkage and a right linkage. Each of the two linkages may consist of a first link (which may also be referred to as an upper arm), a second link (forearm), and a third link (wrist assembly) with an end-effector (or multiple end-effectors, as explained below). The upper arms of the two linkages may be rigidly connected to each other and attached to the drive shaft of the drive unit of the robot. Each of the forearms may be coupled to the corresponding upper arm via a rotary joint and actuated with respect to the corresponding upper arm by an actuator, such as an electric motor. Each of the wrist assemblies may be coupled to the corresponding forearm via another rotary joint and constrained to maintain radial orientation (or orientation offset by a constant distance and/or a constant angle from a radial direction) by a transmission arrangement, such as a belt, band, or cable drive.

In the example of FIGS. 28A to 28C, the joint-to-joint length of the forearms is shown to be less than the joint-to-joint length of the upper arms, which may allow the forearms to share substantially the same vertical space, thus reducing the overall height of the arm. In this case, the transmission arrangements may utilize belt, band, or cable drives with non-circular pulleys. Alternatively, the joint-to-joint length of the forearms may be the same as the joint-to-joint length of the upper arms. In this case, the forearms may be vertically stacked to clear each other, and the transmission arrangements may utilize belt, band, or cable drives with circular pulleys (the effective radius of the pulley connected to the wrist assembly at the wrist joint may be twice the effective radius of the pulley connected to the upper arm at the elbow joint). As another alternative, the joint-to-joint length of the forearms may be larger than the joint-to-joint length of the upper arms.

Figure 28D:
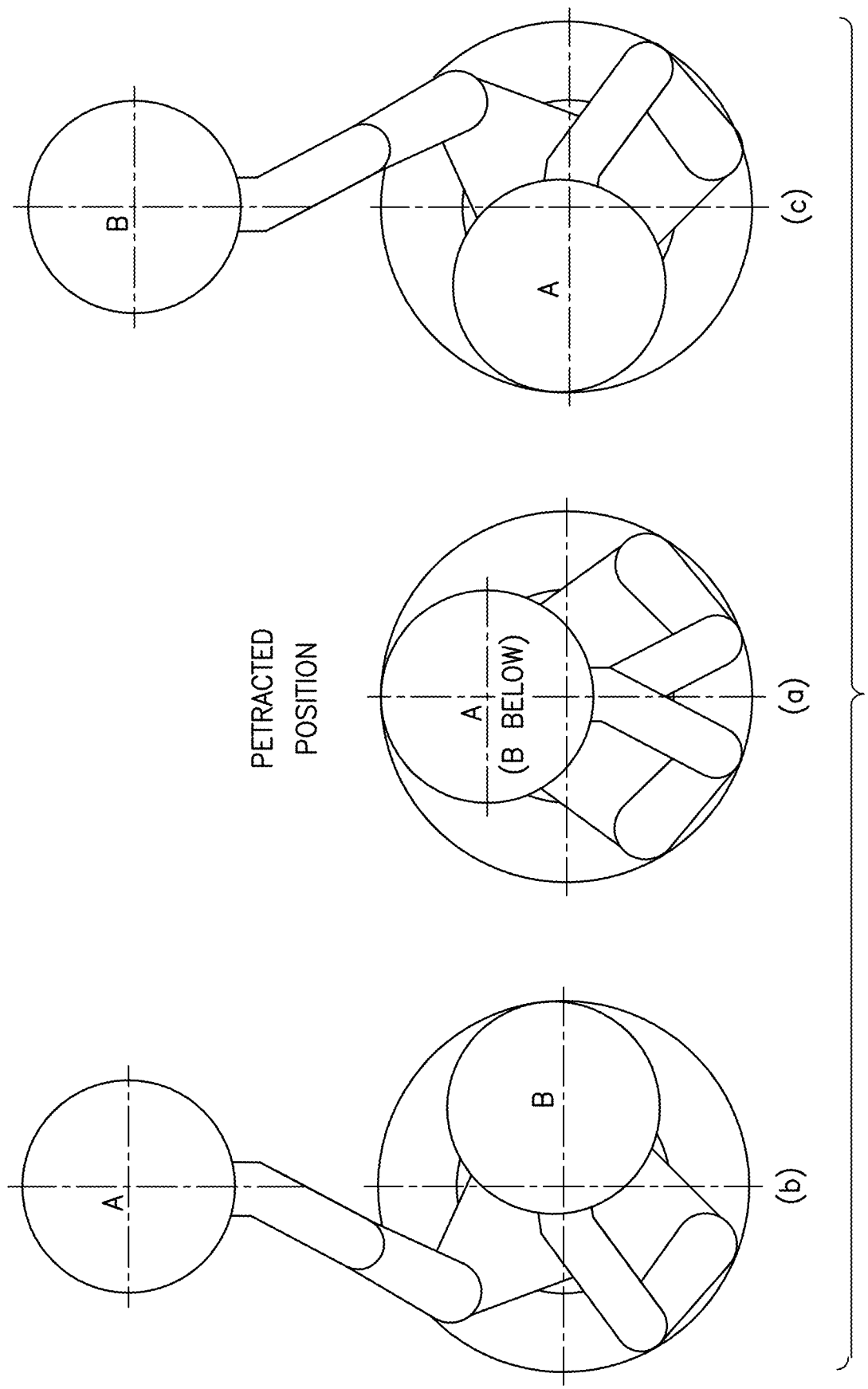
FIG. 28D is a schematic representation of the example robot of FIG. 28A showing the robot in a retracted position and various extended positions.

The operation of the example robot of FIG. 28 is depicted diagrammatically in FIG. 28D, which shows the example robot in a retracted position and various extended positions.

Although most of the above example embodiments feature two independently actuated end-effectors, any number of end-effectors may be supported, including one independently actuated end-effector and three or more independently actuated end-effectors. Furthermore, the robot arm 912 may carry one or more assemblies of multiple rigidly connected end-effectors. As an example, such an assembly of rigidly connected end-effectors may comprise a pair of end-effectors arranged side-by-side in a single plane, or it may consist of multiple end-effectors stacked substantially above each other.

Although a single Z-axis mechanism is shown as part of the above example embodiments, any number of Z-axis mechanisms, including no Z-axis mechanism, may be used. Although the above example embodiments are depicted with a Z-axis actuated by a rotary motor via a ball-screw, any other suitable arrangement, such as, without limitation, a linkage mechanism or a linear motor, may be used.

It should be noted that the bearings, bearing arrangements, and bearing locations shown in the diagrams throughout the document are intended for illustration only—the purpose is to communicate how individual components may generally be constrained with respect to each other. Any suitable bearings, bearing arrangements and bearing locations may be used.

Although a communication network is described as the means of communication between the various components of the control system, any other suitable means of communication between the master controller and the control modules, such as a wireless network or point-to-point bus, may be utilized.

In one example, an apparatus comprises a drive; a movable arm connected to the drive, the movable arm comprising a first link connected to the drive at a shoulder, a second link connected to the first link at an elbow, a third link connected to the second link at a wrist, and a fourth link connected to the second link at the wrist; at least one first actuator located in the second link configured to cause a rotation of the third link about the wrist; and at least one second actuator located in the second link configured to cause a rotation of the fourth link about the wrist. One or more of a thermal management, a power distribution, or a communication is effected through the second link.

At least one of the shoulder, the elbow, or the wrist may comprise a thermal coupling arrangement. The thermal coupling arrangement may be a rotary thermal coupling comprising a first portion having a first substantially cylindrical surface, a second portion having a second substantially cylindrical surface and positioned so that the second substantially cylindrical surface faces the first substantially cylindrical surface, the first substantially cylindrical surface and the second substantially cylindrical being coaxially aligned with a pivot point of the at least one of the shoulder, the elbow, or the wrist, wherein a transfer of heat is effected across a gap between the first substantially cylindrical surface and the second substantially cylindrical surface. The first substantially cylindrical surface and the second substantially cylindrical surface may define a plurality of fins extending from the first portion and the second portion, respectively. The apparatus may further comprise a heat transfer medium between the first substantially cylindrical surface and the second substantially cylindrical surface. The first link may comprise a recessed portion configured to accommodate an upper portion of the drive. One or more of the first link, the second link, the third link, or the fourth link may have a sealed internal volume. The drive may include a spindle assembly having a drive shaft configured to rotate the movable arm. The spindle assembly may include one or more cooling channels configured to receive a circulating cooling medium. The apparatus may further comprise a first power coupling between the drive and the first link of the movable arm, the first power coupling comprising a primary coil on the drive and stationary relative to the drive and a secondary coil on the first link and rotatable relative to the primary coil. The apparatus may further comprise an optical communication link integrated with the first power coupling. The apparatus may further comprise a second power coupling between the first link and the second link, the second power coupling comprising a primary coil on the first link and stationary relative to the first link and a secondary coil on the second link and rotatable relative to the primary coil. The third link and the fourth link may each comprise a pair of opposing end-effectors configured to rotate about the wrist.

In another example, a method comprises providing a drive; providing a movable arm connected to the drive, the movable arm comprising a first link connected to the drive at a shoulder, a second link connected to the first link at an elbow, a third link connected to the second link at a wrist, and a fourth link connected to the second link at the wrist; providing at least one first actuator located in the second link configured to cause a rotation of the third link about wrist; and providing at least one second actuator located in the second link configured to cause a rotation of the fourth link about the wrist. One or more of a thermal management, a power distribution, or a communication is effected through the second link.

The method may further comprise providing a thermal coupling arrangement at at least one of the shoulder, the elbow, or the wrist. The method may further comprise recessing the first link to accommodate an upper portion of the drive. The method may further comprise cooling the drive. Cooling the drive may comprise circulating a cooling medium through the drive from an external source. Cooling the drive may comprise circulating a cooling medium internally within at least one of the drive or the movable arm. The method may further comprise providing a power coupling between the drive and the first link. The method may further comprise providing an optical communication link integrated with the power coupling.

In another example, an apparatus comprises at least one processor; and at least one non-transitory memory including computer program code, the at least one memory and the computer program code configured to, with the at least one processor, cause the apparatus at least to perform: moving an arm connected to a drive, the arm comprising a first link connected to the drive at a shoulder, a second link connected to the first link at an elbow, a third link connected to the second link at a wrist, and a fourth link connected to the second link at the wrist; rotating, by at least one first actuator located in the second link, the third link about the wrist; and rotating, by at least one second actuator located in the second link, the fourth link about the wrist. One or more of a thermal management, a power distribution, or a communication is effected through the second link.

In another example, an apparatus comprises a drive; a movable arm comprising a first link having a first control and being rotatable about the drive, a second link having a second control and being connected to the first link at a first rotary joint, and at least one third link coupled to the forearm at a second rotary joint; at least one first actuator located in the first link and configured to cause a rotation of the second link about the first rotary joint; at least one second actuator located in the second link and configured to cause a rotation of the at least one third link about the second rotary joint; and at least one active component associated with the at least one third link. One or more of a thermal management, a power distribution, or a communication is effected through the second rotary joint to cause an interaction of the at least one active component with the second control of the second link.

The apparatus may further comprise at least one thermal coupling arrangement located at one or more of the first rotary joint or the second rotary joint. The first link may comprise a recessed portion to accommodate an upper portion of the drive. One or more of the first link, the second link, or the at least one third link may have a sealed internal volume. The at least one first actuator or the at least one second actuator may be located within a vacuum vessel within the respective at least one first link or the at least one second link. The vacuum vessel may be filled with air, another mix of gases, or a single gas. The apparatus may further comprise a first power coupling between the drive and the first link of the movable arm, the first power coupling comprising a primary coil on the drive and stationary relative to the drive and a secondary coil on the first link and rotatable relative to the primary coil. The active component may comprise an actuator, a gripper, a heater, or a sensor. The active component may comprise a temperature sensor. The temperature sensor may be coupled to a control having a processor and at least one memory. The temperature sensor may be configured to measure a temperature of one or more of the first link, the second link, or the at least one third link. The measured temperature may be configured to compensate for an effect of temperature expansion of the one or more of the first link, the second link, or the at least one third link. The at least one third link may comprise a first pair of opposing end-effectors and a second pair of opposing end-effectors, each pair of opposing end-effectors being connected to each other in a substantially rigid manner.

In another example, a method comprises providing a drive; providing a movable arm comprising, a first link having a first control and being connected to and rotatable about the drive, a second link having a second control and being connected to the first link at a first rotary joint, and at least one third link coupled to the forearm at a second rotary joint; providing at least one first actuator located in the first link and configured to cause a rotation of the second link about the first rotary joint; providing at least one second actuator located in the second link and configured to cause a rotation of the at least one third link about the second rotary joint; and providing at least one active component associated with the at least one third link. One or more of a thermal management, a power distribution, or a communication is effected through the second rotary joint to cause an interaction of the at least one active component with the second control of the second link.

The active component may comprise an actuator, a gripper, a heater, or a sensor. The active component may comprise at least one temperature sensor. The method may further comprise providing a control having a processor and at least one memory, the control being configured to accept at least one input from the at least one temperature sensor. The at least one input may be configured to be used to calculate a temperature expansion of the one or more of the first link, the second link, or the at least one third link. The calculated temperature expansion may be configured to be used to determine an adjusted end position of the at least one third link.

In another example, an apparatus comprises a drive; a movable arm connected to the drive, the movable arm comprising, an upper arm rotatably coupled to the drive at a shoulder, the upper arm having a first actuator located within the upper arm, a forearm rotatably coupled to the upper arm, the forearm having a second actuator and a third actuator located within the forearm, a first pair of end-effectors rotatably coupled to the forearm at a rotary joint and configured to be moved by the second actuator, and a second pair of end-effectors rotatably coupled to the forearm at the rotary joint and configured to be moved by the third actuator. The first pair of end-effectors is configured to move independently of the second pair of end-effectors. At least the second actuator and the third actuator are configured to be controlled by a control, where the control is configured to control one or more of a thermal management, a power distribution, or a communication to the first pair of end-effectors and the second pair of end-effectors.

The first pair of end-effectors and the second pair of end-effectors may be rotatably coupled to the rotary joint substantially at a midpoint of the first pair of end-effectors and the second pair of end-effectors. The second actuator and the third actuator may be configured to be controlled by a controller having a processor and at least one memory.

In another example, a method comprises measuring at least one temperature of a respective at least one structural component of a robot; estimating, using the measured at least one temperature, a dimension of the at least one structural component; calculating, based on the estimated dimension of the at least one structural component, a set of joint coordinates that correspond to a desired destination of an end-effector of the robot; calculating, based on the calculated set of joint coordinates, a final destination of the end-effector; determining a trajectory from the calculated final destination of the end-effector to the calculated desired destination of the end-effector; determining a plurality of intermediate points on the determined trajectory; and using the determined plurality of intermediate points on the determined trajectory to control at least one motor causing a movement of the end-effector.

Using the determined plurality of intermediate points on the determined trajectory to control at least one motor may comprise moving the end-effector to the desired destination along the determined trajectory and based on adjustments made to the estimated dimensions at the plurality of intermediate points on the determined trajectory.

In another example, an apparatus comprises at least one processor; and at least one non-transitory memory including computer program code, the at least one memory and the computer program code configured to, with the at least one processor, cause the apparatus at least to perform: measuring at least one temperature of a respective at least one structural component of a robot; estimating, using the measured at least one temperature, a dimension of the at least one structural component; calculating, based on the estimated dimension of the at least one structural component, a set of joint coordinates that correspond to a desired destination of an end-effector of the robot; calculating, based on the calculated set of joint coordinates, a final destination of the end-effector; determining a trajectory from the calculated final destination of the end-effector to the calculated desired destination of the end-effector; determining a plurality of intermediate points on the determined trajectory; and using the determined plurality of intermediate points on the determined trajectory to control at least one motor causing a movement of the end-effector.

In another example, a non-transitory program storage device readable by a machine, tangibly embodying a program of instructions executable by the machine for performing operations, comprises the operations: measuring at least one temperature of a respective at least one structural component of a robot; estimating, using the measured at least one temperature, a dimension of the at least one structural component; calculating, based on the estimated dimension of the at least one structural component, a set of joint coordinates that correspond to a desired destination of an end-effector of the robot; calculating, based on the calculated set of joint coordinates, a final destination of the end-effector; determining a trajectory from the calculated final destination of the end-effector to the calculated desired destination of the end-effector; determining a plurality of intermediate points on the determined trajectory; and using the determined plurality of intermediate points on the determined trajectory to control at least one motor causing a movement of the end-effector.

In another example, an apparatus comprises a drive; a movable arm connected to the drive, the movable arm comprising a first link connected to the drive at a shoulder, a second link connected to the first link at an elbow, and at least one third link connected to the second link at a wrist; and at least one first actuator located in the second link configured to cause a rotation of the at least one third link about the wrist. One or more of a thermal management, a power distribution, or a communication is effected through the second link.

In another example, a method comprises providing a drive; providing a movable arm connected to the drive, the movable arm comprising a first link connected to the drive at a shoulder, a second link connected to the first link at an elbow, and at least one third link connected to the second link at a wrist; and providing at least one first actuator located in the second link configured to cause a rotation of the at least one third link about wrist. One or more of a thermal management, a power distribution, or a communication is effected through the second link.

An apparatus comprises at least one processor; and at least one non-transitory memory including computer program code, the at least one memory and the computer program code configured to, with the at least one processor, cause the apparatus at least to perform: moving an arm connected to a drive, the arm comprising a first link connected to the drive at a shoulder, a second link connected to the first link at an elbow, and at least one third link connected to the second link at a wrist; and rotating, by at least one first actuator located in the second link, the at least one third link about the wrist. One or more of a thermal management, a power distribution, or a communication means is effected through the second link.

It should be understood that the foregoing description is only illustrative. Various alternatives and modifications can be devised by those skilled in the art. For example, features from different embodiments described above could be selectively combined into a new embodiment. Accordingly, the description is intended to embrace all such alternatives, modifications, and variances.

The invention claimed is:

1. An apparatus comprising:
   a drive;
   a movable arm connected to the drive, the movable arm comprising a first link connected to the drive at a shoulder, a second link connected to the first link at an elbow, and at least one third link connected to the second link at a wrist; and
   at least one first actuator and at least one first controller located in the second link and in communication with a master controller external to the second link, the at least one first actuator with the at least one first controller, in a coordinated action with the master controller, configured to cause a rotation of the at least one third link about the wrist to facilitate a corrected position of the at least one third link;
   wherein one or more of a thermal management, a power distribution, or a communication is effected through the second link.

2. The apparatus of claim 1, wherein at least one of the shoulder, the elbow, or the wrist comprises a thermal coupling arrangement.

3. The apparatus of claim 2, wherein the thermal coupling arrangement is a rotary thermal coupling comprising a first portion having a first cylindrical surface, a second portion having a second cylindrical surface and positioned so that the second cylindrical surface faces the first cylindrical surface, the first cylindrical surface and the second cylindrical being coaxially aligned with a pivot point of the at least one of the shoulder, the elbow, or the wrist, wherein a transfer of heat is effected across a gap between the first cylindrical surface and the second cylindrical surface.

4. The apparatus of claim 3, wherein the first cylindrical surface and the second cylindrical surface define a plurality of fins extending from the first portion and the second portion, respectively.

5. The apparatus of claim 3, further comprising a heat transfer medium between the first cylindrical surface and the second cylindrical surface.

6. The apparatus of claim 1, wherein the first link comprises a recessed portion configured to accommodate an upper portion of the drive.

7. The apparatus of claim 1, wherein one or more of the first link, the second link, or the at least one third link has a sealed internal volume.

8. The apparatus of claim 1, wherein the drive includes a spindle assembly having a drive shaft configured to rotate the movable arm.

9. The apparatus of claim 8, wherein the spindle assembly includes one or more cooling channels configured to receive a circulating cooling medium.

10. The apparatus of claim 1, further comprising a first power coupling between the drive and the first link of the movable arm, the first power coupling comprising a primary coil on the drive and stationary relative to the drive and a secondary coil on the first link and rotatable relative to the primary coil.

11. The apparatus of claim 10, further comprising an optical communication link integrated with the first power coupling.

12. The apparatus of claim 10, further comprising a second power coupling between the first link and the second link, the second power coupling comprising a primary coil on the first link and stationary relative to the first link and a secondary coil on the second link and rotatable relative to the primary coil.

13. The apparatus of claim 1, wherein the at least one third link comprises a pair of opposing end-effectors configured to rotate about the wrist.

14. The apparatus of claim 1, wherein the at least one third link comprises four end-effectors.

15. A method, comprising:
   providing a drive;
   providing a movable arm connected to the drive, the movable arm comprising a first link connected to the drive at a shoulder, a second link connected to the first link at an elbow, and at least one third link connected to the second link at a wrist; and
   providing at least one first actuator and at least one first controller located in the second link and in communication with a master controller external to the second link, the at least one first actuator with the at least one first controller, in a coordinated action with the master controller, configured to cause a rotation of the at least one third link about wrist to facilitate a corrected position of the at least one third link; and wherein one or more of a thermal management, a power distribution, or a communication is effected through the second link.

16. The method of claim 15, further comprising providing a thermal coupling arrangement at at least one of the shoulder, the elbow, or the wrist.

17. The method of claim 15, further comprising recessing the first link to accommodate an upper portion of the drive.

18. The method of claim 15, further comprising cooling the drive.

19. The method of claim 18, wherein cooling the drive comprises circulating a cooling medium through the drive from an external source.

20. The method of claim 18, wherein cooling the drive comprises circulating a cooling medium internally within at least one of the drive or the movable arm.

21. The method of claim 15, further comprising providing a power coupling between the drive and the first link.

22. The method of claim 21, further comprising providing an optical communication link integrated with the power coupling.

23. An apparatus, comprising:
a drive;
a movable arm comprising,
  a first link having a first control module and being rotatable about the drive,
  a second link having a second control module and being connected to the first link at a first rotary joint, and
  at least one third link coupled to the forearm at a second rotary joint;
at least one first actuator located in the first link and with the first control module and a master controller external to the first link, in a coordinated action between the first control module and the master controller, being configured to cause a rotation of the second link about the first rotary joint;
at least one second actuator located in the second link and with the second control module and the master controller external to the second link, in a coordinated action between the second control module and the master controller, configured to cause a rotation of the at least one third link about the second rotary joint to facilitate a corrected position of the at least one third link; and
at least one active component associated with the at least one third link;
wherein one or more of a thermal management, a power distribution, or a communication is effected through the second rotary joint to cause an interaction of the at least one active component with the second control module of the second link.

24. The apparatus of claim 23, further comprising at least one thermal coupling arrangement located at one or more of the first rotary joint or the second rotary joint.

25. The apparatus of claim 23, wherein the first link comprises a recessed portion to accommodate an upper portion of the drive.

26. The apparatus of claim 23, wherein one or more of the first link, the second link, or the at least one third link has a sealed internal volume.

27. The apparatus of claim 26, wherein the at least one first actuator or the at least one second actuator is located within a vacuum vessel within the respective at least one first link or the at least one second link.

28. The apparatus of claim 23, further comprising a first power coupling between the drive and the first link of the movable arm, the first power coupling comprising a primary coil on the drive and stationary relative to the drive and a secondary coil on the first link and rotatable relative to the primary coil.

29. The apparatus of claim 23, wherein the active component comprises an actuator, a gripper, a heater, or a sensor.

30. The apparatus of claim 23, wherein the active component comprises a temperature sensor.

31. The apparatus of claim 30, wherein the temperature sensor is coupled to a controller having a processor and at least one memory.

32. The apparatus of claim 30, wherein the temperature sensor is configured to measure a temperature of one or more of the first link, the second link, or the at least one third link.

33. The apparatus of claim 32, wherein the measured temperature is configured to compensate for an effect of temperature expansion of the one or more of the first link, the second link, or the at least one third link.

34. The apparatus of claim 23, wherein the at least one third link comprises a first pair of opposing end-effectors and a second pair of opposing end-effectors, each pair of opposing end-effectors being connected to each other in a rigid manner.

35. A method comprising,
providing a drive;
providing a movable arm comprising,
  a first link having a first control module and being connected to and rotatable about the drive,
  a second link having a second control module and being connected to the first link at a first rotary joint, and
  at least one third link coupled to the forearm at a second rotary joint;
providing at least one first actuator located in the first link and with the first control module and a master controller external to the first link, where the first control module in a coordinated action with the master controller, is configured to cause a rotation of the second link about the first rotary joint;
providing at least one second actuator located in the second link and with the second control module and the master controller external to the second link, where the second control module in a coordinated action with the master controller, is configured to cause a rotation of the at least one third link about the second rotary joint to facilitate a corrected position of the at least one third link; and
providing at least one active component associated with the at least one third link;
wherein one or more of a thermal management, a power distribution, or a communication is effected through the second rotary joint to cause an interaction of the at least one active component with the second control module of the second link.

36. The method of claim 35, wherein the active component comprises an actuator, a gripper, a heater, or a sensor.

37. The method of claim 35, wherein the active component comprises at least one temperature sensor.

38. The method of claim 37, further comprising providing a controller having a processor and at least one memory, the controller being configured to accept at least one input from the at least one temperature sensor.

39. The method of claim 38, wherein the at least one input is configured to be used to calculate a temperature expansion of the one or more of the first link, the second link, or the at least one third link.

40. The method of claim 39, wherein the calculated temperature expansion is configured to be used to determine an adjusted end position of the at least one third link.

41. An apparatus, comprising:
a drive; and
a movable arm connected to the drive, the movable arm comprising,
an upper arm rotatably coupled to the drive at a shoulder, the upper arm having a first actuator located within the upper arm,
a forearm rotatably coupled to the upper arm, the forearm having a second actuator and a third actuator located within the forearm,
a first pair of end-effectors rotatably coupled to the forearm at a rotary joint and configured to be moved by the second actuator, and
a second pair of end-effectors rotatably coupled to the forearm at the rotary joint and configured to be moved by the third actuator;
wherein the first pair of end-effectors is configured to move independently of the second pair of end-effectors; and
wherein at least the second actuator and the third actuator are configured to be controlled by a control module located in at least the forearm and a master controller located external to the forearm, where the control module in a coordinated action with the master controller, is configured to control one or more of a thermal management, a power distribution, or a communication to the first pair of end-effectors and the second pair of end-effectors to facilitate a corrected position of at least the first pair of end-effectors or the second pair of end-effectors.

42. The apparatus of claim 41, wherein the first pair of end-effectors and the second pair of end-effectors are rotatably coupled to the rotary joint at a midpoint of the first pair of end-effectors and the second pair of end-effectors.

43. The apparatus of claim 41, wherein the second actuator and the third actuator are configured to be controlled by the control module having a processor and at least one memory.

* * * * *